(12) United States Patent
Kim

(10) Patent No.: US 11,571,648 B2
(45) Date of Patent: Feb. 7, 2023

(54) AIR CLEANER

(71) Applicant: LG ELECTRONICS INC., Seoul (KR)

(72) Inventor: Taehyun Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 667 days.

(21) Appl. No.: 16/497,302

(22) PCT Filed: Mar. 20, 2019

(86) PCT No.: PCT/KR2019/003245
§ 371 (c)(1),
(2) Date: Sep. 24, 2019

(87) PCT Pub. No.: WO2019/151846
PCT Pub. Date: Aug. 8, 2019

(65) Prior Publication Data
US 2020/0016524 A1    Jan. 16, 2020

(51) Int. Cl.
*B01D 46/42* (2006.01)
*A47L 9/00* (2006.01)
(Continued)

(52) U.S. Cl.
CPC ............ *B01D 46/429* (2013.01); *A47L 9/009* (2013.01); *A47L 9/281* (2013.01); *A47L 9/2826* (2013.01);
(Continued)

(58) Field of Classification Search
None
See application file for complete search history.

(56) References Cited

U.S. PATENT DOCUMENTS 4,790,862 A * 12/1988 Naruo .................. F24F 3/16
96/417
5,228,306 A * 7/1993 Shyu .................. F24F 11/72
62/262
(Continued)

FOREIGN PATENT DOCUMENTS

JP     2006-317075 A    11/2006
JP     2007-147217 A     6/2007
(Continued)

OTHER PUBLICATIONS

Translation of JP2007147217 (Year: 2007).*
Translation of KR20180017771 (Year: 2018).*

*Primary Examiner* — Christopher P Jones
*Assistant Examiner* — Phillip Y Shao
(74) *Attorney, Agent, or Firm* — Birch, Stewart, Kolasch & Birch, LLP

(57) ABSTRACT

An air cleaner disposed in an indoor space is disclosed. The air cleaner according to an embodiment of the present invention includes a blowing device including a suction port and a discharging port, a fan motor configured to cause air flow, a purification unit installed in the blowing device to clean air, a flow conversion configured to change a flow direction of air discharged from the discharging port, a communication unit configured to communicate with a moving agent moving in the indoor space, and a processor configured to receive feature information collected by the moving agent and associated with a structure of the indoor space, obtain a type of the indoor space by using the feature information, and control an operation of at least one of the fan motor and the flow conversion device by using the type of the indoor space to adjust at least one of an operation mode, a wind direction, and a wind volume.

11 Claims, 47 Drawing Sheets

(51) Int. Cl.
- *A47L 9/28* (2006.01)
- *A47L 11/40* (2006.01)
- *B01D 46/00* (2022.01)
- *B01D 46/44* (2006.01)
- *B01D 46/46* (2006.01)
- *G05D 1/02* (2020.01)
- *F24F 110/50* (2018.01)
- *F24F 8/10* (2021.01)
- *F24F 11/72* (2018.01)
- *F24F 3/16* (2021.01)
- *B01D 46/24* (2006.01)

(52) U.S. Cl.
CPC ........... *A47L 9/2852* (2013.01); *A47L 9/2894* (2013.01); *A47L 11/4011* (2013.01); *A47L 11/4061* (2013.01); *A47L 11/4097* (2013.01); *B01D 46/0052* (2013.01); *B01D 46/442* (2013.01); *B01D 46/46* (2013.01); *G05D 1/0221* (2013.01); *A47L 2201/04* (2013.01); *A47L 2201/06* (2013.01); *B01D 46/0047* (2013.01); *B01D 46/24* (2013.01); *B01D 2279/50* (2013.01); *B01D 2279/55* (2013.01); *F24F 3/16* (2013.01); *F24F 8/10* (2021.01); *F24F 11/72* (2018.01); *F24F 2110/50* (2018.01); *F24F 2221/42* (2013.01); *G05D 2201/0215* (2013.01)

(56) References Cited

U.S. PATENT DOCUMENTS

| | | | |
|---|---|---|---|
| 2005/0207951 A1* | 9/2005 | Lee | A61L 9/015 422/186.07 |
| 2017/0112344 A1* | 4/2017 | Koura | A47L 9/2826 |
| 2018/0055312 A1* | 3/2018 | Jung | G06T 19/006 |
| 2018/0055326 A1* | 3/2018 | Jung | G06T 19/006 |
| 2018/0299899 A1* | 10/2018 | Suvarna | H04W 16/20 |

FOREIGN PATENT DOCUMENTS

| | | |
|---|---|---|
| KR | 10-2009-0085368 A | 8/2009 |
| KR | 10-2018-0017771 A | 2/2018 |
| KR | 10-1907313 B1 | 12/2018 |

* cited by examiner

FIG. 2A
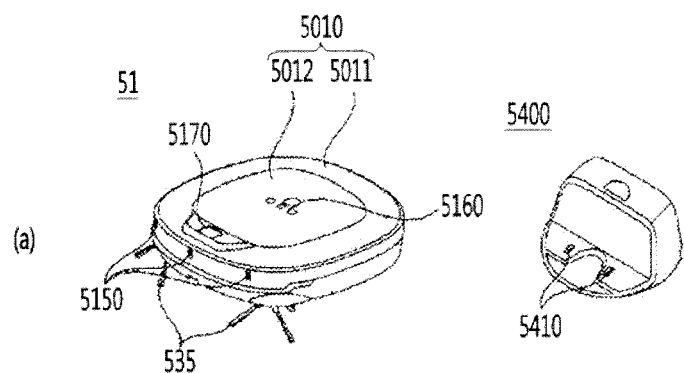
(a)
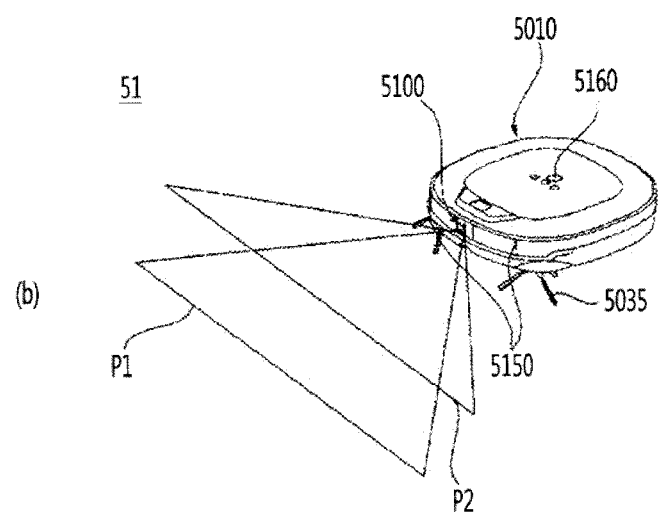
(b)

FIG. 2B
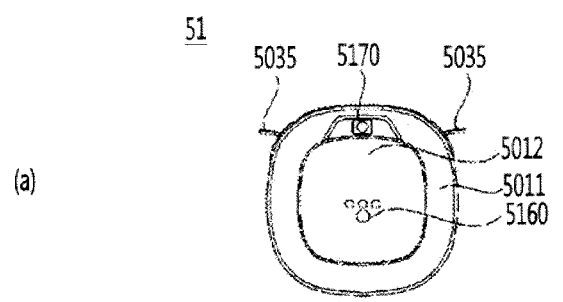
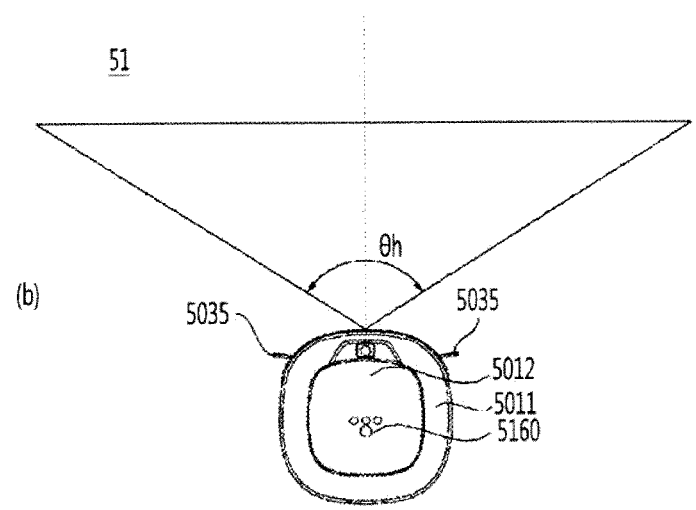

FIG. 2C
(a)
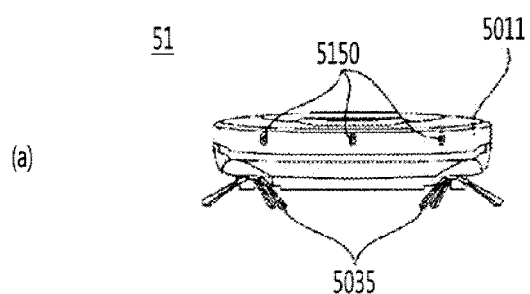
(b)
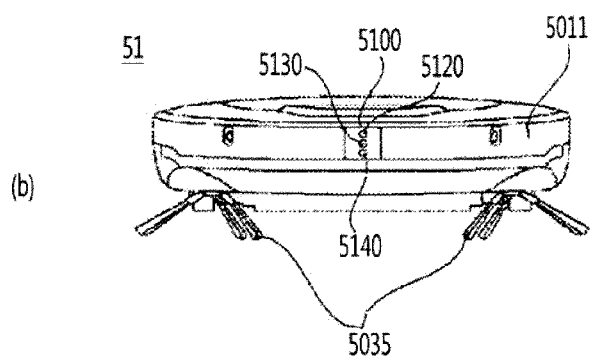

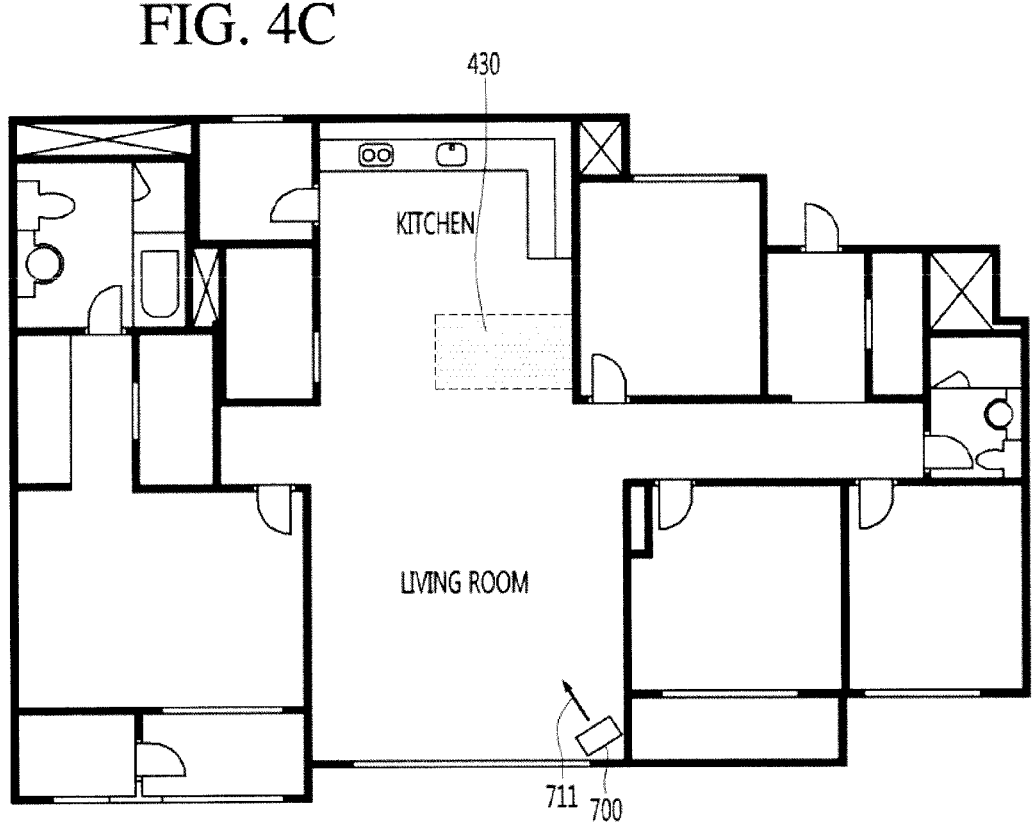

FIG. 11
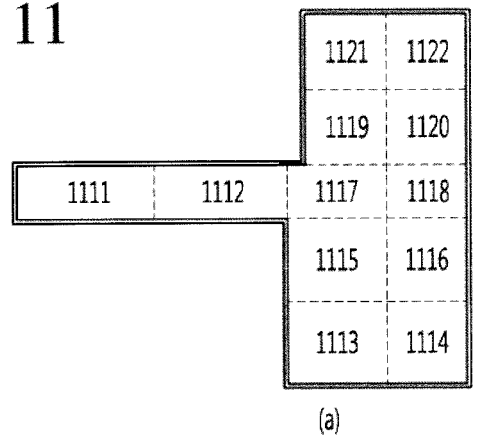
(a)
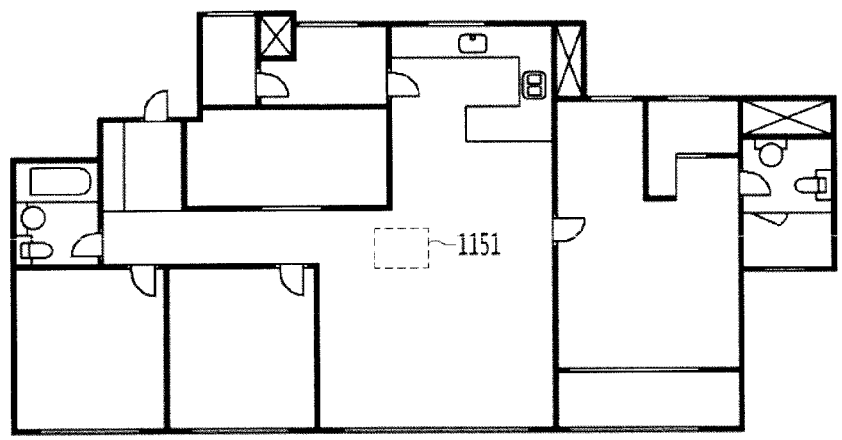
(b)

FIG. 17
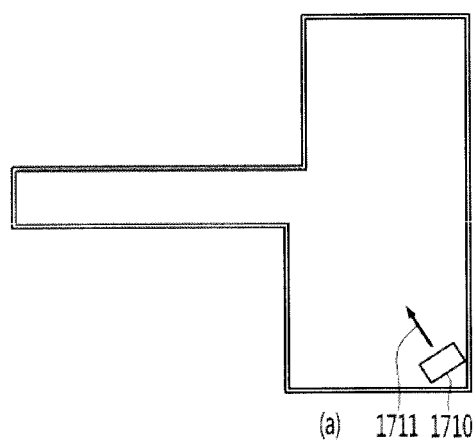
(a) 1711 1710
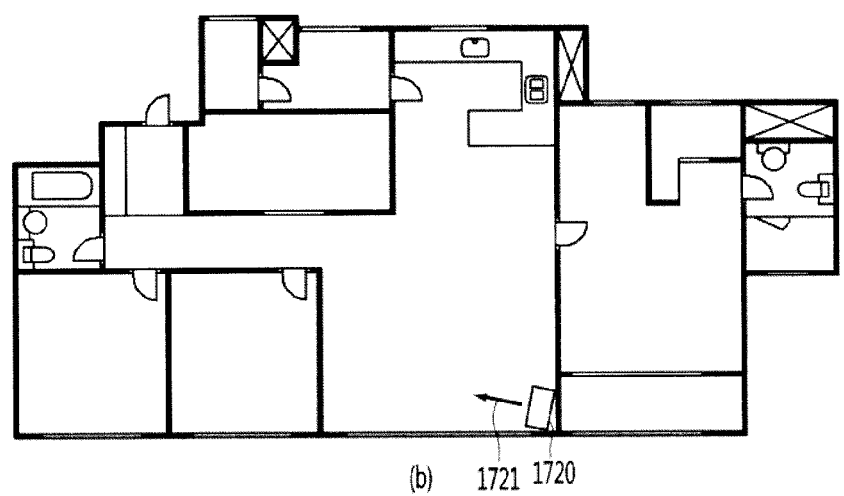
(b) 1721 1720

AIR CLEANER

CROSS REFERENCE TO RELATED APPLICATIONS

This application is the National Phase of PCT international Application No. PCT/KR2019/003245, filed on Mar. 20, 2019, which is hereby expressly incorporated by reference into the present application.

TECHNICAL FIELD

The present invention relates to an air cleaner which checks the type or situation of an indoor space by using information received from a moving agent to perform optimal air cleaning.

BACKGROUND ART

Artificial intelligence (AI), which is a field of computer engineering and information technology to study how to enable a computer to think, learn, make self-development, etc. Which may be done with human intelligence, refers to allowing a computer to imitate intelligent behaviors of human beings.

In addition, AI does not exist as-is but is directly or indirectly related to other fields of computer science. Particularly in modern times, attempts are being actively made to introduce AI elements in various fields of information technology and use them to solve problems in those fields.

Technology, which recognizes and learns ambient situations by using AI and provides information desired by a user in a desired form or performs an operation or a function desired by the user, is being actively researched.

An air cleaner is understood as a device which sucks or cleans polluted air and discharges cleaned air. For example, the air cleaner may include a blowing device for allowing external air to flow into the air cleaner and a filter for filtering dust or bacteria in air.

The air cleaner is a device for maintaining air in a certain space in a most suitable state on the basis of the use or purpose thereof. The certain space may be variously proposed based on a place where the air cleaner is used. For example, in a case where the air cleanser is disposed in home or an office, the certain space may be an indoor space of home or an indoor space of a building.

Since a structure of an indoor space is very various, an optimized air cleaning method may differ based on the structure of the indoor space.

However, since cleaning is currently performed based on a user setting without considering a structure of an indoor space, there is a problem where it is unable to perform optimized air cleaning.

Moreover, it is required to perform intensive cleaning on the basis of a situation of an indoor space. However, a plurality of sensors are needed for considering various situations occurring an indoor space, causing a problem where the cost increases.

DISCLOSURE

Technical Problem

An aspect of the present invention is directed to providing an air cleaner which may check the type of an indoor space by using feature information which is associated with a structure of the indoor space and is received from a moving agent, thereby performing optimal air cleaning.

Another aspect of the present invention is directed to providing an air cleaner for performing intensive cleaning by using situation information received from a moving agent.

Technical Solution

An air cleaner according to an embodiment of the present invention obtains the type of an indoor space by using feature information and adjusts at least one of an operation mode, a wind volume, and a wind direction by using the type of the indoor space.

The air cleaner according to an embodiment of the present invention receives situation information and adjusts at least one of an operation mode, a wind volume, and a wind direction by using the type of the indoor space and the situation information.

Advantageous Effects

Since structures of indoor spaces are very various, an optimized air cleaning method may differ based on a structure of an indoor space. However, according to the present invention, there is an advantage where optimal air cleaning may be performed in consideration of the structure of the indoor space.

Moreover, the use of robotic vacuum cleaners or moving agents such as cleaning robots and guide robots disposed in airports, shopping malls, or museums is increasing recently. Also, according to the present invention, there is an advantage where a structure of an indoor space may be easily checked by using a moving agent, and then, optimal air cleaning may be performed.

Moreover, according to the present invention, optimal air cleaning may be performed so as to be suitable for various purposes.

It is required to determine a region which is to be intensively cleaned, based on a situation of an indoor space. However, a plurality of sensors are needed for considering various situations occurring an indoor space, causing a problem where the cost increases. However, according to the present invention, there is an advantage where a situation of an indoor space may be easily checked by using a moving agent, a region which needs intensive cleaning may be determined, and optimal air cleaning may be performed based on a structure of the indoor space.

DESCRIPTION OF DRAWINGS

FIG. 2A is a perspective view of a robotic vacuum cleaner according to an embodiment of the present invention.

FIG. 2B illustrates a horizontal view angle of the robotic vacuum cleaner of FIG. 2A.

FIG. 2C is a front view illustrating the robotic vacuum cleaner of FIG. 2A.

FIGS. 4A to 4D are diagrams for describing a problem which may occur due to various structures of an indoor space.

FIG. 11 is a diagram for describing a plurality of cleaning information respectively corresponding to a plurality of zones included in an indoor space.

FIG. 17 is a diagram for describing a method of correcting cleaning information, according to an embodiment of the present invention.

MODE FOR INVENTION

Figure 1:
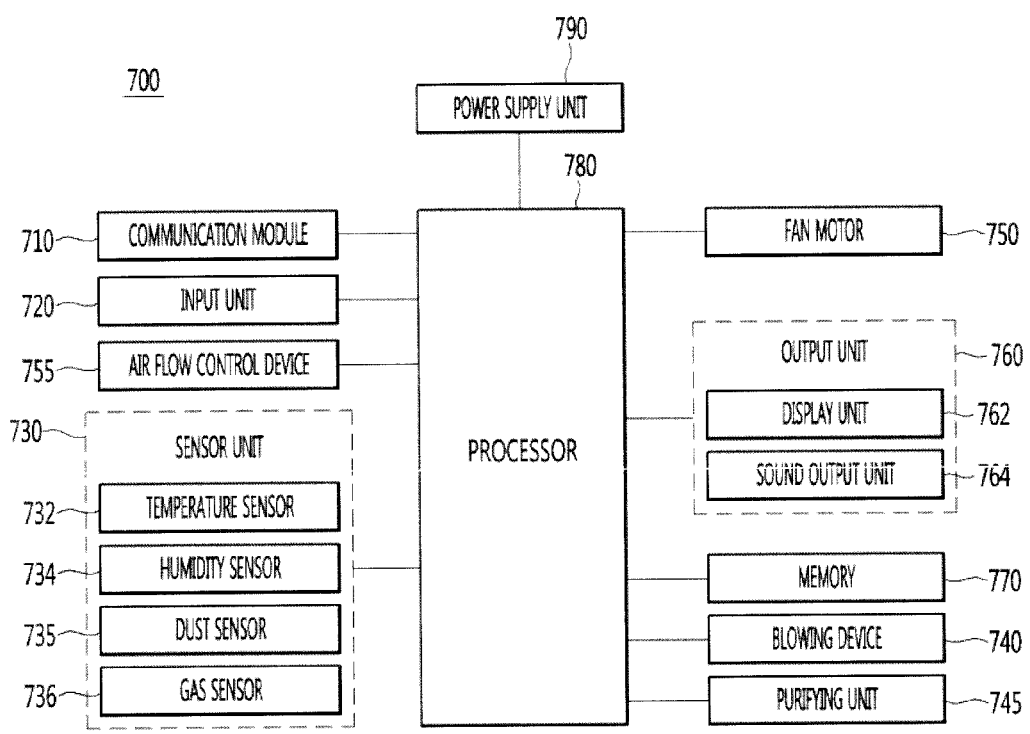
FIG. 1 is a schematic block diagram illustrating elements included in an air cleaner according to an embodiment of the present invention.

Hereinafter, embodiments of the present disclosure are described in more detail with reference to accompanying drawings and regardless of the drawings symbols, same or similar components are assigned with the same reference numerals and thus overlapping descriptions for those are omitted. The suffixes "module" and "unit" for components used in the description below are assigned or mixed in consideration of easiness in writing the specification and do not have distinctive meanings or roles by themselves. In the following description, detailed descriptions of well-known functions or constructions will be omitted since they would obscure the invention in unnecessary detail. Additionally, the accompanying drawings are used to help easily understanding embodiments disclosed herein but the technical idea of the present disclosure is not limited thereto. It should be understood that all of variations, equivalents or substitutes contained in the concept and technical scope of the present disclosure are also included.

It will be understood that the terms "first" and "second" are used herein to describe various components but these components should not be limited by these terms. These terms are used only to distinguish one component from other components.

In this disclosure below, when one part (or element, device, etc.) is referred to as being 'connected' to another part (or element, device, etc.), it should be understood that the former can be 'directly connected' to the latter, or 'electrically connected' to the latter via an intervening part (or element, device, etc.). It will be further understood that when one component is referred to as being 'directly connected' or 'directly linked' to another component, it means that no intervening component is present.

As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

In implementing the present invention, for convenience of description, subdivided elements will be described. However, the elements may be implemented in one device or module, or one element may be divided and may be implemented in a plurality of devices or modules.

FIG. 1 is a schematic block diagram illustrating elements included in an air cleaner according to an embodiment of the present invention.

Referring to FIG. 1, an air cleaner 700 may include a communication unit 710, an input unit 720, a sensor unit 730, a compressor 740, a fan motor 750, an output unit 760, a memory 770, a processor 780, and a power supply 790. The elements illustrated in FIG. 1B may not be essential for implementing the air cleaner, and thus, the air cleaner described herein may include more or fewer elements than the above-described elements.

In more detail, the communication unit 710 of the elements may include one or more modules which enable wired or wireless communication between the air cleaner 700 and an external device (for example, a moving air cleaner for a moving agent, a smartphone, a tablet personal computer (PC)), etc. and a fixed air cleaner for a desktop computer and the like) or between the air cleaner 700 and an external server.

The communication unit 710 may include one or more modules which connect the air cleaner 700 to one or more networks.

In a case where the communication unit 710 supports wireless communication, the communication unit 710 may include a wireless Internet module and a short range communication module.

The wireless Internet module may denote a module for wireless Internet access and may be embedded into or provided outside the air cleaner 700.

The wireless Internet module is configured to transmit or receive a wireless signal over a communication network based on wireless Internet technologies. Examples of the wireless Internet technologies may include wireless local area network (LAN), wireless-fidelity (Wi-Fi), Wi-Fi direct, and digital living network alliance (DLNA).

The short range communication module may be for short range communication. The short range communication module may support the short range communication by using at least one of technologies such as Bluetooth™, infrared data association (IrDA), zigbee, and near field communication (NFC). The short range communication module may support wireless communication between the air cleaner 700 and an external device over wireless area networks. The wireless area networks may be wireless personal area networks.

The communication unit 710 may communicate with a moving agent through various communication schemes described above, based on control by the processor 780.

The input unit 720 may include a touch key, a mechanical key, and a dial key for receiving information or a command from a user. According to an embodiment, the input unit 720 may be understood as a concept which includes an interface unit receiving information or a command from a separate remote control device.

In detail, the input unit 720 may be for receiving information from the user, and when information is input through the input unit 720, the processor 780 may control an operation of the air cleaner 700 to correspond to the input information.

The input unit 720 may include a mechanical input unit (or a mechanical key (for example, a button, a dome switch, a jog wheel, and a jog switch disposed on a front/rear surface or a side surface of the air cleaner 700) and a touch type input means.

For example, the touch type input means may be configured with a virtual key, a soft key, or a visual key disposed on a touch screen through software processing, or may be configured with a touch key disposed at a portion other than the touch screen. The virtual key or the visual key may have various shapes and may be disposed on the touch screen, and for example, may be configured with graphic, a text, an icon, a video, or a combination thereof.

The sensor unit 730 may include one or more sensors for sensing at least one of user information and ambient environment information surrounding the air cleaning 700.

For example, the sensor unit 730 may include a temperature sensor 732 for sensing a temperature of a space where the air cleaner 700 is installed and a humidity sensor 734 for sensing humidity of the space.

Moreover, the sensor unit 730 may include a dust sensor 735 which senses the amount of dust in air and a gas sensor 736 which senses the amount of gas in air.

The output unit 760 may be generating an output associated with a sense of sight and a sensor of hearing and may include at least one of a display unit 762 and a sound output unit 764 (for example, a speaker).

The display unit 762 may configure a mutual layer structure along with a touch sensor or may be provided as one body with the touch sensor, and thus, may implement a touch screen. The touch screen may function as the input unit 720 which provides an interface between the air cleaner 700 and the user and may provide an output interface between the air cleaner 700 and the user.

The display unit 762 may display various information associated with an operation of the air cleaner 700. For example, the display unit 762 may display information such as a wind volume and a wind direction of the air cleaner 700, a current indoor temperature, humidity, and air quality and information about an operation mode such as a power saving mode, a normal mode, and a sleeping mode.

The sound output unit 764 may output a signal having a voice form, for informing the occurrence of an event of the air cleaner 700. Examples of the event occurring in the air cleaner 700 may include alarm, power-on/off, the occurrence of an error, and changing of the operation mode.

The memory 770 stores data which supports various functions of the air cleaner 700. The memory 770 may store various data and commands for the operation of the air cleaner 700.

The memory 770 may include at least one type storage medium among a flash memory type, a hard disk type, a solid state disk (SSD) type, a silicon disk drive (SDD) type, a multimedia card micro type, a card type memory (for example, SD or XD memory), random access memory (RAM), static random access memory (SRAM), read-only memory (ROM), electrically erasable programmable read-only memory (EEPROM), programmable read-only memory (PROM), magnetic memory, magnetic disk, and optical disk.

The processor 780 may control an overall operation of the air cleaner 700 commonly. The processor 780 may process a signal, data, and information input or output through the above-described elements, and thus, may provide or process information or functions suitable for the user.

The processor 780 may control at least one of the fan motor 750 and a flow conversion device 755 on the basis of cleaning information about the air cleaner 700. Here, the cleaning information may include at least one of an operation mode, a wind volume, and a wind direction.

The blowing device 740 may include a suction port and a discharging port.

The flow conversion device 755 may convert a flow direction of air discharged through the discharging port of the blowing device.

The fan motor 750 may be installed in the blowing device 740 and may rotate a blowing fan (not shown) included in the blow device 740 to blow air. Accordingly, the fan motor 750 may cause air flow.

That is, when the fan motor 750 is driven, the blowing fan may rotate, and as the blowing fan rotates, air may be sucked through the suction port, and air may be discharged through the discharging port.

Moreover, a purification unit 745 may be installed in the blowing device 740, and as air is sucked through the suction port and is discharged through the discharging port, the purification unit may purify air.

The processor 780 may control an operation of at least one of the fan motor 750 and the flow conversion device 755 on the basis of an operation mode in cleaning information. Also, as an operation of at least one of the fan motor 750 and the flow conversion device 755 is controlled, an operation mode of the air cleaner may be controlled.

Moreover, the processor 780 may control an operation of at least one of the fan motor 750 and the flow conversion device 755 on the basis of a wind volume in the cleaning information. Also, as an operation of at least one of the fan motor 750 and the flow conversion device 755 is controlled, a wind volume of the air cleaner 780 may be adjusted.

Moreover, the processor 780 may control an operation of the flow conversion device 755 on the basis of a wind direction in the cleaning information. Also, as an operation of the flow conversion device 755 is controlled, a wind direction of the air cleaner 780 may be adjusted.

The power supply 790 may be supplied with an external power and an internal power and may supply power to each of the elements included in the air cleaner 700, based on control by the processor 780.

At least some of the elements may cooperate for implementing the operation, control, or control method of an air cleaner according to various embodiments described below. Also, the operation, control, or control method of the air cleaner may be implemented in the air cleaner on the basis of driving of at least one application program stored in the memory 770.

Next, a robotic vacuum cleaner will be described as an example of a moving agent. However, the moving agent is not limited to the robotic vacuum cleaner and may be all devices, which is capable of moving in an indoor space, such as pet robots and guide robots.

Figure 2D:
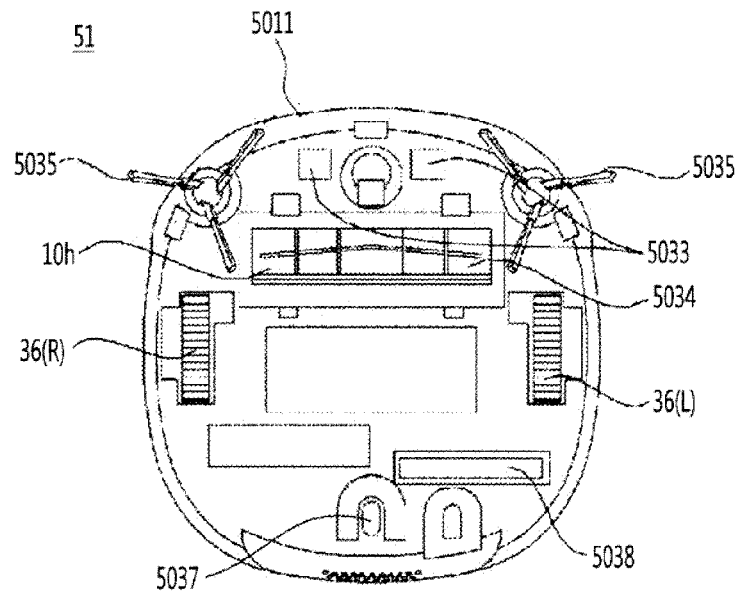
FIG. 2D illustrates a lower surface of the robotic vacuum cleaner of FIG. 2A.

FIG. 2A is a perspective view of a robotic vacuum cleaner according to an embodiment of the present invention. FIG. 2B illustrates a horizontal view angle of the robotic vacuum cleaner of FIG. 2A. FIG. 2C is a front view illustrating the robotic vacuum cleaner of FIG. 2A. FIG. 2D illustrates a lower surface of the robotic vacuum cleaner of FIG. 2A.

Referring to FIGS. 2A to 2D, a robotic vacuum cleaner 51 according to an embodiment of the present invention may include a body 5010, which moves along a floor of a cleaning zone and sucks particles such as dust on the floor, and an obstacle sensing unit 5100 which is disposed on a front surface of the body 5010.

The body 5010 may include a casing 5011 which configures an external appearance and forms a space accommodating parts configuring the body 5010, a suction unit 5034 which is disposed in the casing 5011 to suck dust or waste, and a left wheel 36L and a right wheel 36R which are rotatably provided in the casing 5011. As the left wheel 36L and the right wheel 36R rotate, the body 5010 may move along the floor of the cleaning zone, and in such a process, particles may be sucked through the suction unit 5034.

The suction unit 5034 may include a suction fan (not shown) which generates a sucking force and a suction port 10*h* through which an air current generated by a rotation of the suction fan is sucked. The suction unit 5034 may include a filter (not shown) which collects particles of the air current sucked through the suction port 10*h* and a particle collection tank (not shown) into which particles collected by the filter are accumulated.

Moreover, the body 5010 may include a driving driver which drives the left wheel 36L and the right wheel 36R. The driving driver may include at least one driving motor. The at least one driving motor may include a left wheel driving motor which drives the left wheel 36L and a right wheel driving motor which drives the right wheel 36R.

An operation of each of the left wheel driving motor and the right wheel driving motor may be independently controlled by a driving controller of a controller, and thus, the forward movement, rearward movement, or turning movement of the body 5010 may be performed. For example, when the body 5010 performs forward movement, the left wheel driving motor and the right wheel driving motor may rotate in the same direction, but when the left wheel driving motor and the right wheel driving motor rotate in different directions or opposite directions, a driving rotation of the body 5010 may be switched. At least one auxiliary wheel 5037 for stably supporting the body 5010 may be further provided.

The body 5010 may further include a plurality of brushes 5035 which are disposed a front portion of a lower surface of the casing 5011 and each includes a plurality of wings extending radially. Dusts are removed from a floor of a cleaning zone by rotations of the plurality of brushes 5035, and the dusts separated from the floor are sucked through the suction port 10*h* and are collected in the collection tank.

A control panel including a manipulation unit 5160 which receives various commands for controlling the robotic vacuum cleaner 51 from a user may be provided on an upper surface of the casing 5011.

The obstacle sensing unit 5100 may be disposed on a front surface of the body 5010.

The obstacle sensing unit 5100 is fixed to the front surface of the casing 5011 and includes a first pattern irradiation unit 5120, a second pattern irradiation unit 5130, and an image obtainment unit 5140. In this case, the image obtainment unit may be fundamentally installed under the pattern irradiation unit as illustrated, but depending on the case, may be disposed between the first and second pattern irradiation units. Also, a second image obtainment unit (not shown) may be further provided at an upper end portion of the body. The second image obtainment unit photographs the upper end portion of the body (i.e., an image of a ceiling).

A battery 5038 capable of being re-charged may be included in the body 5010, and a charging terminal 5033 of the battery 5038 may be connected to a commercial power source (for example, a power socket in home). Alternatively, the body 5010 may be docked on a separate charging stand (not shown) connected to the commercial power source, and thus, the charging terminal 5033 may be electrically connected to the commercial power source and charging of the battery 5038 may be performed. Electronic parts configuring the robotic vacuum cleaner 51 may be supplied with power from the battery 5038, and thus, in a state where the battery 5038 has been charged, the robotic vacuum cleaner 51 may perform self-driving in a state which is electrically disconnected from the commercial power source.

Figure 2E:
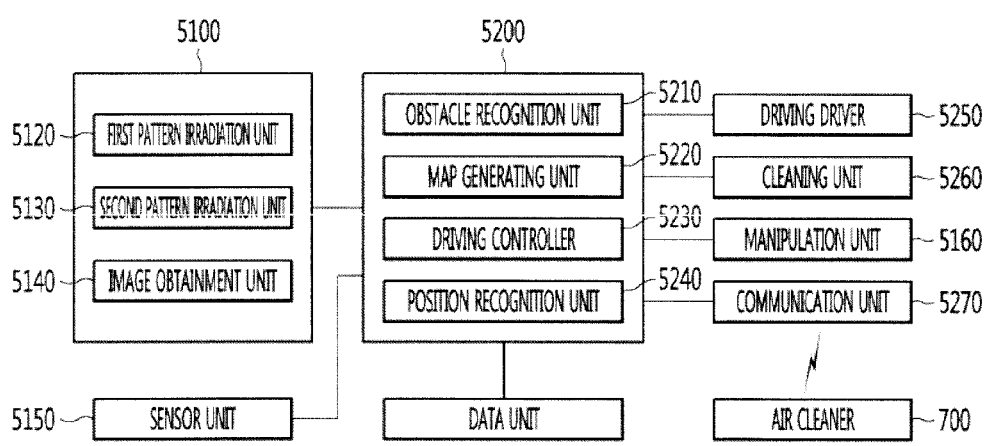
FIG. 2E is a block diagram illustrating main parts of a robotic vacuum cleaner according to an embodiment of the present invention.

FIG. 2E is a block diagram illustrating main parts of a robotic vacuum cleaner according to an embodiment of the present invention.

As illustrated in FIG. 2E, a robotic vacuum cleaner 51 may include a driving driver 5250, a cleaning unit 5260, a data unit 5280, an obstacle sensing unit 5100, a sensor unit 5150, a communication unit 5270, a manipulation unit 5160, and a controller 5200 which controls an overall operation thereof.

The manipulation unit 5160 includes an input means such as at least one button, a switch, and a touch pad and receives a user command. The manipulation unit may be provided at an upper portion of a body 5010 as described above.

The data unit 5280 stores an obstacle sensing signal input from the obstacle sensing unit 5100 or the sensor unit 5150, stores reference data used for an obstacle recognition unit 5210 to determine an obstacle, and stores obstacle information about a sensed obstacle. Also, the data unit 5280 stores control data for controlling an operation of the robotic vacuum cleaner and data based on a cleaning mode of the robotic vacuum cleaner and stores a map which is generated by a map generating unit and includes obstacle information. The data unit 5280 may store a basic map, a cleaning map, a user map, and a guide map. The obstacle sensing signal includes a sensing signal such as an ultrasonic wave/laser generated by the sensor unit and an obtainment image obtained by an image obtainment unit.

Moreover, the data unit 5280 may store data readable by a microprocessor and may include hard disk drive (HDD), solid state drive (SSD), silicon disk drive (SDD), ROM, RAM, CD-ROM, a magnetic tape, floppy disk, and an optical data storage device.

The communication unit 5270 communicates with an air cleaner through a wireless communication scheme. Also, the communication unit 5270 may be connected to an Internet network over an in-home network and may communicate with an external server or the air cleaner.

The communication unit 5270 transmits a generated map to the air cleaner and transmits an operating state of the air cleaner and data of a cleaning state to the air cleaner. The communication unit 5270 includes a communication module such as Wi-Fi, WiBro as well as short range communication such as Bluetooth™ and zigbee and transmits or receives data.

The driving driver 5250 includes at least one driving motor and allows the robotic vacuum cleaner to drive according to a control command of the driving controller 5230. The driving driver 5250, as described above, may include a left wheel driving motor which drives the left wheel 36L and a right wheel driving motor which drives the right wheel 36R.

The cleaning unit 5260 may operate a brush to provide a state which easily sucks dusts or particles around the robotic vacuum cleaner and operates a suction device to suck dusts or particles. The cleaning unit 5260 controls an operation of a suction fan included in the suction unit 5034 which sucks particles such as dusts or waste, thereby allowing dusts to be collected in the particle collection tank through a suction port.

The obstacle sensing unit 5100 includes a first pattern irradiation unit 5120, a second pattern irradiation unit 5130, and an image obtainment unit 5140.

The sensor unit 5150 includes a plurality of sensors and aids obstacle sensing. The sensor unit 5150 may include at least one of a laser sensor, an ultrasonic sensor, and an infrared sensor. Also, the sensor unit 5150 senses an obstacle in front of (i.e., a driving direction) the body 5010. When a transmitted signal is reflected and input, the sensor unit 5150 senses information about the presence of an obstacle or a distance to the obstacle as an obstacle sensing signal and inputs the information to the controller 5200.

Moreover, the sensor unit 5150 includes at least one a slope sensor and senses a slope of the body. When the body is inclined in a forward, rearward, left, or right direction, the slope sensor calculates an inclined direction and an inclined angle. The slope sensor may use a tilt sensor or an acceleration sensor, and the acceleration sensor may use one of a gyro sensor, an inertia sensor, and a silicon semiconductor sensor.

The sensor unit 5150 may include at least one of elements of the obstacle sensing unit 5100 and may perform a function of the obstacle sensing unit 5100.

In the obstacle sensing unit 5100, the first pattern irradiation unit 5120, the second pattern irradiation unit 5130, and the image obtainment unit 5140 are installed on a front surface of the body 5010 as described above. The obstacle sensing unit 5100 irradiates light P1 having a first pattern and light P2 having a second pattern onto a region in front of the robotic vacuum cleaner and photographs the irradiated pattern to obtain an image.

Moreover, the sensor unit 5150 may include a dust sensor which senses the amount of dust in air and a gas sensor which senses the amount of gas in air.

The obstacle sensing unit 5100 senses an obtained image as an obstacle sensing signal and inputs a sensed image to the controller 5200.

The first and second pattern irradiation units 5120 and 5130 of the obstacle sensing unit 5100 may include a light source and an optical pattern projection element (OPPE) which transmits light irradiated from the light source to generate a certain pattern. The light source may be a laser diode (LD) and a light emitting diode (LED). Laser light is far better than another light source in monochromatic characteristic, straightness, and connection characteristic, and thus, precise distance measurement is possible. Particularly, since infrared light or visible light has a problem where a deviation occurs greatly in precision of distance measurement due to causes such as a color and a material of a target object, the LD is preferable for the light source. The OPPE may include a lens or a diffractive optical element (DOE). Light having various patterns may be irradiated based on a configuration of the OPPE included in each of the first and second pattern irradiation units 5120 and 5130.

The first pattern irradiation unit 5120 may irradiate the light P1 having the first pattern (hereinafter referred to as first pattern light) onto a lower side in front of the body 5010. Accordingly, the first pattern light P1 may be incident on a floor of a cleaning zone.

The first pattern light P1 may be configured in the form of horizontal line Ph. Also, the first pattern light P1 may be configured in the form of cross pattern where the horizontal line Pv intersects a vertical line Pv.

The first pattern irradiation unit 5120, the second pattern irradiation unit 5130, and the image obtainment unit 5140 may be vertically arranged in one row. The image obtainment unit 5140 may be disposed under the first pattern irradiation unit 5120 and the second pattern irradiation unit 5130, and are not limited thereto and may be disposed on the first pattern irradiation unit 5120 and the second pattern irradiation unit 5130.

In an embodiment, the first pattern irradiation unit 5120 may be disposed at an upper side and may irradiate the first pattern light P1 onto a downward region toward a forward region to sense an obstacle disposed under the first pattern irradiation unit 5120, and the second pattern irradiation unit 5130 may be disposed under the first pattern irradiation unit 5120 and may irradiate light P2 having a second pattern (hereinafter referred to as second pattern light) onto an upward region toward a forward region. Therefore, the second pattern light P2 may be incident on an obstacle, which is disposed higher in position than the second pattern irradiation unit 5130 from a wall or a floor of a cleaning zone, or a certain portion of the obstacle.

The second pattern light P2 may have a pattern differing from that of the first pattern light P1, and preferably, may include a horizontal line. Here, the horizontal line may not be a continuous line and may be a dotted line.

In FIG. 2 described above, an illustrated irradiation angle θh denotes a horizontal irradiation angle of the first pattern light P1 irradiated from the first pattern irradiation unit 5120, represents an angle between both ends of the horizontal line Ph and the first pattern irradiation unit 5120, and is preferably set to a range of 130 degrees to 140 degrees, but is not limited thereto. A dotted line illustrated in FIG. 2 may face a forward region in front of the robotic vacuum cleaner 51, and the first pattern light P1 may be configured in a form symmetrical with the dotted line.

In the second pattern irradiation unit 5130, like the first pattern irradiation unit 5120, a horizontal irradiation angle may be set to a range of 130 degrees to 140 degrees. According to an embodiment, the second pattern irradiation unit 5130 may irradiate the second pattern light P2 at the same horizontal irradiation angle as the first pattern irradiation unit 5120, and in this case, the second pattern light P2 may also be configured in a form symmetrical with the dotted line illustrated in FIG. 2.

The image obtainment unit 5140 may obtain an image in front of the body 5010. Particularly, the pattern lights P1 and P2 appear in an image (hereinafter referred to as an obtainment image) obtained by the image obtainment unit 5140. Hereinafter, a phase of each of pattern lights P1 and P2 appearing the obtainment image is referred to as a light pattern. Since each of the pattern lights P1 and P2 substantially incident on an actual space is a phase formed in an image sensor, the same reference numerals as those of the pattern lights P1 and P2 are assigned, and thus, phases respectively corresponding to the first pattern light P1 and the second pattern light P2 are referred to as a first light pattern P1 and a second light pattern P2.

The image obtainment unit 5140 may include a digital camera which converts a phase of an object into an electrical signal, converts the electrical signal into a digital signal, and stores the digital signal in a memory device, and the digital camera may include an image sensor (not shown) and an image processor (not shown).

The image sensor may be a device which converts an optical image into an electrical signal and may be configured as a chip with a plurality of photodiodes integrated thereinto, and for example, a photodiode may be a pixel. Electric charges are accumulated into each of pixels due to an image which is formed in a chip by light passing through a lens, and each of electrical charges accumulated into each pixel may be converted into an electrical signal (for example, a voltage). The image sensor may use a charge coupled device (CCD) or a complementary metal oxide semiconductor (CMOS) known to those skilled in the art.

The image processor generates a digital image on the basis of an analog signal output from the image sensor. The image processor may include an analog-to-digital (AD) converter which converts an analog signal into a digital signal, a buffer memory which temporarily stores digital data according to the digital signal output from the AD converter, and a digital signal processor (DSP) which processes information stored in the buffer memory to generate a digital image.

The controller 5200 includes an obstacle recognition unit 5210, a map generating unit 5220, a driving controller 5230, and a position recognition unit 5240.

The obstacle recognition unit 5210 determines an obstacle on the basis of an obtainment image input from the obstacle sensing unit 5100, and the driving controller 5230 changes a moving direction or a driving path on the basis of the obstacle information to control the driving driver 5250 so as to pass through or bypass an obstacle.

The driving controller 5230 controls the driving driver 5250 to independently control an operation of each of the left wheel driving motor and the right wheel driving motor, thereby allowing the body 5010 to move forward or rotate.

The obstacle recognition unit 5210 stores the obstacle sensing signal from the sensor unit 5150 or the obstacle sensing unit 5100 and analyzes the obstacle sensing signal to determine an obstacle.

The obstacle recognition unit 5210 determines the presence of an obstacle in a forward region on the basis of a signal of the sensor unit and analyzes the obtainment image to determine a position, a size, and a shape of the obstacle.

The obstacle recognition unit 5210 analyzes the obtainment image to extract a pattern thereof. The obstacle recognition unit 5210 extracts a light pattern which is generated when light having a pattern irradiated from the first pattern irradiation unit or the second pattern irradiation unit is irradiated onto a floor or an obstacle, and determines an obstacle on the basis of the extracted light pattern.

The obstacle recognition unit 5210 detects the light patterns P1 and P2 from the image (the obtainment image) obtained by the image obtainment unit 5140. The obstacle recognition unit 5210 may detect features such as a dot, a line, and a surface from certain pixels configuring the obtainment image and may detect the light patterns P1 and P2 and a dot, a line, and a surface configuring the light patterns P1 and P2 on the basis of the detected features.

The obstacle recognition unit 5210 may extract lines which are configured as pixels brighter than a periphery are continued and may extract the horizontal line Ph configuring the first light pattern P1 and a horizontal line configuring the second light pattern P2. However, the present invention is not limited thereto, and since various techniques for extracting a pattern having a desired shape from a digital image are known already, the obstacle recognition unit 5210 may extract the first light pattern P1 and the second light pattern P2 by using technologies known to those skilled in the art.

Moreover, the obstacle recognition unit 5210 determines the presence of an obstacle on the basis of the detected pattern and determines a shape of the obstacle. The obstacle recognition unit 5210 may determine the obstacle on the basis of the first light pattern and the second light pattern and may calculate a distance to the obstacle. Also, the obstacle recognition unit 5210 may determine a size (a height) and a shape of the obstacle on the basis of a shape of the first light pattern, a shape of the second light pattern, and a change in a light pattern occurring in the middle of approaching the obstacle.

The obstacle recognition unit 5210 determines the obstacle on the basis of a distance to a reference position with respect to the first light pattern and the second light pattern. When the first light pattern P1 appears at a position lower than the reference position, the obstacle recognition unit 5210 may determine that there is a descent slope way, and when the first light pattern P1 disappears, the obstacle recognition unit 5210 determines a cliff. Also, when the second light pattern appears, the obstacle recognition unit 5210 may determine a front obstacle or an upper obstacle.

The obstacle recognition unit 5210 determines slopingness of the body on the basis of slope information input from a slope sensor of the sensor unit 5150, and when the body is inclined, the obstacle recognition unit 5210 compensates for a slope with respect to a position of the light pattern of the obtainment image.

The driving controller 5230 controls the driving driver 5250 in order for cleaning to be performed while driving in a predetermined region of a cleaning zone and controls the cleaning unit 5260 in order for cleaning to be performed while driving.

The driving controller 5230 determines whether driving is possible or an approach is possible, based on the obstacle recognized by the obstacle recognition unit 5210 and controls the driving driver 5250 by setting a driving path so as to approach the obstacle to drive, pass through the obstacle, or bypass the obstacle.

The map generating unit 5220 generates a map of the cleaning zone on the basis of information about the obstacle determined by the obstacle recognition unit 5210.

When an initial operation is performed or the map of the cleaning zone is not stored, the map generating unit 5220 generates the map of the cleaning zone on the basis of obstacle information while driving in the cleaning zone. Also, the map generating unit 5220 updates a previously generated map on the basis of the obstacle information obtained while driving.

The map generating unit 5220 generates a basis map on the basis of information obtained by the obstacle recognition unit 5210 while driving and divides a region from the basic map to generate a cleaning map. Also, the map generating unit 5220 readjusts a region in association with the cleaning map and sets an attribute of the region to generate a user map and a guide map.

The basic map is a map where a shape of the cleaning zone obtained through driving is displayed as a contour line, and the cleaning map is a map where a region is divided in the basic map. The basic map and the cleaning map include a region, which enables the robotic vacuum cleaner to drive, and obstacle information. The user map is generated by simplifying the region of the cleaning map and readjusting a shape of the contour line and is a map to which a visual effect is assigned. The guide map is a map where the cleaning map overlaps the user map. The cleaning map is displayed on the guide map, and thus, a cleaning command may be input based on a region which enables the robotic vacuum cleaner to drive.

The map generating unit 5220 generates the basic map and divides the cleaning zone into a plurality of regions and includes a connection path which connects the plurality of regions. The map generating unit 5220 generates a map on the basis of information about an obstacle in each of the regions. The map generating unit 5220 divides a small region to set a representative region, for dividing a region in a map. The map generating unit 5220 sets a divided small region to a separate detailed region and merges the detailed region into the representative region to generate a map where regions are divided.

The map generating unit 5220 processes a shape of a region in association with each of divided regions. The map generating unit 5220 sets an attribute of each of the divided regions and processes a shape of each region on basis of a region-based attribute.

The map generating unit 5220 preferentially determines a main region in each of the divided regions, based on the number of contacts with another region. The main region may fundamentally be based on a case where the main region is a living room, but depending on the case, the main region may be changed to one of a plurality of rooms. The map generating unit 5220 sets an attribute of the other region with respect to the main region. For example, the map generating unit 5220 may set a region, which is disposed to have a certain size or more with respect to the living room which is the main region, to a room and may set the other region to another region.

In processing a shape of a region, the map generating unit 5220 processes each region in order for each region to have a specific shape according to a criterion based on an attribute of a corresponding region. For example, the map generating unit 5220 processes a shape of a room in general home, and for example, processes a shape of a region with respect to a tetragonal shape. Also, the map generating unit 5220 enlarges a shape of a region with respect to an outermost pixel of the basic map and deletes or decreases a region incapable of approaching due to an obstacle, thereby processing a shape of the region.

Moreover, in the basic map, the map generating unit 5220 displays an obstacle having a certain size or more on a map and deletes an obstacle having a size less than a certain size to allow the obstacle not to be displayed. For example, the map generating unit displays a chair having a certain size or more and furniture such as a sofa on a map and deletes a temporarily appearing obstacle and a thing (for example, a small toy) having a small size from the map. The map generating unit 5220 stores a position of a charging stand along with a map in generating the map.

The map generating unit 5220 may add an obstacle, sensed after the map is generated, to the map on the basis of obstacle information input from the obstacle recognition unit 21. When a specific obstacle is repeatedly sensed at a fixed position, the map generating unit 5220 adds the obstacle to the map, and when an obstacle is temporarily sensed, the map generating unit 5220 ignores the obstacle.

The map generating unit 5220 generates a user map which is a map having a processed shape and a guide map which the user map and a cleaning map are displayed to overlap.

Moreover, when a virtual wall is set, the map generating unit 5220 sets a position of the virtual wall in the cleaning map on the basis of data of the virtual wall received through the communication unit and calculates coordinates of the virtual wall corresponding to a cleaning zone. The map generating unit 5220 registers the virtual wall as an obstacle in the cleaning map.

The map generating unit 5220 stores data of the set virtual wall along with, for example, information about a level of the virtual wall and an attribute of the virtual wall.

The map generating unit 5220 enlarges the set virtual wall and registers the virtual wall as an obstacle. The map generating unit 5220 enlarges the set virtual wall and sets the virtual wall to a broader range, so that the body 5010 does not contact or invade the virtual wall in driving.

When the position recognition unit 5240 cannot determine a current position of the body 5010, the map generating unit 5220 generates a new map corresponding to the cleaning zone. The map generating unit 5220 determines that the robotic vacuum cleaner has moved to a new region, and initializes the set virtual wall.

When data of the virtual wall is received in driving, the map generating unit 5220 additionally sets the virtual wall in the map so that the body 5010 operates based on the virtual wall in driving. For example, when a new virtual wall is added, a level or attribute of the virtual wall is changed, or a previously set position of the virtual wall is changed, the map generating unit 5220 updates the map on the basis of the received data to allow information about the changed virtual wall to be reflected in the map.

The position recognition unit 5240 determines a current position of the body 5010 on the basis of a map (the cleaning map, the guide map, or the user map) stored in the data unit.

When a cleaning command is input, the position recognition unit 5240 determines whether a position in the map matches the current position of the body, and when the position in the map does not match the current position of the body or it is unable to check the current position, the position recognition unit 5240 recognizes a current position to restore a current position of the robotic vacuum cleaner 51. When the current position is restored, the driving controller 5230 controls the driving driver to move to a designated region on the basis of the current position. The cleaning command may be input from a remote controller (not shown), the manipulation unit 5160, or the air cleaner.

When the position in the map does not match the current position of the body or it is unable to check the current position, the position recognition unit 5240 may analyze the obtainment image input from the image obtainment unit 5140 to estimate the current position on the basis of the map.

The position recognition unit 5240 processes an obtainment image obtained from each position while the map generating unit 5220 is generating a map, and recognizes a global position of the body in association with the map.

By using the obtainment image from the image obtainment unit 5140, the position recognition unit 5240 may compare the map with the obtainment image of each position in the map to check the current position of the body, and thus, even when the position of the body is suddenly changed, the position recognition unit 5240 may estimate and recognize the current position.

The position recognition unit 5240 analyzes various features such as lightings located on a ceiling, an edge, a corner, a blob, and a ridge included in the obtainment image to determine a position. The obtainment image may be input from the image obtainment unit or the second image obtainment unit provided at an upper end portion of the body.

The position recognition unit 5240 detects a feature from each of obtainment images. Various feature detection methods of detecting a feature from an image have been well known in the computer vision technology field. Various feature detectors suitable for the feature detection methods have been known. For example, there are Canny, Sobel, Harris&Stephens/Plessey, SUSAN, Shi&Tomasi, level curve curvature, FAST, Laplacian of Gaussian, difference of Gaussians, determinant of Hessian, MSER, PCBR, and Grey-level blobs detectors.

The position recognition unit 5240 calculates a descriptor on the basis of each feature point. The position recognition unit 5240 may convert a feature point into a descriptor by using scale invariant feature transform (SIFT) technique, for detecting a feature. The descriptor may be referred to as an n-dimensional vector. The SIFT may detect a feature which does not vary despite the scale, rotation, and brightness variation of a photographed target, and thus, may detect an invariant (i.e., rotation-invariant) feature even when the same region is photographed by changing a gesture of the robotic vacuum cleaner 51. However, the present invention is not limited thereto, and various other techniques (for example, histogram of oriented gradient (HOG), Haar feature, Fems, local binary pattern (LBP), and modified census transform (MCT)) may be applied.

The position recognition unit 5240 may classify at least one descriptor into a plurality of groups according to a predetermined lower classification rule for each obtainment image, based on descriptor information obtained through the obtainment image of each position and may convert descriptors included in the same group into a lower representative descriptor according to a predetermined lower representative rule. As another example, the position recognition unit 5240 may classify all descriptors, obtained from obtainment images corresponding to a certain zone like a room, into a plurality of groups according to the predetermined lower classification rule and may convert descriptors included in the same group into a lower representative descriptor according to the predetermined lower representative rule.

The position recognition unit 5240 may calculate a feature distribution of each position through the above-described process. The feature distribution of each position may be referred to as a histogram or an n-dimensional vector. As another example, a learning module 143 may estimate an unknown current position on the basis of a descriptor which is calculated from each feature point without applying the predetermined lower classification rule or the predetermined lower representative rule.

Moreover, when a current position of the robotic vacuum cleaner 51 is changed to an unknown state for some reason such as position jumping, the position recognition unit 5240 may estimate the current position on the basis of data of a previously stored descriptor or a lower representative descriptor.

The position recognition unit 5240 obtains an obtainment image through the image obtainment unit 5140 at an unknown current position, and when various features such as lightings located on a ceiling, an edge, a corner, a blob, and a ridge included in the obtainment image are checked, the position recognition unit 5240 detects features from the obtainment image.

The position recognition unit 5240 converts position information (for example, a feature distribution of each position), which is a comparison target, into comparable information (a lower recognition feature distribution) according to a predetermined lower conversion rule, based on at least one piece of recognition descriptor information obtained from an obtainment image of the unknown current position. The position recognition unit 5240 may compare the feature distribution of each position with each recognition feature distribution to calculate similarity therebetween according to a predetermined lower comparison rule. The position recognition unit 5240 may calculate position-based similarity (probability) corresponding to each position and may determine a position, at which a highest probability is calculated, as a current position.

When a map is updated by the map generating unit 5220 in driving, the controller 5200 transmits updated information to the air cleaner 300 through the communication unit to allow a map stored in the air cleaner to be the same as a map stored in the robotic vacuum cleaner 51.

When a cleaning command is input, the driving controller 5230 controls the driving driver to move to a designated region of the cleaning zone and operates the cleaning unit to perform cleaning along with driving.

When a cleaning command corresponding to a plurality of regions is input, the driving controller 5230 allows cleaning to be performed by moving, based on whether a preferential region is sets or a designated order, and when a separate order is not designated, the driving controller 5230 allows cleaning to be performed by moving to a close region or an adjacent region on the basis of a distance with respect to a current position.

Moreover, when a cleaning command corresponding to an arbitrary region is input regardless of region division, the driving controller 5230 allows cleaning to be performed by moving a region included in the arbitrary region.

When a virtual wall is set, the driving driver 5230 determines a virtual wall to control the driving driver, based on a coordinate value input from the map generating unit 5220.

Although it is determined by the obstacle recognition unit 5210 that there is no obstacle, when the virtual wall is set, the driving controller 5230 recognizes that an obstacle is located at a corresponding position, and limits driving.

When a setting of the virtual wall is changed in driving, the driving controller 5230 determines a driving-enabled region and a driving-unable region and re-sets a driving path, based on a changed virtual wall setting.

The driving controller 5230 controls driving on the basis of one of a setting 1 for noise, a setting 2 for a driving path, a setting 3 for avoidance, and a setting 4 for security, based on an attribute set in the virtual wall.

Based on an attribute of the virtual wall, the driving controller 5230 may approach the virtual wall to perform a designated operation (the setting 2 for a driving path), decrease noise occurring in the body and perform cleaning, bypass the virtual wall without approaching the virtual wall by a certain distance or more and perform driving (the setting 3 for avoidance), and capture an image of a certain region with respect to the virtual wall (the setting 4 for security).

When cleaning performed on a designated region is completed, the controller 5200 stores a cleaning history in the data unit.

Moreover, the controller 5200 transmits an operating state or a cleaning state of the robotic vacuum cleaner 51 to the air cleaner through the communication unit at certain periods.

The air cleaner displays a position of the robotic vacuum cleaner on a screen of an executed application along with a map and outputs information about the cleaning state, based on data received from the robotic vacuum cleaner 51.

When information about an obstacle is added, the air cleaner may update a map on the basis of the received data.

When a cleaning command is input, the robotic vacuum cleaner determines a driving-enabled region and a driving-unable region to perform driving, based on information about a set virtual wall.

The sensor unit 5150 may include a camera. Also, the controller 5200 may control the camera to control an indoor space, and thus, may obtain an image obtained by photographing the indoor space.

The sensor unit 5150 may include at least one of a laser sensor, an ultrasonic sensor, an infrared sensor, and a camera. Also, the sensor unit 5150 may generate a map of the indoor space by using at least one of images captured by a laser beam, an ultrasonic wave, infrared light, and the camera.

Moreover, the sensor unit 5150 may include a temperature sensor for measuring a temperature of the indoor space, a first thermal sensor (for example, an infrared sensor) for sensing a body temperature of a user, and a second thermal sensor for sensing heat information such as heat occurring in an electronic product or an operating state of a gas stove or an electric stove.

Moreover, the sensor unit 5150 may include a microphone which receives a sound.

Moreover, the sensor unit 5150 may include a dust sensor which senses the amount of dust in air and a gas sensor which senses the amount of gas in air.

A first embodiment of the present invention will be described with reference to FIGS. 3 to 11. Here, the first embodiment relates to a method of performing optimal air cleaning on the basis of the type of an indoor space.

Figure 3:
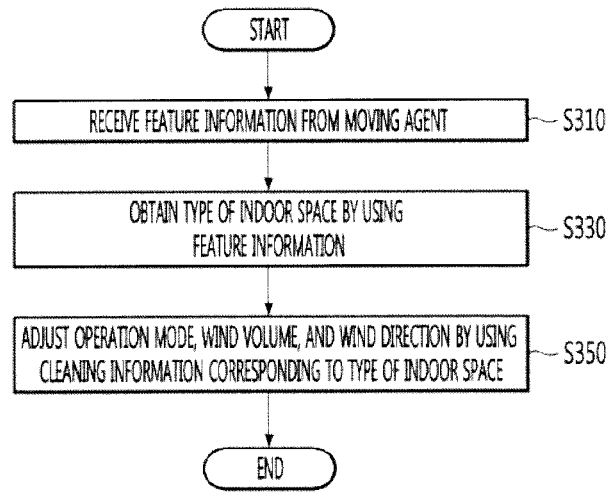
FIG. 3 is a diagram for describing an operating method of an air cleaner, according to a first embodiment of the present invention.

FIG. 3 is a diagram for describing an operating method of an air cleaner, according to a first embodiment of the present invention.

An operating method an air cleaner according to an embodiment of the present invention may include step S310 of receiving feature information collected by a moving agent and associated with a structure of an indoor space, step S330 of obtaining the type of the indoor space by using the received feature information, and step S350 of adjusting at least one of an operation mode, a wind volume, and a wind direction of the air cleaner on the basis of cleaning information corresponding to the type of the indoor space.

Before describing the present invention in detail, a problem which occurs due to various structures of an indoor space in performing an air cleaning operation will be described with reference to FIGS. 4A to 4D.

FIGS. 4A to 4D are diagrams for describing a problem which may occur due to various structures of an indoor space.

FIGS. 4A to 4D illustrate a plan view of a house. An indoor space described herein may be a whole space of a house including a living room and rooms.

However, the present invention is not limited, and an indoor space described herein may denote a space which air discharged from an air cleaner reaches due to direct current or convection current because the air cleaner is installed therein and the space is not divided by a wall or a door.

For example, as illustrated in FIGS. 4A to 4D, when an air cleaner 700 is installed in a living room of a house, an indoor space described herein may denote a living room and a kitchen.

Figure 4A:
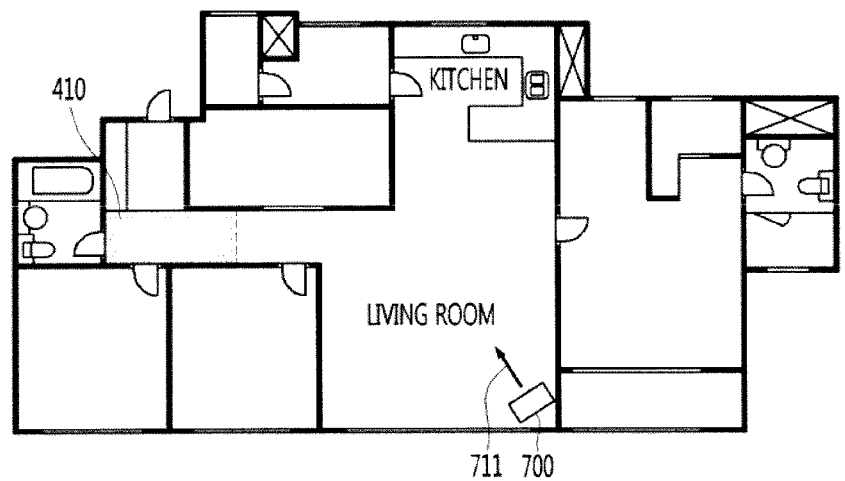

According to FIG. 4A, an indoor space (a living room and a kitchen) has a type where a left portion is long in a passageway type.

Moreover, considering a general position at which the air cleaner 700 is installed, a normal direction 711 (for example, a front direction) in which air discharged from the air cleaner 700 flows, and a distance to the air cleaner 700, the air discharged from the air cleaner 700 does not flow to an obliquely-striped region 410.

Figure 4B:
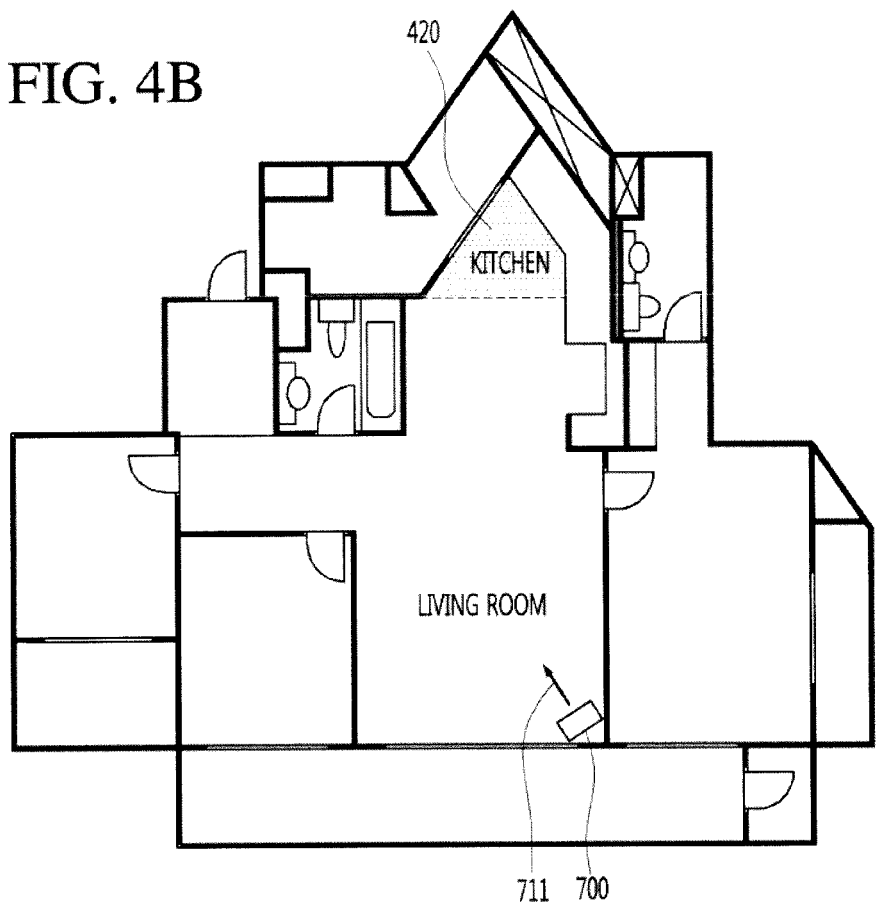

According to FIG. 4B, an indoor space (a living room and a kitchen) has a shape where a kitchen protrudes upward.

Moreover, considering a general position at which the air cleaner 700 is installed, a normal direction 711 (for example, a front direction) in which air discharged from the air cleaner 700 flows, and a distance to the air cleaner 700, the air discharged from the air cleaner 700 does not flow to an obliquely-striped region 420.

As described above, a region which air discharged from the air cleaner 700 does not reach due to direct current or convection current because of a structure of an indoor space may be referred to as a cleaning-vulnerable zone. The cleaning-vulnerable zone may be determined through an actual experiment or simulation in a structure of a corresponding indoor space.

Moreover, since air discharged from the air cleaner 700 does not reach the cleaning-vulnerable zone, the air quality of the cleaning-vulnerable zone may be worse than that of another region while the air cleaner 700 is driving.

A house of FIG. 4C has an indoor space (a living room and a kitchen) which is far wider than a house of each of FIGS. 4A and 4B.

Moreover, an obliquely-striped region 430 may be a region where family members sit and eat together, and it is required for air cleaning to be well performed.

As described above, in an indoor space, a region which air discharged from the air cleaner 700 should reach due to direct current or convection current may be referred to as a main cleaning zone.

The main cleaning zone may be determined based on position information about users in a structure of a corresponding indoor space.

Moreover, air discharged from the air cleaner 700 reaches the main cleaning zone well, and thus, the main cleaning zone should have air quality which is better than another region when the air cleaner 700 is driving.

Here, air quality may depend on the amount of dust in air. That is, air quality being good may denote that the amount of dust in air is low, and air quality being bad may denote that the amount of dust in air is high.

However, in the house of FIG. 4C, since an area of an indoor space is very wide, a problem where cleaning is not smoothly performed on the main cleaning zone may occur.

Figure 4D:
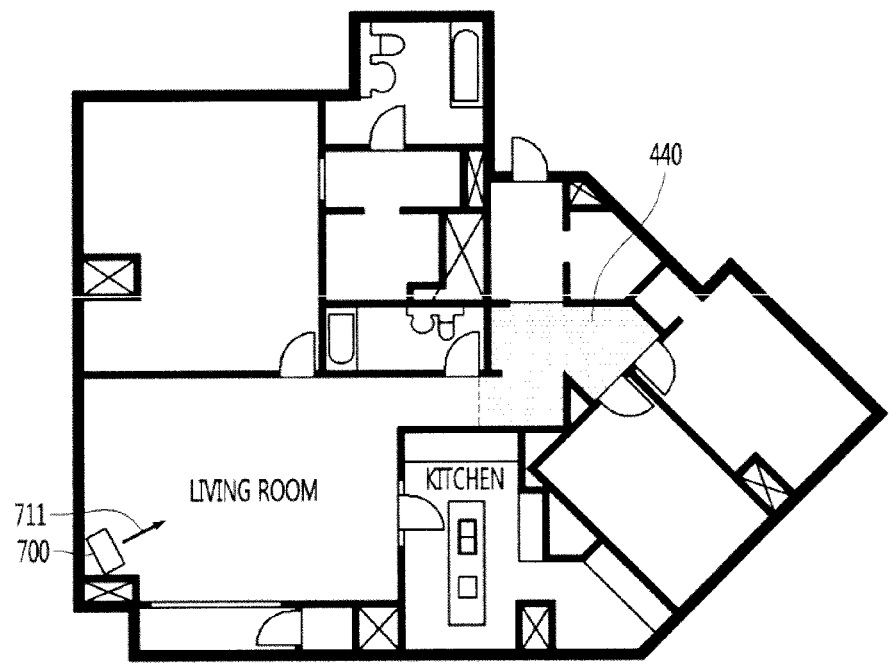

In a house of FIG. 4D, a living room and a kitchen are divided by a wall and a door, and an air cleaner 700 is installed in the living room. Therefore, in the house of FIG. 4, an indoor space may denote the living room.

The indoor space of the house illustrated in FIG. 4D has a structure where a right portion is wiggly.

Moreover, considering a general position at which the air cleaner 700 is installed, a normal direction 711 (for example, a front direction) in which air discharged from the air cleaner 700 flows, and a distance to the air cleaner 700, the air discharged from the air cleaner 700 does not flow to an obliquely-striped region 440.

Therefore, the air quality of the obliquely-striped region 440 may be degraded, causing a problem where the average air quality of the whole indoor space is degraded.

Figure 5A:
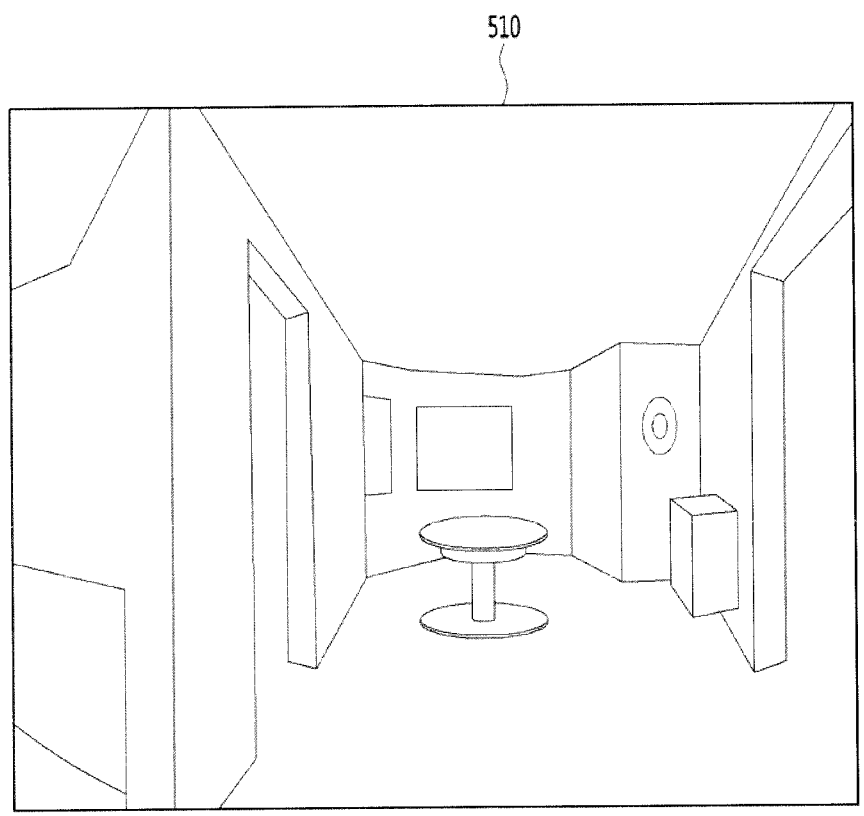
FIGS. 5A to 5C are diagrams for describing feature information according to an embodiment of the present invention.
Figure 5B:
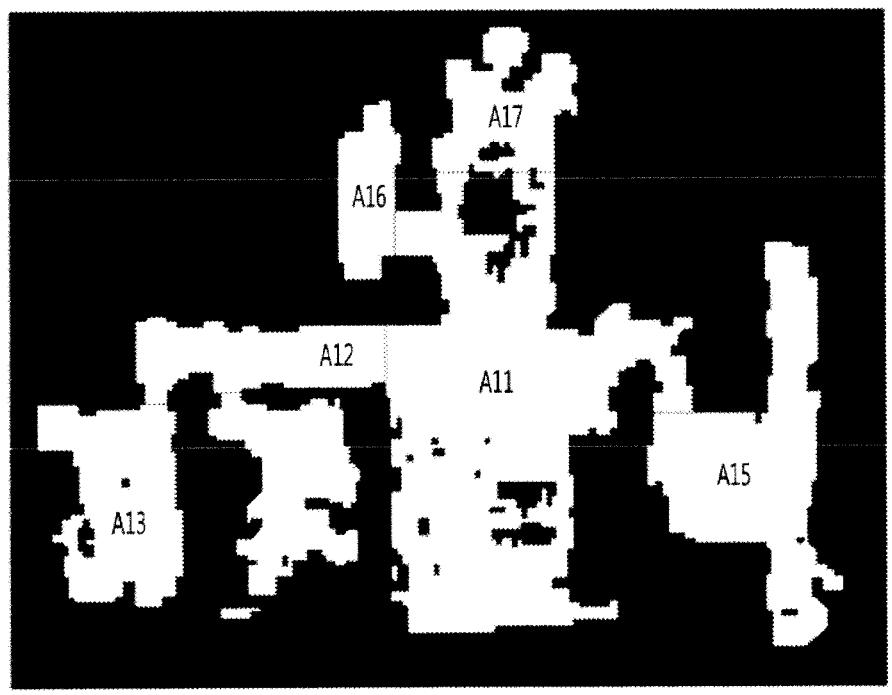
Figure 5C:

FIGS. 5A to 5C are diagrams for describing feature information according to an embodiment of the present invention.

A moving agent may collect information for generating a map of the indoor space while moving an indoor space.

For example, as illustrated in FIG. 5A, a moving agent may capture a plurality of images 510 with a camera while moving an indoor space. However, an image is merely an example of information for generating a map of the indoor space and may collect sensing information for generating the map of the indoor space by using a laser beam, infrared light, and an ultrasonic wave.

The moving agent may obtain an image by photographing an air cleaner disposed in the indoor space.

The moving agent may generate the map of the indoor space by using the collected information.

For example, as illustrated in FIG. 5B, a moving agent may generate a map including a contour line of an indoor space. In this case, a map may be divided into a plurality of zones A11 to A17 (for example, a living room, a room 1, and a room 2).

The moving agent may obtain an image by photographing an air cleaner disposed in the indoor space and may display a position and a direction of the air cleaner on the map on the basis of the image obtained by photographing the air cleaner.

The map of the indoor space may include a processed map.

In detail, the moving agent may generate a processed map by simplifying a structure of the indoor space on the basis of the map of the indoor space, so as to recognize the structure of the indoor space.

In more detail, as illustrated in FIG. 5C, the moving agent may simplify a shape of a region to readjust an obstacle or to linearize a wall.

The moving agent may display a position and a direction of the air cleaner on the processed map.

A controller 5200 of the moving agent may transmit feature information, associated with the structure of the indoor space, to an air cleaner 700 through a communication unit 5270. Here, the feature information may include information collected through a sensor unit 5150 for generating the map of the indoor space, a map generated by using the information collected through the sensor unit 5150, or a processed map generated by simplifying the structure of the indoor space.

A processor 780 of the air cleaner 700 may receive, through a communication unit 710, feature information obtained by the moving agent and associated with the structure of the indoor space.

When information collected for generating the map of the indoor space is received as feature information, the processor 780 of the air cleaner 700 may generate the map of the indoor space by using the information collected for generating the map of the indoor space. In this case, the above-described method of generating, by the moving agent, a map may be used.

Figure 6:
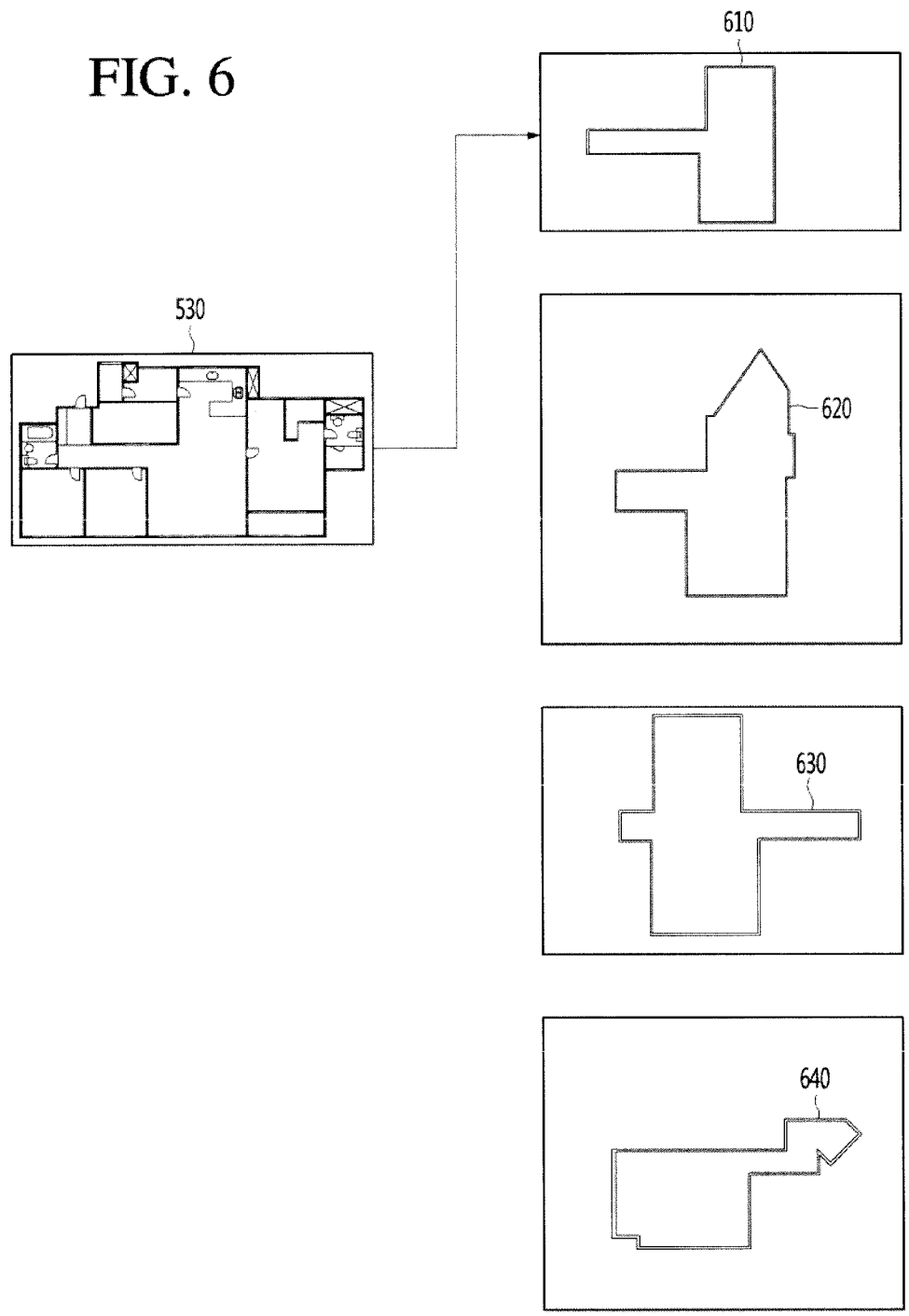
FIGS. 6, 7A and 7B are diagrams for describing a method of obtaining the type of an indoor space by using feature information, according to an embodiment of the present disclosure.

FIGS. 6 and 7 are diagrams for describing a method of obtaining the type of an indoor space by using feature information, according to an embodiment of the present disclosure.

A processor 780 of an air cleaner 700 may obtain the type of an indoor space by using feature information.

Referring to FIG. 6 in detail, types 610 to 640 of a plurality of indoor spaces may be stored in a memory of the air cleaner 700. Here, the types 610 to 640 of the plurality of indoor spaces may have different structures (areas, boundaries, shapes, etc.).

Moreover, the processor 780 of the air cleaner 700 may compare a structure (an area, a boundary, a shape, etc.) of a map of an indoor space 530 with the structures (areas, boundaries, shapes, etc.) of the types 610 to 640 of the plurality of indoor spaces to select the type 610 having a structure which is most similar to a structure of a corresponding indoor space.

In a case which obtains the type of an indoor space by using feature information, the processor 780 of the air cleaner 700 may obtain the type of the indoor space on the basis of a position and a direction of the air cleaner.

In detail, the types 610 to 640 of the plurality of indoor spaces may be stored in the memory of the air cleaner 700. Here, the types 610 to 640 of the plurality of indoor spaces may have different structures (areas, boundaries, shapes, etc.) and different positions and directions of virtual air cleaners disposed in the types 610 to 640 of the plurality of indoor spaces.

Moreover, a map of an indoor space may include information about a position and a direction of an air cleaner.

Moreover, the processor 780 of the air cleaner 700 may compare a structure (an area, a boundary, a shape, etc.) of a map of an indoor space, a position and a direction of an air cleaner, the structures (areas, boundaries, shapes, etc.) of the types 610 to 640 of the plurality of indoor spaces, and a position and a direction of a virtual air cleaner to select a type of an indoor space which is most similar to a structure of a corresponding indoor space and a position and a direction of a corresponding air cleaner.

A process of obtaining a type of an indoor space may be performed by machine learning. This will be described below with reference to FIGS. 7A and 7B.

Artificial intelligence (AI), which is a field of computer engineering and information technology to study how to enable a computer to think, learn, make self-development, etc. Which may be done with human intelligence, refers to allowing a computer to imitate intelligent behaviors of human beings.

In addition, AI does not exist as-is but is directly or indirectly related to other fields of computer science. Particularly in modern times, attempts are being actively made to introduce AI elements in various fields of information technology and use them to solve problems in those fields.

The machine learning is the field of AI and is the field of research for assigning an ability to learn without an explicit program in a computer.

In detail, the machine learning may denote a system which learns based on empirical data, performs prediction, and enhances performance and technology which researches and generates an algorithm for the system. Algorithms of the machine learning uses a method of generating a specific model for obtaining prediction or decision on the basis of input data, instead of executing static program instructions which are strictly defined.

The term "machine learning" may be used as the term "machine learning".

A number of machine learning algorithms have been developed on a method of classifying data in machine learning. Examples of the machine learning algorithms may include decision tree, Bayesian network, support vector machine (SVM), and artificial neural network (ANN).

The decision tree is an analysis method which schematizes a decision rule into a tree structure and performs classification and prediction.

The Bayesian network is a model which expresses a stochastic relationship (conditional independence) between a plurality of variables as a graph structure. The Bayesian network is suitable for data mining based on unsupervised learning.

The SVM may be a model of supervised learning for pattern recognition and material analysis and may be mainly used for classification and regression.

The ANN may be implemented by modeling the operation principle of biological neuron and a connection relationship between neurons and may be an information processing system where a plurality of neurons called nodes or processing elements are connected to one another in the form of a layer structure.

The ANN may be a model used for machine learning and may be a statistical learning algorithm which gets inspiration from a neural network (for example, brains in a central nervous system of animals) of biology in machine learning and cognitive science.

In detail, the ANN may denote all models where an artificial neuron (a node) where a network is formed through a combination of synapses varies a combination strength of synapses through learning, thereby obtaining an ability to solve problems.

The term "ANN" may be referred to as "neural network".

The ANN may include a plurality of layers, and the plurality of layers may each include a plurality of neurons. Also, the ANN may include a synapse connecting a neuron to another neuron.

The ANN may be generally defined by the following factors: (1) a connection pattern between neurons of a different layer; (2) a learning process of updating a weight of a connection; and (3) an activation function of calculating a weighted sum of inputs received from a previous to generate an output value.

The ANN may include network models such as a deep neural network (DNN), a recurrent neural network (RNN), a bidirectional recurrent deep neural network (BRDNN), a multilayer perceptron (MLP), and a convolutional neural network (CNN), but is not limited thereto.

In this specification, the term "layer" may be referred to as "layer".

The ANN may be categorized into single layer neural networks and multilayer neural networks, based on the number of layers.

General single layer neural networks may be configured with an input layer and an output layer.

Moreover, general multilayer neural networks may be configured with an input layer, a hidden layer, and an output layer.

The input layer may be a layer which receives external material, and the number of neurons of the input layer may be the same the number of input variables, and the hidden layer may be located between the input layer and the output layer and may receive a signal from the input layer to extract a characteristic from the received signal and may transfer the extracted characteristic to the output layer. The output layer may receive a signal from the hidden layer and may output the received signal to the outside. An input signal between neurons may be multiplied by each connection strength having a value between zero and one, and values obtained through the multiplication may be summated. When a sum is greater than a threshold value of a neuron, the neuron may be activated and may be implemented as an output value through an activation function.

The DNN including a plurality of hidden layers between an input layer and an output layer may be a representative ANN which implements deep learning which is a type of machine learning technology.

The term "deep learning" may be referred to as "deep learning".

The ANN may be trained by using training data. Here, training may denote a process of determining a parameter of the ANN, for achieving purposes such as classifying, regressing, or clustering input data. A representative example of a parameter of the ANN may include a weight assigned to a synapse or a bias applied to a neuron.

An ANN trained based on training data may classify or cluster input data, based on a pattern of the input pattern.

In this specification, an ANN trained based on training data may be referred to as a trained model.

Next, a learning method of an ANN will be described.

The learning method of the ANN may be largely classified into supervised learning, unsupervised learning, semi-supervised learning, and reinforcement learning.

The supervised learning may be a method applied to machine learning for analogizing one function from training data.

Moreover, in analogized functions, a function of outputting continual values may be referred to as regression, and a function of predicting and outputting a class of an input vector may be referred to as classification.

In the supervised learning, an ANN may be trained in a state where a label of training data is assigned.

Here, the label may denote a right answer (or a result value) which is inferred by an ANN when training data is input to the ANN.

In this specification, a right answer (or a result value) which is inferred by an ANN when training data is input to the ANN may be referred to as a label or labeling data.

Moreover, in this specification, a process of assigning a label to training data for learning of an ANN may be referred to as a process which labels labeling data to training data.

In this case, training data and a label corresponding to the training data may configure one training set and may be input to an ANN in the form of training sets.

Training data may represent a plurality of features, and a label being labeled to training data may denote that a label is assigned to a feature represented by the training data. In this case, the training data may represent a feature of an input object as a vector type.

An ANN may analogize a function corresponding to an association relationship between training data and labeling data by using the training data and the labeling data. Also, the ANN may evaluate the analogized function to determine (optimize) a parameter of the ANN.

The unsupervised learning may be a type of machine learning, and in this case, a label may not be assigned to training data.

In detail, the unsupervised learning may be a learning method of training an ANN so as to detect and classify a pattern from training data itself, rather than an association relationship between the training data and a label corresponding to the training data.

Examples of the unsupervised learning may include clustering and independent component analysis.

In this specification, the term "clustering" may be referred to as "clustering".

Examples of an ANN using the unsupervised learning may include a generative adversarial network (GAN) and an autoencoder (AE).

The GAN may be a method of improving performance through competition between two different AIs (for example, a generator and a discriminator).

In this case, the generator may be a model which creates new data and may generate new data, based on original data.

Moreover, the discriminator may be a model which recognizes a pattern of data and may determine whether the authenticity or not of the new data generated by the generator based on the original data.

Moreover, the generator may receive and learn data which does not deceive the discriminator, and the discriminator may receive and learn deceived data from the generator. Therefore, the generator may evolve so as to deceive the discriminator as much as possible and may evolve so as to distinguish discriminator original data from data generated by the generator.

The AE may be a neural network for reproducing an input as an output.

The AE may include an input layer, a hidden layer, and an output layer, and input data may pass through the input layer and may enter the hidden layer.

In this case, the number of node of the hidden layer may be smaller than the number of nodes of the input layer, and thus, a dimension of data may be reduced, whereby compression or encoding may be performed.

Moreover, data output from the hidden layer may enter the output layer. In this case, the number of nodes of the output layer may be larger than the number of nodes of the hidden layer, and thus, a dimension of the data may increase, and thus, decompression or decoding may be performed.

The AE may control the connection strength of a neuron through learning, and thus, input data may be expressed as hidden layer data. In the hidden layer, information may be expressed by using a smaller number of neurons than those of the input layer, and input data being reproduced as an output may denote that the hidden layer detects a hidden pattern from the input data and expresses an output.

The semi-supervised learning may be a type of machine learning and may denote a learning method which uses training data with a label assigned thereto and training data with no label assigned thereto.

As a type of semi-supervised learning technique, there is a technique which infers a label of training data with no label assigned thereto and performs learning by using the inferred label, and such a technique may be usefully used for a case where the cost expended in labeling is large.

The reinforcement learning may be a theory where, when an environment where an agent is capable of determining an action to take at every moment is provided, the best way is obtained through experience without data.

The reinforcement learning may be performed by a Markov decision process (MDP).

To describe the MDP, an environment where a plurality of information needed for taking a next action of an agent may be first provided, an action which is to be taken by the agent in the environment may be second defined, a reward provided based on a good action of the agent and a penalty provided based on a poor action of the agent may be third defined, and an optimal policy may be fourth derived through experience which is repeated until a future reward reaches a highest score.

In the ANN, a structure may be characterized by a configuration of a model, an activation function, a loss function or a cost function, a learning algorithm, an optimization algorithm, a hyper parameter may be previously set, and a model parameter may be set through learning subsequently, whereby content may be characterized.

For example, factors for determining the structure of the ANN may include the number of hidden layers, the number of hidden nodes included in each of the hidden layers, an input feature vector, and a target feature vector.

The hyper parameter includes several parameters which should be initially set for learning like an initial value of the model parameter. Also, the model parameter includes several parameters which are to be determined through learning.

For example, the hyper parameter may include an inter-node weight initial value, an inter-node bias initial value, a mini-batch size, a learning repetition number, and a learning rate. Also, the model parameter may include an inter-node weight and an inter-node bias.

The loss function may be used as an index (a criterion) for determining an optimal model parameter in a learning process of the ANN. In the ANN, learning may denote a process of adjusting model parameters so as to decrease the loss function, and the purpose of learning may be for determining a model parameter for minimizing the loss function.

The loss function may use a mean squared error (MSE) or a cross entropy error (CEE), and the present invention is not limited thereto.

The CEE may be used in a case where one-hot encoding is performed on an answer label. The one-hot encoding is an encoding method which sets an answer label value to 1 in a neuron corresponding to an answer and sets an answer label value to 0 in a neuron which is not an answer.

The machine learning or the deep learning may use a learning optimization algorithm so as to minimize the loss function, and examples of the learning optimization algorithm includes gradient descent (GD), stochastic gradient descent (SGD), momentum, Nesterov accelerate gradient (NAG), Adagrad, AdaDelta, RMSProp, Adam, and Nadam.

The GD is a technique for adjusting a model parameter in a direction for decreasing a loss function value on the basis of a slope of the loss function in a current state.

A direction for adjusting a model parameter is referred to as a step direction, and an adjusted size is referred to as a step size.

In this case, the step size may denote a learning rate.

The GD may partial differentiate the loss function into each model parameter to obtain a slope and may change the model parameters by a learning rate in an obtained slope direction to cause an update.

The SGD is a technique which divides learning data into mini-batches and performs the GD on each of the mini-batches to increase a frequency of SD.

Each of the Adagrad, the AdaDelta, and the RMSProp is a technique which adjusts a step size to increase an accuracy of optimization. In the SGD, each of the momentum and the NAG is a technique which adjusts a step direction to increase an accuracy of optimization. The Adam is a technique which combines the momentum and the RMSProp to adjust a step size and a step direction, thereby increasing an accuracy of optimization.

A learning speed and accuracy of the ANN is greatly based on the hyper parameter as well as a structure of the ANN and a learning optimization algorithm. Therefore, in order to obtain a good training model, it is important to set a suitable hyper parameter in addition to determining a suitable structure of the ANN and a suitable learning algorithm.

Generally, the hyper parameter is experimentally set to various values, and the ANN is trained. By performing such a process, the hyper parameter is set to an optimal value for a stable learning speed and an accuracy, based on a learning result.

Training of the ANN may be performed by a separate training device as well as the air cleaner 700.

In this case, the training device may repeatedly train an ANN 650 by using various learning techniques described above, and thus, may determine optimized model parameters of the ANN 650.

Herein, an ANN may be trained by using training data, and a parameter-determined ANN may be referred to as a training model or a trained model.

In this case, the training model may infer a result value in a state which is equipped in a training device of an ANN, or may be equipped in the air cleaner 700.

The ANN 650 may be implemented with hardware, software, or a combination thereof. When a portion or all of the ANN 650 is implemented with software, one or more instructions configuring the ANN 650 may be stored in a memory 770 of the air cleaner 700.

Moreover, when a training model is updated, an updated training model may be transmitted to and equipped in the air cleaner 700.

Hereinafter, a method training a neural network on the basis of supervised learning will be described.

Herein, a map generated from sensing information collected by a moving agent may be used as training data, and a type of an indoor space may be input as a label to a neural network along with the map.

In detail, a training device may train the neural network by using the map generated from the sensing information collected by the moving agent and a type of an indoor space corresponding to the map.

For example, it is assumed that an A map is generated by using sensing information collected from an indoor space having an A type having a specific structure. In this case, a training device may train a neural network by using the A map and the A type labeled on the A map.

In this manner, various maps and types of indoor spaces may be input to the neural network as training data.

In this case, the training device may repeatedly train the neural network by using the supervised learning.

In this case, the neural network may infer a function corresponding to correlation between a map and a type of an indoor space corresponding to the map. Also, the neural network may determine (optimize) a parameter of the neural network on the basis of evaluation of the inferred function.

Therefore, when new input data (map) is received, the trained neural network may classify the new input data (map).

Hereinafter, a method of training a neural network on the basis of unsupervised learning will be described.

The unsupervised learning may be a learning method of training an ANN so as to detect a pattern from training data and classify the pattern. Also, clustering may denote a process of clustering feature vectors, obtained from the ANN, into a finite number of clusters.

A training device may train a neural network so that maps having similar structures configure one cluster by using various maps as training data.

Moreover, a cluster may be provided in plurality, and one cluster may represent a specific type of an indoor space. For example, a first cluster may correspond to an indoor space having an A type, and a second cluster may correspond to an indoor space having a B type.

Therefore, when new input data (map) is received, the trained neural network may cluster the new input data (map) according to a type.

A map used as training data may include information about a position and a direction of an air cleaner.

Since learning is performed by using the training data, a parameter-determined ANN may be referred to as a training model or a trained model.

Moreover, a training model described herein may denote a neural network which is trained by using feature information obtained from a moving agent.

The training model may be equipped in an air cleaner 700.

Moreover, the training model may be implemented with hardware, software, or a combination thereof. When a portion or all of the training model is implemented with software, one or more instructions configuring the training model may be stored in a memory 770 of the air cleaner 700.

A processor 780 of the air cleaner 700 may obtain a type of an indoor space by using feature information.

In detail, the processor 780 may input a map, generated by using sensing information collected by a moving agent, to the training model.

Moreover, the training model receiving the feature information may output (classify) or cluster a type of an indoor, and thus, a type of an indoor space where a moving agent and an air cleaner may be obtained.

Figure 7A:
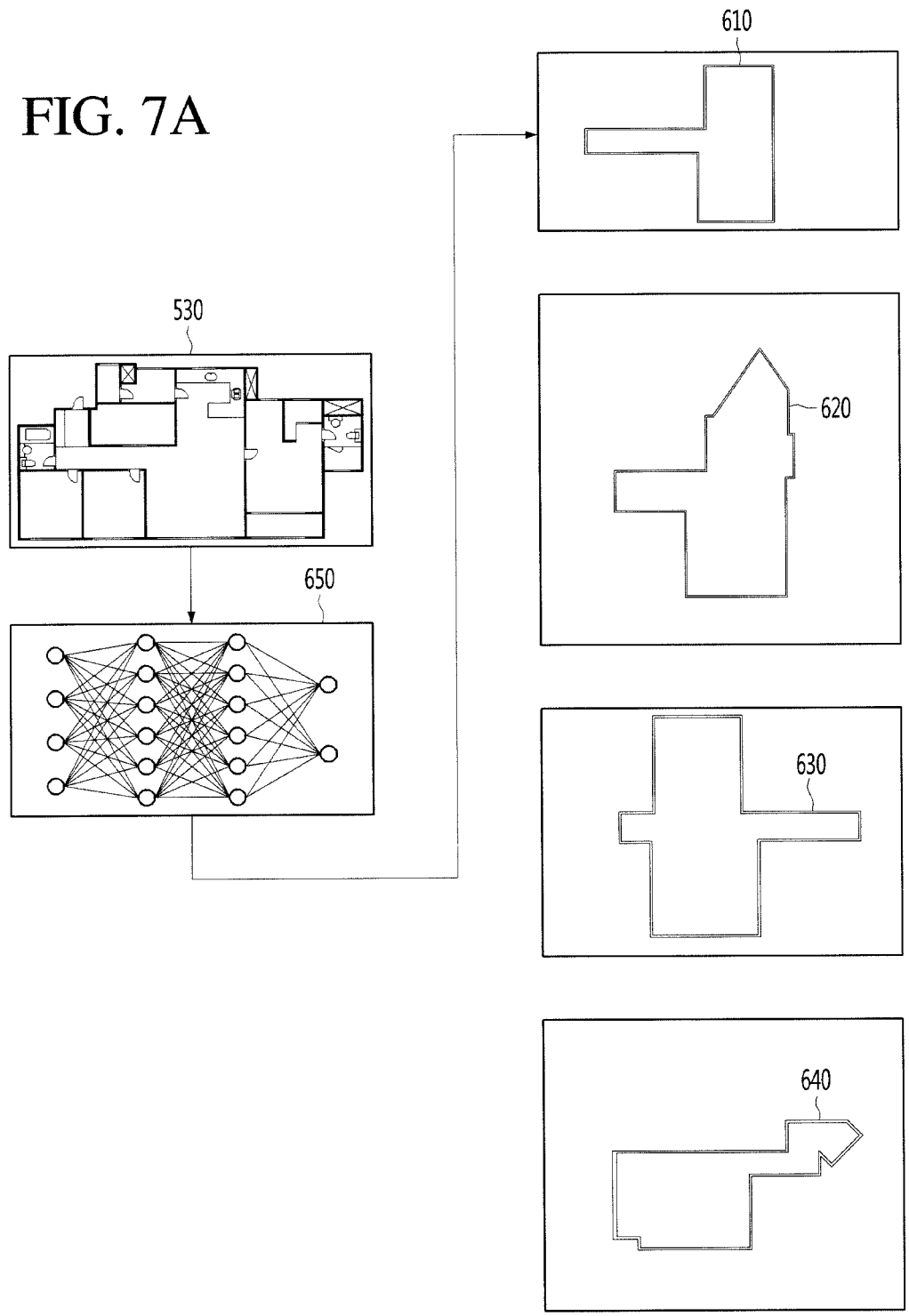
Figure 7B:
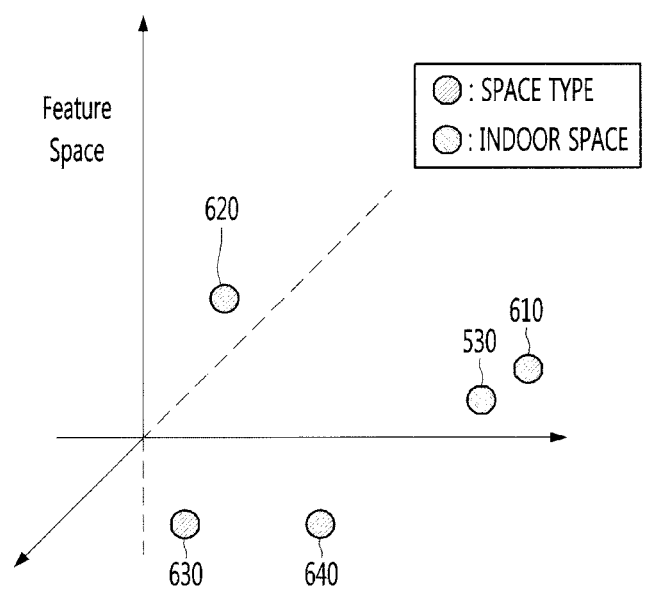

For example, as illustrated in FIGS. 7A and 7B, a training model 650 may receive a map of an indoor space 530 and may cluster the map of the indoor space 530 into a type 610 of a distance which is most similar to a structure of the indoor space 530.

A method of determining a type of an indoor space described above with reference to FIGS. 6 and 7 may be performed by a server.

In detail, the processor of the air cleaner 700 may communicate with the server through a communication unit.

Moreover, the processor of the air cleaner may transmit feature information to the server.

In this case, the server may obtain a type of an indoor space by using the feature information. In this case, a method of obtaining, by the air cleaner, a type of an indoor space may be applied to the server.

For example, the server may include a memory which stores types of a plurality of indoor spaces. Also, a process of the server may compare a structure of a map of the indoor with structures of the types of the plurality of indoor spaces to select a type having a structure, which is most similar to the structure of the indoor space, from among the types of the plurality of indoor spaces.

As another example, a training model may be equipped in the server. Also, the processor of the server may input the feature information to a training model to obtain the type of the indoor space.

When the type of the indoor space is obtained, the server may transmit the type of the indoor space to the air cleaner 700.

The memory of the air cleaner 700 may store a plurality of cleaning information respectively corresponding to types of a plurality of indoor spaces.

Moreover, the processor of the air cleaner 700 may control a cleaning operation by using cleaning information corresponding to a type of an indoor space from among the plurality of cleaning information respectively corresponding to the types of the plurality of indoor spaces.

The cleaning operation may be a setting value of the air cleaner for enabling the air quality of an indoor space to quickly reach target air quality, based on a structure of the indoor space.

In detail, air discharged from the air cleaner circulates in an indoor space, and a method of circulating in an indoor space differs for each of structures of indoor spaces. Therefore, a setting value of the air cleaner which is best for cleaning an indoor space may differ for each of structures of indoor spaces.

Therefore, a plurality of cleaning information respectively corresponding to types of a plurality of indoor spaces may each be a setting value of the air cleaner which enables optimal cleaning to be performed on a corresponding type of an indoor space.

Cleaning information (i.e., setting values of an air cleaner) is listed in the following Table 1.

TABLE 1

| | Wind Volume | Wind Direction | Operation Mode |
|---|---|---|---|
| Type A | maximum | up-down: 120 degrees<br>left-right: 150 degrees | normal driving mode |
| Type B | high | up-down: 90 degrees<br>left-right: 105 degrees | flow conversion mode |
| Type C | medium | up-down: 80 degrees<br>left-right: 70 degrees | flow conversion mode |
| Type D | low | up-down: 110 degrees<br>left-right: 90 degrees | flow conversion mode |

That is, cleaning information may include at least one of a wind volume, a wind direction, and an operation mode of an air cleaner. Cleaning information corresponding to a type of an indoor space may be previously determined and stored in a memory.

For example, a setting value of the air cleaner optimal for the type A may be determined based on an actual experiment, a simulation, a reinforcement learning-based neural network, and a recurrent neural network (RNN) algorithm. Also, a setting value of the air cleaner optimal for the type A may be cleaning information corresponding to the type A and may be stored in a memory.

The cleaning information may be set to achieve various purposes. This will be described below with reference to FIGS. 8 to 10B.

FIGS. 8 to 10B are diagrams for describing cleaning information based on various purposes.

Figure 8:
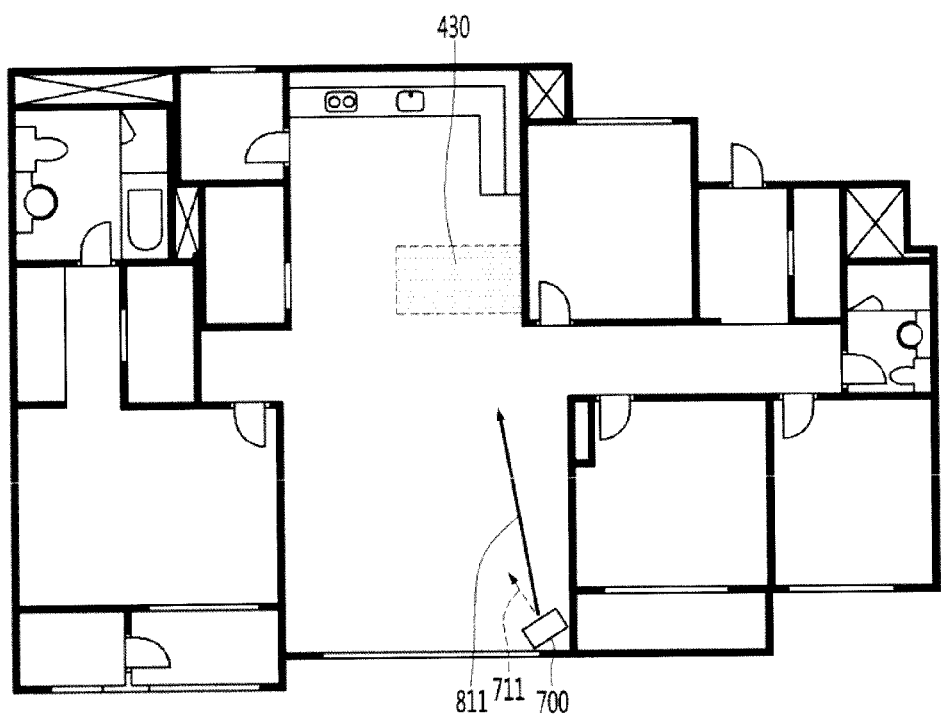
FIGS. 8 to 10B are diagrams for describing cleaning information based on various purposes.

Referring to FIG. 8, cleaning information may be a setting value of an air cleaner for more quickly enhancing the air quality of a main cleaning zone of an indoor space than the air quality of another zone of the indoor space, based on a structure of the indoor space.

In detail, an obliquely-striped region 430 may be a region where family members sit and eat together, and it is required for air cleaning to be well performed. Such a region may be referred to as a main cleaning zone.

The cleaning information may be a setting value of the air cleaner, which more quickly enhances the air quality of a main cleaning zone than the air quality of another zone because air discharged from the air cleaner 700 more quickly reaches the main cleaning zone than another zone due to direct current or convection current.

Moreover, the air quality of the main cleaning zone in a case (for example, discharging air by a wind volume in a wind direction as in an arrow 811) where the air cleaner 700 operates based on cleaning information may be better than the air quality of the main cleaning zone in a case (for example, discharging air by a wind volume in a wind direction as in an arrow 711) where the air cleaner 700 operates regardless of the cleaning information.

In other words, the amount of dust of the main cleaning zone in a case where the air cleaner 700 operates based on cleaning information may be less than the amount of dust of the main cleaning zone in a case where the air cleaner 700 operates regardless of the cleaning information.

The processor 780 of the air cleaner 700 may adjust at least one of an operation mode, a wind volume, and a wind direction by using a type of an indoor space.

In detail, the processor 780 may adjust at least one of the operation mode, the wind volume, and the wind direction of the air cleaner on the basis of cleaning information (a setting value of the air cleaner) corresponding to a type of an indoor space from among a plurality of cleaning information.

Moreover, the processor 780 may control at least one of a fan motor and a flow conversion device, for adjusting at least one of the operation mode, the wind volume, and the wind direction of the air cleaner.

For example, the processor 780 may control an operation of the flow conversion device on the basis of an operation mode included in the cleaning information. Also, as an operation of the flow conversion device is controlled, the operation mode of the air cleaner 780 may be adjusted.

For example, the processor 780 may control the flow conversion device in order for the air cleaner to operate in a normal driving mode (a first driving mode), or may control the flow conversion device in order for the air cleaner to operate in a flow conversion mode (a second driving mode). The normal driving mode (the first driving mode) and the flow conversion mode (the second driving mode) will be described below in detail.

In this case, an adjusted operation mode may be the same as the operation mode included in the cleaning information.

Moreover, the processor 780 may control at least one operation of the fan motor 750 and the flow conversion device on the basis of a wind volume of the cleaning information. Also, as an operation of the fan motor 750 is controlled, a wind volume of the air cleaner 780 may be adjusted. In this case, the adjusted wind volume may be the same as information about the wind volume included in the cleaning information.

Moreover, the processor 780 may control an operation of the flow conversion device on the basis of a wind direction of the cleaning information. Also, as an operation of the flow conversion device is controlled, a wind direction of the air cleaner 780 may be adjusted. In this case, the adjusted wind direction may be the same as information about the wind direction included in the cleaning information.

Figure 9:
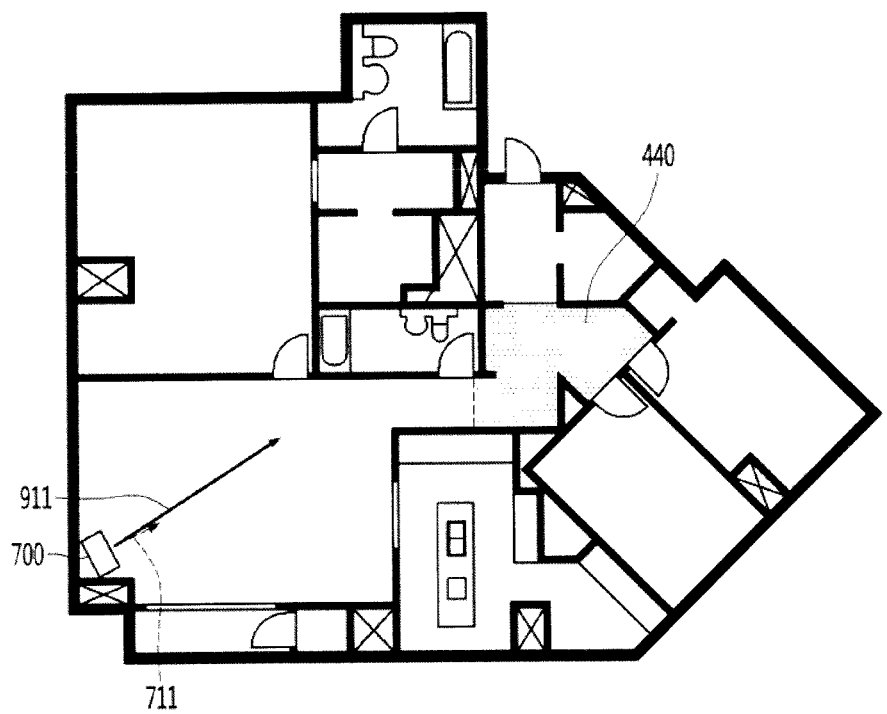

Referring to FIG. 9, the cleaning information may be a setting value of the air cleaner for enabling the average air quality of an indoor space to quickly reach target air quality, based on a structure of the indoor space.

In detail, considering a general position at which the air cleaner 700 is installed, a normal direction 711 (for example, a front direction) in which air discharged from the air cleaner 700 flows, and a distance to the air cleaner 700, the air discharged from the air cleaner 700 does not flow to an obliquely-striped region 440.

Therefore, the air quality of the obliquely-striped region 440 may be degraded, causing a problem where the average air quality of the whole indoor space is degraded.

Therefore, the cleaning information may be setting information about the air cleaner, which quickest enhances the average air quality of the whole indoor space by circulating air discharged from the air cleaner 700.

For example, the average air quality of the indoor space in a case (for example, discharging air by a wind volume in a wind direction as in an arrow 911) where the air cleaner 700 operates based on the cleaning information may be better than the average air quality of the indoor space in a case (for example, discharging air by a wind volume in a wind direction as in an arrow 711) where the air cleaner 700 operates regardless of the cleaning information.

The cleaning information may be a setting value of the air cleaner for decreasing a difference between the air quality of a cleaning-vulnerable zone of the indoor space and the air quality of another zone of the indoor space on the basis of a structure of the indoor space.

Figure 10A:
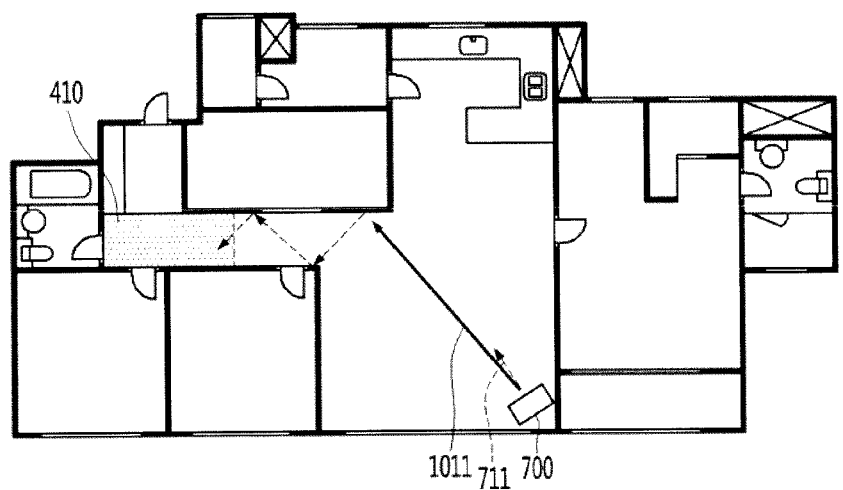

In detail, referring to FIG. 10A, an indoor space (a living room and a kitchen) is a type where a left portion is long in a passageway type.

Moreover, considering a general position at which the air cleaner 700 is installed, a normal direction 711 (for example, a front direction) in which air discharged from the air cleaner 700 flows, and a distance to the air cleaner 700, the air discharged from the air cleaner 700 does not flow to an obliquely-striped region 410.

Figure 10B:
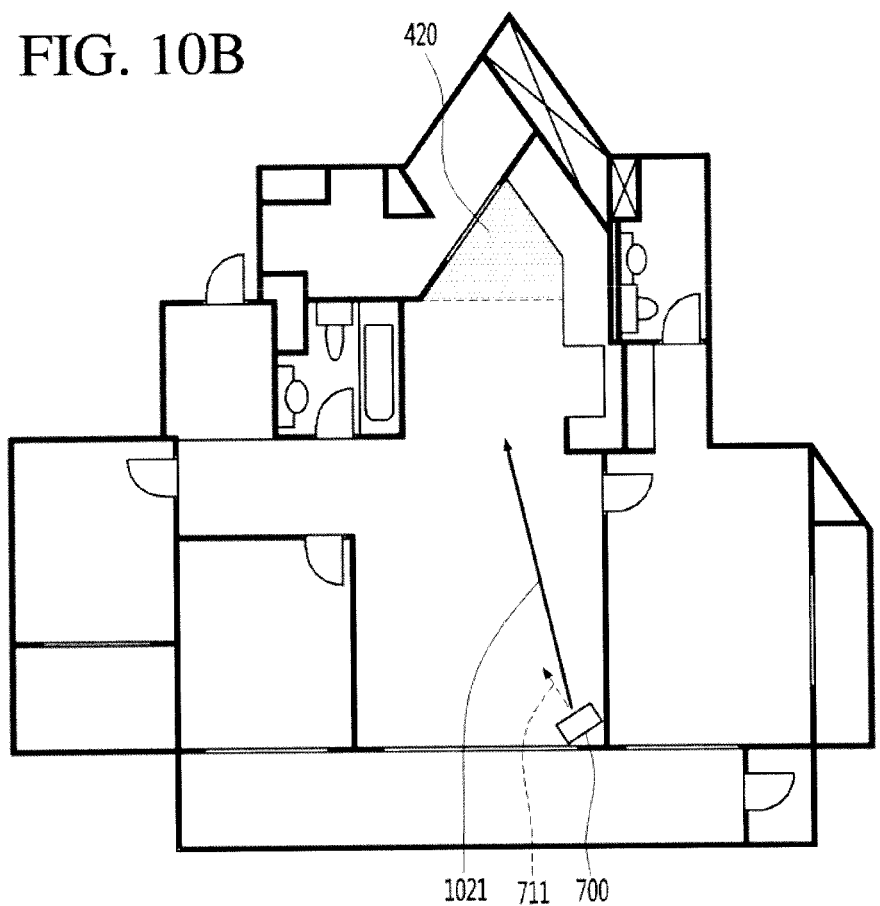

Moreover, according to FIG. 10B, an indoor space is a type where a kitchen protrudes upward.

Moreover, considering a general position at which the air cleaner 700 is installed, a normal direction 711 (for example, a front direction) in which air discharged from the air cleaner 700 flows, and a distance to the air cleaner 700, the air discharged from the air cleaner 700 does not flow to an obliquely-striped region 420 (a kitchen).

As described above, a region which air discharged from the air cleaner 700 does not reach due to direct current or convection current because of a structure of the indoor space may be referred to as a cleaning-vulnerable zone.

Moreover, since air discharged from the air cleaner 700 does not reach the cleaning-vulnerable zone, the air quality of the cleaning-vulnerable zone may be worse than that of another region while the air cleaner 700 is driving.

Moreover, the cleaning information may be a setting value of the air cleaner, which more quickly enhances the air quality of the cleaning-vulnerable zone than the air quality of another zone because air discharged from the air cleaner 700 better reaches the cleaning-vulnerable zone than another zone due to direct current or convection current.

Therefore, a difference between the air quality of cleaning-vulnerable zones 410 and 420 in a case (for example, discharging air by a wind volume in a wind direction as in arrows 1011 and 1021) where the air cleaner 700 operates based on cleaning information and the air quality of another zone may be less than a difference between the air quality of the cleaning-vulnerable zones 410 and 420 in a case (for example, discharging air by a wind volume in a wind direction as in an arrow 711) where the air cleaner 700 operates regardless of the cleaning information and the air quality of another zone.

As described above, air in an indoor space may not uniformly be cleaned due to a structure of the indoor space and a position of an air cleaner.

Moreover, the cleaning information may be a setting value of the air cleaner, which enables the air quality of a whole indoor space to be uniform because air discharged from the air cleaner 700 uniformly reaches a plurality of zones of the indoor space due to direct current or convection current.

Therefore, an air quality difference between a plurality of zones of an indoor space in a case where the air cleaner 700 operates based on cleaning information may be less than an air quality difference between the plurality of zones of the indoor space in a case where the air cleaner 700 operates regardless of the cleaning information.

The cleaning information may be provided to a server.

In detail, the processor 780 of the air cleaner 700 may transmit a type of an indoor space to the server.

A plurality of cleaning information respectively corresponding to types of a plurality of indoor spaces may be stored in a memory included in the server.

Moreover, when the server obtains a type of an indoor space by using feature information or when the server receives the type of the indoor space from the air cleaner 700, the server may transmit cleaning information corresponding to the type of the indoor space.

FIG. 11 is a diagram for describing a plurality of cleaning information respectively corresponding to a plurality of zones included in an indoor space.

Referring to FIG. 11, cleaning information corresponding to an indoor space having a specific type may include a plurality of cleaning information respectively corresponding to a plurality of zones 1111 to 1122 included in the indoor space having the specific type. Here, the plurality of cleaning information respectively corresponding to the plurality of zones may be referred to as a plurality of zone cleaning information respectively corresponding to a plurality of zones.

Here, the plurality of cleaning information may be a setting value of an air cleaner for more quickly enhancing the air quality of a corresponding zone of an indoor space, based on a structure of the indoor space.

In detail, a setting value of an air cleaner which is most suitable for cleaning an indoor space may differ for each zone.

Therefore, a plurality of cleaning information respectively corresponding to the plurality of zones 1111 to 1122 included in the indoor space may be a setting value of an air cleaner which enables optimal air cleaning to be performed in a corresponding zone.

For example, cleaning information about an A type may include first to twelfth cleaning information.

Here, the first cleaning information may be a setting value of an air cleaner for more quickly enhancing the air quality of a first zone 1111 included in an indoor space having the A type than the air quality of another zone (one of the second to twelfth zones 1112 to 1122).

Referring to FIG. 11B, a processor of an air cleaner 700 may receive an input, which sets the zone 1151, through an input unit.

Moreover, the processor of the air cleaner 700 may perform intensive cleaning on a zone set by the input.

In detail, the processor of the air cleaner 700 may obtain cleaning information corresponding to the zone 1151 set by a user from among the plurality of cleaning information respectively corresponding to the plurality of zones 1111 to 1122.

For example, the processor of the air cleaner 700 may compare positions of the plurality of zones 1111 to 1122 with a position of the zone 1151 set by the user.

Moreover, the processor of the air cleaner 700 may obtain the seventh zone 1117 closest to the zone set by the user among the plurality of zones 1111 to 1122. Also, the processor of the air cleaner 700 may obtain cleaning information corresponding to the seventh zone 1117.

That is, cleaning information corresponding to the seventh zone 1117 may be a setting value of the air cleaner for more quickly enhancing the air quality of the zone 1115 set by the user in the indoor space than the air quality of another zone of the indoor space, based on a structure of the indoor space.

Therefore, an air quality difference between the seventh zone 1117 and another zone in a case where the air cleaner 700 operates based on cleaning information corresponding to the seventh zone 1117 may be greater than an air quality difference between the seventh zone 1117 and another zone in a case where the air cleaner 700 operates regardless of the cleaning information.

A plurality of cleaning information respectively corresponding to a plurality of zones of an indoor space having a specific type may be predetermined and stored in a memory.

Since structures of indoor spaces are very various, an optimized air cleaning method may differ based on a structure of an indoor space. However, according to the present invention, there is an advantage where optimal air cleaning may be performed in consideration of the structure of the indoor space.

Moreover, the use of robotic vacuum cleaners or moving agents such as cleaning robots and guide robots disposed in airports, shopping malls, or museums is increasing recently. Also, according to the present invention, there is an advantage where a structure of an indoor space may be easily checked by using a moving agent, and then, optimal air cleaning may be performed.

Moreover, according to the present invention, optimal air cleaning may be performed so as to be suitable for various purposes.

For example, according to the present invention, by performing optimized air cleaning on a cleaning-vulnerable zone, air cleaning based on a structure of an indoor space may be performed on a zone where air quality is not improved despite an operation of an air cleaner.

As another example, according to the present invention, by performing optimized air cleaning on a main cleaning zone, air cleaning based on a structure of an indoor space may be performed on a zone where a person is located frequently or for a long time.

As another example, according to the present invention, the average air quality of a whole indoor space may quickest reach target air quality on the basis of a structure of an indoor space.

As another example, according to the present invention, air cleaning may be performed to maintain the air quality of several zones of an indoor space as uniform as possible, based on a structure of the indoor space.

A second embodiment of the present invention will be described with reference to FIGS. 12 to 17. Here, the second embodiment relates to a method of performing optimal air cleaning on the basis of situation information and a type of an indoor space.

Figure 12:
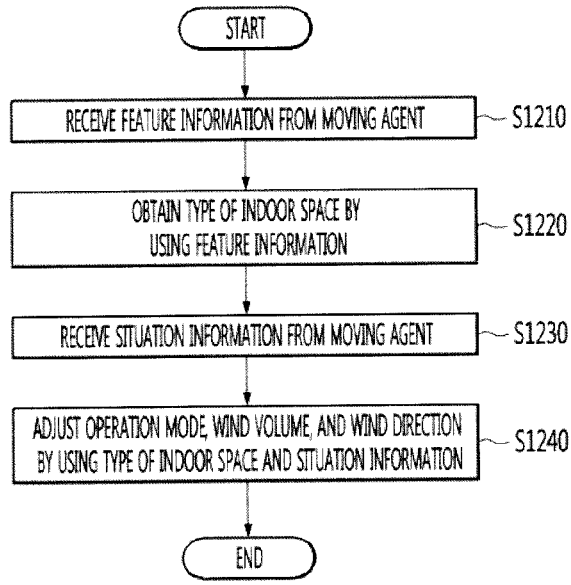
FIG. 12 is a diagram for describing an operating method of an air cleaner, according to a second embodiment of the present invention.

FIG. 12 is a diagram for describing an operating method of an air cleaner, according to a second embodiment of the present invention.

An operating method of an air cleaner according to an embodiment of the present invention may include step S1210 of receiving feature information collected by a moving agent and associated with a structure of an indoor space, step S1220 of obtaining a type of the indoor space by using the received feature information, step S1230 of receiving situation information including at least one of zone-based air quality and dust occurrence information collected by the moving agent, and step S1240 of adjusting at least one of an operation mode, a wind volume, and a wind direction of the air cleaner on the basis of the situation information and the type of the indoor space.

Here, the situation information may include zone-based air quality information. In detail, an indoor space where the air cleaner and the moving agent are located may include a plurality of zones.

In this case, the moving agent may sense the amount of dust in each of the plurality of zones of the indoor space and may transmit the sensed amount of dust to an air cleaner 700. In this case, a processor of the air cleaner 700 may obtain the air quality of each of the plurality of zones on the basis of the amount of dust in each of the plurality of zones.

Moreover, the situation information may include the dust occurrence information.

In detail, by using various sensors included in a sensor unit 5150, a controller of the moving agent may sense a situation where dust occurs.

For example, when a user is shaking dust from a blanket, the controller of the moving agent may obtain dust occurrence information representing that dust is occurring at a specific position, based on a sound and an image captured by a camera and may transmit the obtained dust occurrence information to the air cleaner 700.

A processor of the air cleaner 700 may receive the situation information and may determine a specific zone on which intensive cleaning is to be performed, based on the received situation information. Here, the specific zone on which intensive cleaning is to be performed may denote a zone where a level of air cleaning should increase based on the situation information.

In other words, the specific zone on which intensive cleaning is to be performed may denote a zone for increasing an air cleaning speed or for more quickly enhancing air quality than another zone.

Hereinafter, a method of determining a specific zone will be described with reference to FIGS. 13 to 15.

Figure 13:
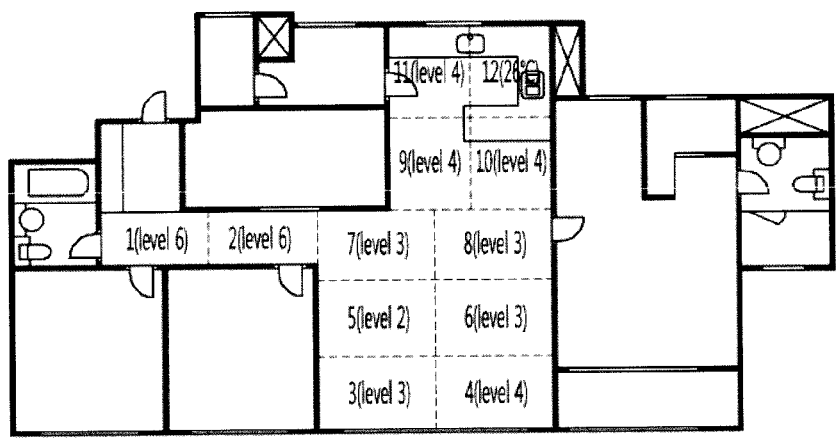
FIGS. 13 to 15 are diagrams for describing a method of determining a specific zone on which intensive cleaning is to be performed.
Figure 14:
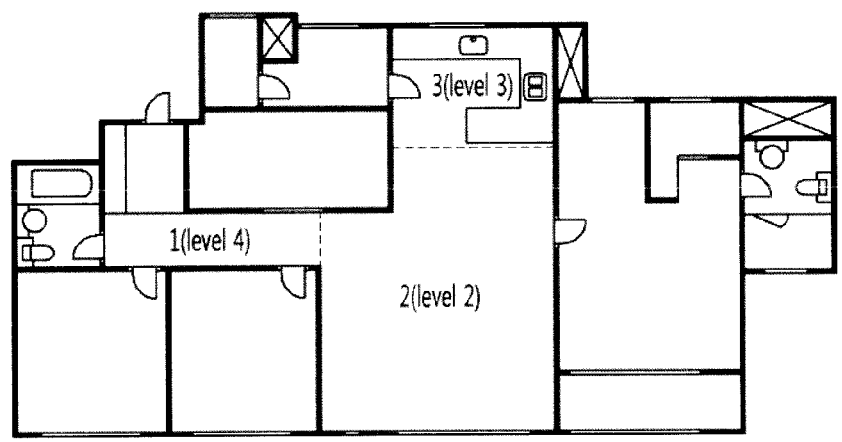
Figure 15:
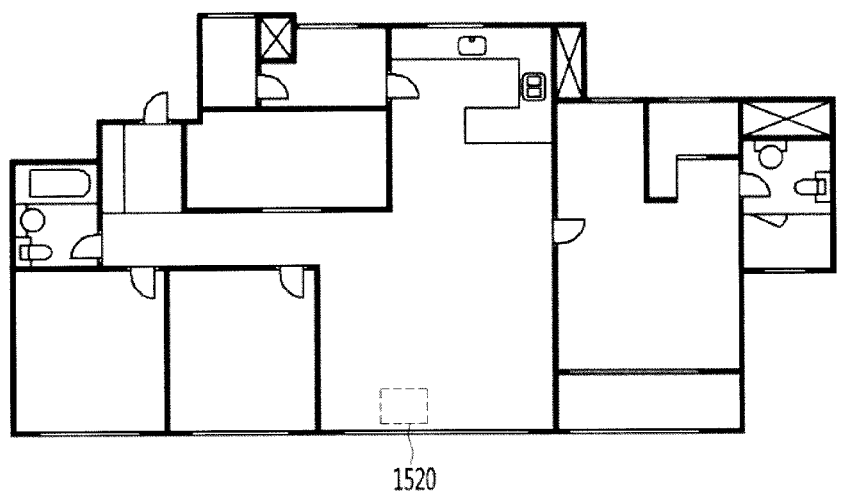

FIGS. 13 to 15 are diagrams for describing a method of determining a specific zone on which intensive cleaning is to be performed.

A specific zone may be a zone where air quality is worst in an indoor space.

In detail, referring to FIG. 13, the indoor space may be divided into a plurality of zones 1 to 12. Also, a moving agent may sense the amount of dust of the plurality of zones 1 to 12 and may transmit the sensed amount of dust to an air cleaner 700.

In this case, the air cleaner 700 may determine the air quality of the plurality of zones 1 to 12 on the basis of the received amount of dust. The moving agent may determine the air quality of the plurality of zones 1 to 12 on the basis of the amount of dust of the plurality of zones 1 to 12, and then, may transmit the air quality of the plurality of zones 1 to 12 to the air cleaner 700.

Moreover, a processor of the air cleaner may determine a zone, where air quality is worst, as a specific zone among the plurality of zones of the indoor space.

For example, when the air quality of a second zone 2 of the plurality of zones 1 to 12 of the indoor space is a level 6 and is worst, the processor of the air cleaner may set the second zone as a specific zone on which intensive cleaning is to be performed.

A zone where air quality is worst may be provided in plurality among the plurality of zones. For example, the air quality of a first zone 1 may be the same as that of the second zone 2.

In this case, the processor of the air cleaner may set one of the plurality of zones 1 and 2, where air quality is worst, to a specific zone.

The specific zone may be a zone which does not reach target air quality in the indoor space.

In detail, referring to FIG. 14, the indoor space may be divided into the first zone 1 having first air quality (level 4), the second zone 2 having second air quality (level 2), and a third zone 3 having third air quality (level 3).

Moreover, the processor of the air cleaner may determine a zone, which does not reach the target air quality, as a specific zone among the plurality of zones of the indoor space.

A zone which does not reach the target air quality may be provided in plurality. For example, when the target air quality is at the level 2, the first zone 1 and the third zone 3 are in a state which does not reach the target air quality.

In this case, the processor of the air cleaner may set one of the plurality of zones 1 and 3, which do not reach the target air quality, to a specific zone.

As another example, the processor of the air cleaner may set the zone 1, where air quality is worse, to a specific zone among the plurality of zones which do not reach the target air quality.

Referring to FIG. 15, a specific zone may be a zone which dust occurrence information represents.

For example, when a user is shaking dust from a blanket, a controller of a moving agent may obtain dust occurrence information representing that dust is occurring at a specific position, based on a sound and an image captured by a camera and may transmit the obtained dust occurrence information to an air cleaner 700.

In this case, the processor of the air cleaner may set a zone 1520, which the dust occurrence information represents, to a specific zone.

The processor of the air cleaner 700 may obtain cleaning information corresponding to a type of an indoor space among a plurality of cleaning information respectively corresponding to types of a plurality of indoor spaces.

Moreover, the processor of the air cleaner 700 may obtain zone cleaning information corresponding to the specific zone among a plurality of zone cleaning information included in cleaning information corresponding to the type of the indoor space.

For example, the processor of the air cleaner 700 may compare positions of a plurality of zones with a position of the specific zone. Also, the processor of the air cleaner 700 may obtain a zone which overlaps or is closest to the specific zone of the plurality of zones. Also, the processor of the air cleaner 700 may obtain zone cleaning information corresponding to the obtained zone.

The processor of the air cleaner 700 may adjust at least one of an operation mode, a wind volume, and a wind direction of the air cleaner by using the zone cleaning information corresponding to the specific zone.

The zone cleaning information corresponding to the specific zone may be a setting value of the air cleaner for more quickly enhancing the air quality of the specific zone of the indoor space than the air quality of another zone, based on a structure of the indoor space.

This will be described below with reference to FIG. 16.

Figure 16A:
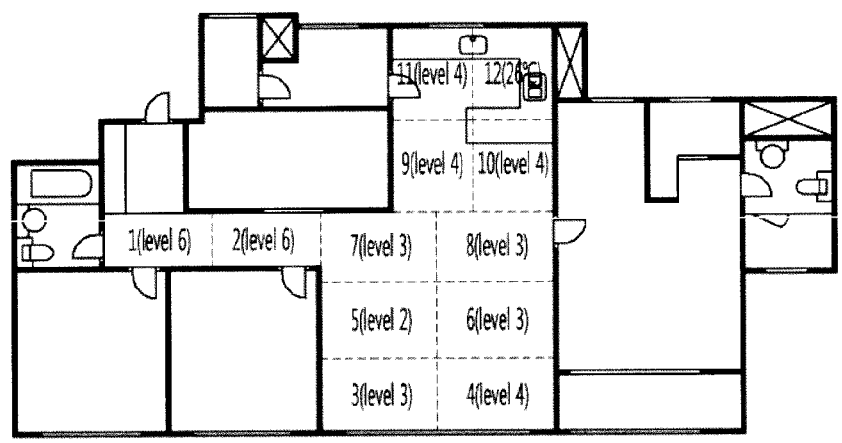
FIG. 16A is a diagram illustrating zone-based air quality before performing intensive cleaning.
Figure 16B:
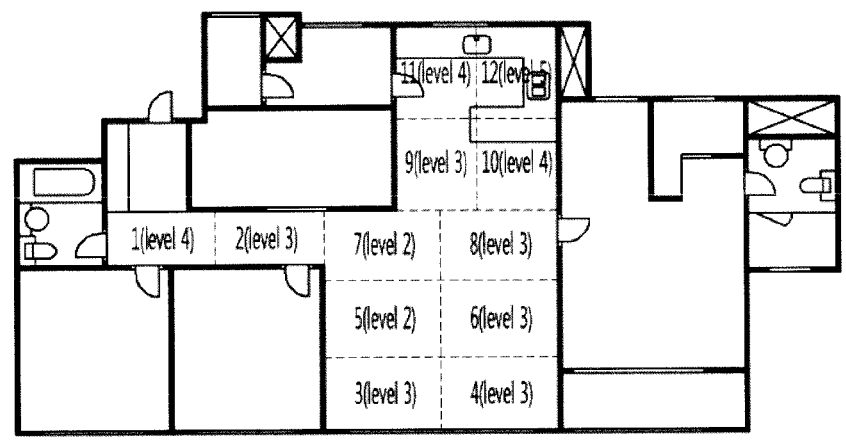
FIG. 16B is a diagram illustrating zone-based air quality after performing intensive cleaning.

FIG. 16A is a diagram illustrating zone-based air quality before performing intensive cleaning, and FIG. 16B is a diagram illustrating zone-based air quality after performing intensive cleaning.

When intensive cleaning is performed on a specific zone (a second zone 2), the air quality of the second zone 2 may be more quickly enhanced than the air quality of another zone of an indoor space.

Here, the air quality of the other zone of the indoor space may denote the air quality of an arbitrary zone among a plurality of other zones 1 and 3 to 12.

Moreover, the air quality of the other zone of the indoor space may denote the air quality of a set zone among the plurality of other zones 1 and 3 to 12.

As described above, zone cleaning information corresponding to the specific zone may be a setting value of the air cleaner, which more quickly enhances the air quality of the specific zone than the air quality of another zone because air discharged from the air cleaner 700 better reaches the specific zone than the other zone due to direct current or convection current.

Therefore, the air quality of the specific zone in a case where the air cleaner 700 operates based on zone cleaning information corresponding to the specific zone may be more quickly improved than the air quality of the specific zone in a case where the air cleaner 700 operates regardless of the zone cleaning information corresponding to the specific zone.

When the specific zone is determined, the processor of the air cleaner 700 may store the determined information about the specific zone in a memory.

Moreover, in a next operation of the air cleaner, the processor of the air cleaner 700 may perform intensive cleaning on the specific zone on the basis of the information about the specific zone stored in the memory.

In this case, in a next operation of the air cleaner, the processor of the air cleaner 700 may perform intensive cleaning on the specific zone even without an operation of a moving agent.

Due to a structure of an indoor space, there may be a zone which is inveterately vulnerable to air cleaning. For example, in the above-described cleaning-vulnerable zone, air quality may be worse than another zone whenever the air cleaner performs air cleaning.

Moreover, according to the present invention, a cleaning-vulnerable zone may be checked and information about the cleaning-vulnerable zone may be stored in a memory by using the moving agent, and thus, there is an advantage where intensive cleaning may be performed on the cleaning-vulnerable zone even without an operation of the moving agent later.

The processor of the air cleaner 700 may perform air cleaning using cleaning information on the basis of the uniformity of air quality of the indoor space.

In detail, the processor of the air cleaner 700 may obtain the uniformity of air quality of the indoor space on the basis of situation information. In more detail, the processor of the air cleaner may obtain the uniformity of air quality of the indoor space on the basis of a deviation between air qualities of a plurality of zones.

Moreover, when uniformity is lower than a predetermined value, the processor of the air cleaner 700 may adjust at least one of an operation mode, a wind volume, and a wind direction by using cleaning information corresponding to a type of the indoor space.

Here, the cleaning information corresponding to the type of the indoor space may be a setting value of the air cleaner, which enables the air quality of the indoor space to be uniform, based on a structure of the indoor space.

That is, the cleaning information corresponding to the type of the indoor space may be a setting value of the air cleaner, which enables the air quality of the whole indoor space to be uniform because air discharged from the air cleaner 700 uniformly reaches a plurality of zones of the indoor space due to direct current or convection current.

It is required to perform intensive cleaning on the basis of a situation of an indoor space. However, a plurality of sensors are needed for considering various situations occurring an indoor space, causing a problem where the cost increases.

However, according to the present invention, there is an advantage where a situation of an indoor space may be easily checked by using a moving agent, a region which needs intensive cleaning may be determined, and optimal air cleaning may be performed based on a structure of the indoor space.

FIG. 17 is a diagram for describing a method of correcting cleaning information, according to an embodiment of the present invention.

A processor 780 of an air cleaner 700 may obtain at least one of a position and a direction of the air cleaner in an indoor space on the basis of feature information.

In detail, a map which is received from a moving agent or is generated by the processor 780 may include information about at least one of a position and a direction of the air cleaner.

In FIG. 17A, a specific type of an indoor space corresponding to an actual indoor space is illustrated. Also, cleaning information corresponding to the specific type may be generated when it is assumed that a position and a direction 1711 of an air cleaner 1710 are a specific position and a direction.

In FIG. 17B, an actual indoor space where an air cleaner and a moving agent are disposed is illustrated. Also, a position and a direction 1721 of an air cleaner 1720 in an actual indoor space may differ from the position and the direction 1711 of the air cleaner 1710 in a specific type of FIG. 17A.

Therefore, a processor 780 may correct cleaning information corresponding to a type of an indoor space on the basis of at least one of the position and the direction 1721 of the air cleaner 1720.

In detail, the processor 780 may compare at least one of the position and the direction 1721 of the air cleaner 1720 in the indoor space with the position and the direction 1711 of the air cleaner 1710 in the specific type corresponding to the indoor space to correct the cleaning information.

A position and a direction which an air cleaner is installed at and in may be very various. However, according to the present invention, there is an advantage where, by correcting cleaning information, air cleaning may be performed by applying accurate cleaning information despite various installation positions and directions.

When an operation of an air cleaner 700 starts, a processor 780 of the air cleaner 700 may transmit a situation information collection command to a moving agent.

Moreover, when the situation information collection command is received, the moving agent may collect situation information while moving an indoor space.

As described above, according to the present invention, the moving agent may move when the air cleaner 700 starts an operation, and thus, there is an advantage where situation information about an indoor space may be collected while air cleaning is being performed.

A method of obtaining cleaning information and a type of an indoor space by using the air cleaner 700 may be implemented in a moving agent.

For example, the moving agent may include a driving driver including at least one driving motor, a communication unit which communicates with an air cleaner disposed in an indoor space, a sensor unit which obtains situation information including at least one of air quality information, dust occurrence information, and feature information associated with a structure of an indoor space, and a processor which obtains a type of an indoor space by using feature information, obtains cleaning information by using situation information and a type of the indoor space, and transmits the cleaning information to an air cleaner.

A fan motor 750 may denote one or more driving devices for driving one or more fans described below.

Moreover, a cleaning unit 745 may include one or more devices for filtering air described below.

Figure 18:
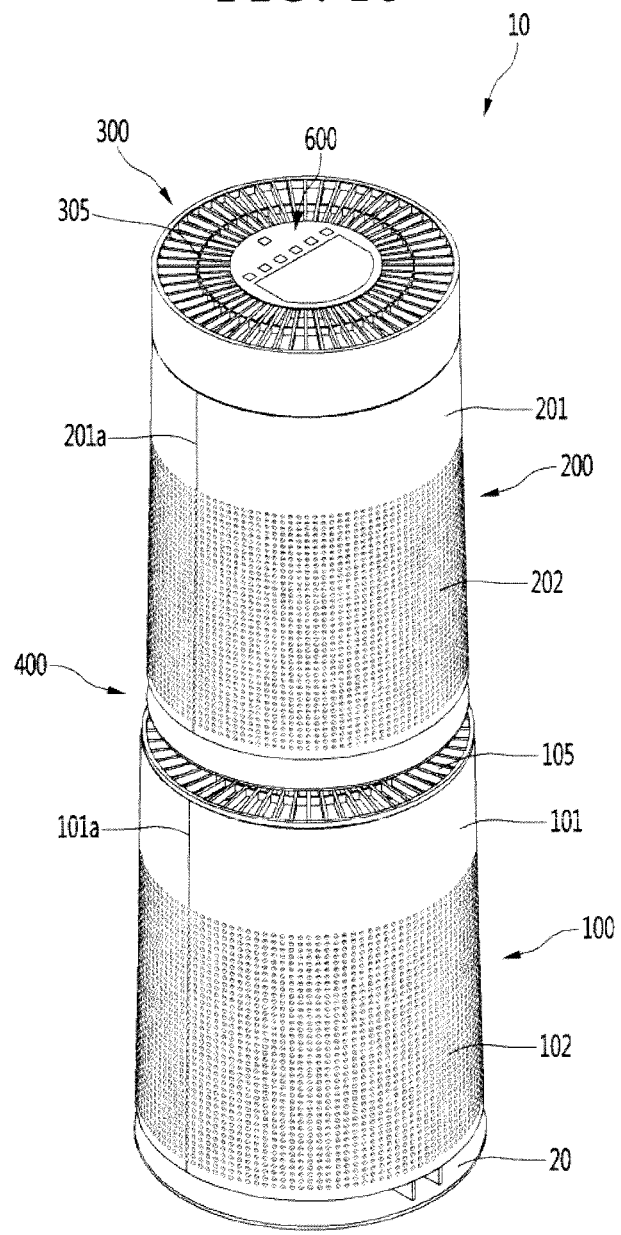
FIG. 18 is a perspective view illustrating an external appearance of an air cleaner according to an embodiment of the present invention.

FIG. 18 is a perspective view illustrating an outer appearance of an air cleaner according to an embodiment.

Referring to FIG. 18, the air cleaner 10 according to the embodiment includes blowing devices 100 and 200 which generate air flow and an air flow control device 300 which changes a discharging direction of the air flow generated in the blowing devices 100 and 200. The blowing devices 100 and 200 include a first blowing device 100 which generates first air flow and a second blowing device 200 which generates second air flow.

The first blowing device 100 and the second blowing device 200 are disposed in the vertical direction. As an example, the second blowing device 200 may be disposed on an upper side of the first blowing device 100. In this case, the first air flow forms a flow which sucks indoor air existing in a lower side of the air cleaner 10 and the second air flow forms a flow which sucks indoor air existing in the upper side of the air cleaner 10.

The air cleaner 10 includes cases 101 and 201 which form an outer appearance thereof.

In detail, the cases 101 and 201 include a first case 101 which forms an outer appearance of the first blowing device 100. The first case 101 may have a cylindrical shape. An upper portion of the first case 101 may be configured to have a diameter which is smaller than a lower portion thereof. That is, the first case 101 may have a truncated cone shape.

The first blowing device 100 and the second blowing device 200 may be referred to as "first air cleaning module 100" and "second air cleaning module 200", respectively, in that the first blowing device 100 and the second blowing device 200 perform the function of cleaning the air in a cleaning space. The first blowing device 100 may be referred to as "lower air cleaning module" or "lower module" in that the first blowing device 100 is disposed on the lower portion of the air cleaner 10 and the second blowing device 200 may be referred to as "upper air cleaning module" or "upper module" in that the second blowing device 200 is disposed on the upper portion of the air cleaner 10. The air flow control device 300 may be referred to as "air flow control module 300".

The first case 101 includes a first separation portion 101a which assembles or disassembles two parts which constitute the first case 101. The first case 101 further includes a hinge portion (not shown) which is provided on the opposite of the first separation portion 101a. The two parts are capable of relatively rotating about the hinge portion.

When at least one part of the two parts rotates, the first case 101 is opened, and is capable of being separated from the air cleaner 10. A locking device may be provided on a portion at which the two parts are coupled, that is, a side opposite to the hinge portion. The locking device may include a locking projection or a magnet member. An inside component of the first blowing device 100 is capable of being replaced or being repaired by the first case 101 being opened.

The first case 101 includes a first suction portion 102 in which air is sucked. The first suction portion 102 includes a through hole which is formed by passing through at least a portion of the first case 101. A plurality of first suction portions 102 are provided.

The plurality of first suction portions 102 are evenly formed in the circumferential direction along the outer circumferential surface of the first case 101 so that air suction is capable of being performed even in any direction relative to the first case 101. That is, air is capable of being sucked in 360-degree directions relative to a center line in the vertical direction which passes by an inside center of the first case 101.

Accordingly, suction amount of air can be increased by the first case 101 having a cylindrical shape and a plurality of first suction portions 102 being formed along the outer circumferential surface of the first case 101. A flow resistance to sucked air can be reduced by avoiding a cube shape having an edge portion such as the case of the air cleaner in the related art.

Air which is sucked through the first suction portion 102 may flow substantially in the radial direction from the outer circumferential surface of the first case 101. Directions will be defined. Relative to the FIG. 18, a vertical direction is referred to as an axial direction and a transverse direction is referred to as a radial direction. The axial direction may correspond to a central axis direction of a first fan 160 and a second fan 260 to be described below, that is, a motor shaft direction of the fan. The radial direction may be understood as a direction which is perpendicular to the axial direction.

The circumferential direction is understood as a virtual circle direction which is formed when rotating about the axial direction and having the distance of the radial direction as a rotation radius.

The first blowing device 100 further includes a base 20 which is provided in the lower side of the first case 101 and is placed on the ground. The base 20 is positioned by spacing apart from the lower end portion of the first case 101 in the lower direction. A base suction portion 103 is formed in a separation space between the first case 101 and the base 20.

Air which is sucked through the base suction portion 103 is capable of flowing in the upper direction through a suction port 112 of a suction grill 110 (see FIG. 19) which is provided in the upper side of the base 20.

In other words, the first blowing device 100 includes a plurality of suction portions 102 and 103. Air which existing in the lower portion of the indoor space may be easily introduced to the first blowing device 100 through the plurality of suction portions 102 and 103. Accordingly, the suction amount of air may be increased.

A first discharging portion 105 is formed on the upper portion of the first blowing device 100. The first discharging portion 105 may be formed on a first discharging grill 195 of a first discharging guide device 190 (see, FIG. 19) which is provided in the first blowing device 100. The first discharging guide device 190 forms an outer appearance of the upper end portion of the first blowing device 100. Air which is discharged through the first discharging portion 105 may flows in the upper side in the axial direction.

The cases 101 and 201 include a second case 201 which forms an outer appearance of the second blowing device 200. The second case 201 may have a cylindrical shape. An upper portion of the second case 201 may be configured to have a diameter which is smaller than a lower portion thereof. In other words, the second case 201 may have a truncated cone shape.

The second case 201 includes two parts and a hinge portion which are capable of being assembled or being disassembled through a second separation portion 201a. The second case 201 may be configured to be openable like the first case 101. A detail description refers to the description regarding to the first case 101. An inside component of the second blowing device 200 are capable of being replaced or being repaired by the second case 201 being opened.

A diameter of the lower end portion of the second case 201 may be formed to be smaller than a diameter of the upper end portion of the first case 101. Accordingly, in a general shape of the cases 101 and 201, the lower cross-sectional area of the cases 101 and 102 may be formed to be greater than the upper cross-sectional area. Accordingly, the air cleaner 10 may be stably supported on the ground.

The second case 201 includes a second suction portion 202 in which air is sucked. The second suction portion 202 includes a through hole which is formed by passing through at least a portion of the second case 201. A plurality of second suction portions 202 are provided.

The plurality of second suction portion 202 are evenly formed in the circumferential direction along the outer circumferential surface of the second case 201 so that air suction is capable of being performed even in any direction relative to the second case 201. In other words, air is capable of being sucked in 360-degree directions relative to a center line in the vertical direction which passes by an inside center of the second case 201.

Accordingly, suction amount of air can be increased by the second case 201 having a cylindrical shape and a plurality of second suction portions 202 being formed along the outer circumferential surface of the second case 201. A flow resistance to sucking air can be reduced by avoiding a cube shape having an edge portion such as the case of the air cleaner in the related art.

Air which is sucked through the second suction portion 202 may flow substantially in the radial direction from the outer circumferential surface of the second case 201.

The air cleaner 10 includes a dividing device 400 which is provided between the first blowing device 100 and the second blowing device 200. By the dividing device 400, the second blowing device 200 may be positioned to be spaced apart in the upper side of the first blowing device 100. The description regarding to the dividing device 400 will be described below, with reference to the accompanying drawings.

The air flow control device 300 may be installed on the upper side of the second blowing device 100. An air flow path of the second blowing device 100 may communicate with an air flow path of the air flow control device 300 relative to the air flow. The air passing through the second blowing device 100 is capable of being discharged through a second discharging portion 305 to the outside via the air flow path of the air flow control device 300. The second discharging portion 305 is formed on the upper end portion of the air flow control device 300.

Figure 28:
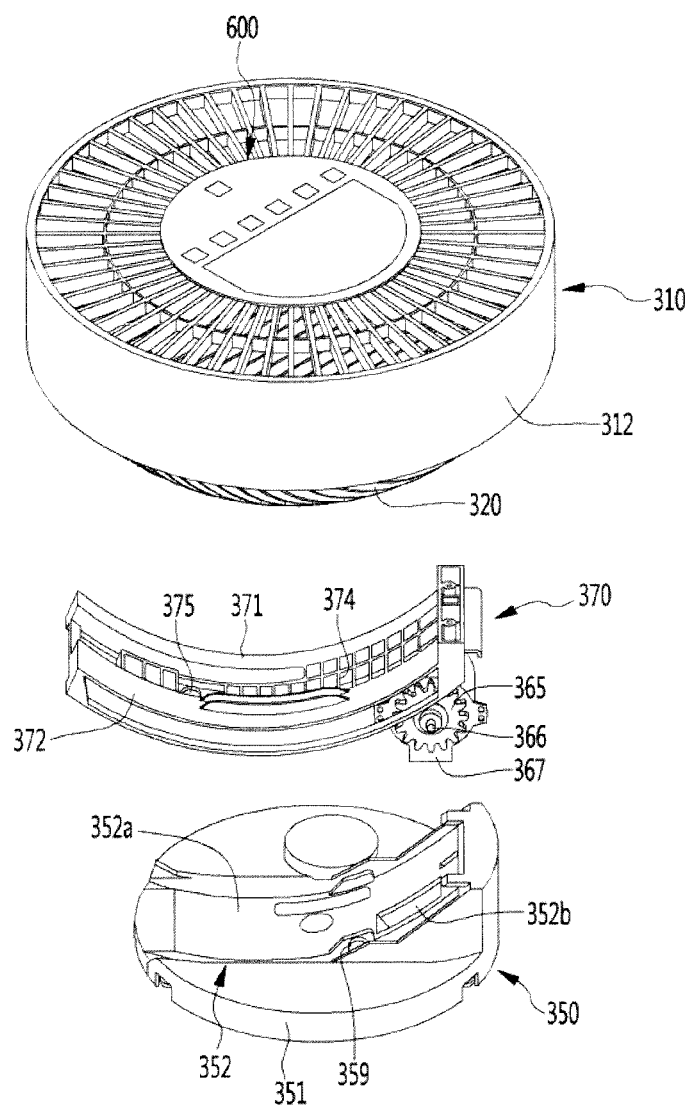
FIG. 28 is an exploded perspective view illustrating a configuration of a flow conversion device according to an embodiment of the present invention.

The air flow control device 300 may be provided to be movable. In detail, the air flow control device 300 is in a laid state (first position) as illustrated in FIG. 18 or is in an inclinedly erected state (second position) as illustrated in FIG. 28. Description related to this will be described later.

In addition, a display device 600 which displays operation information of the air cleaner is provided at an upper portion of the air flow control device 300. The display device 600 is movable together with the air flow control device 300.

Figure 19:
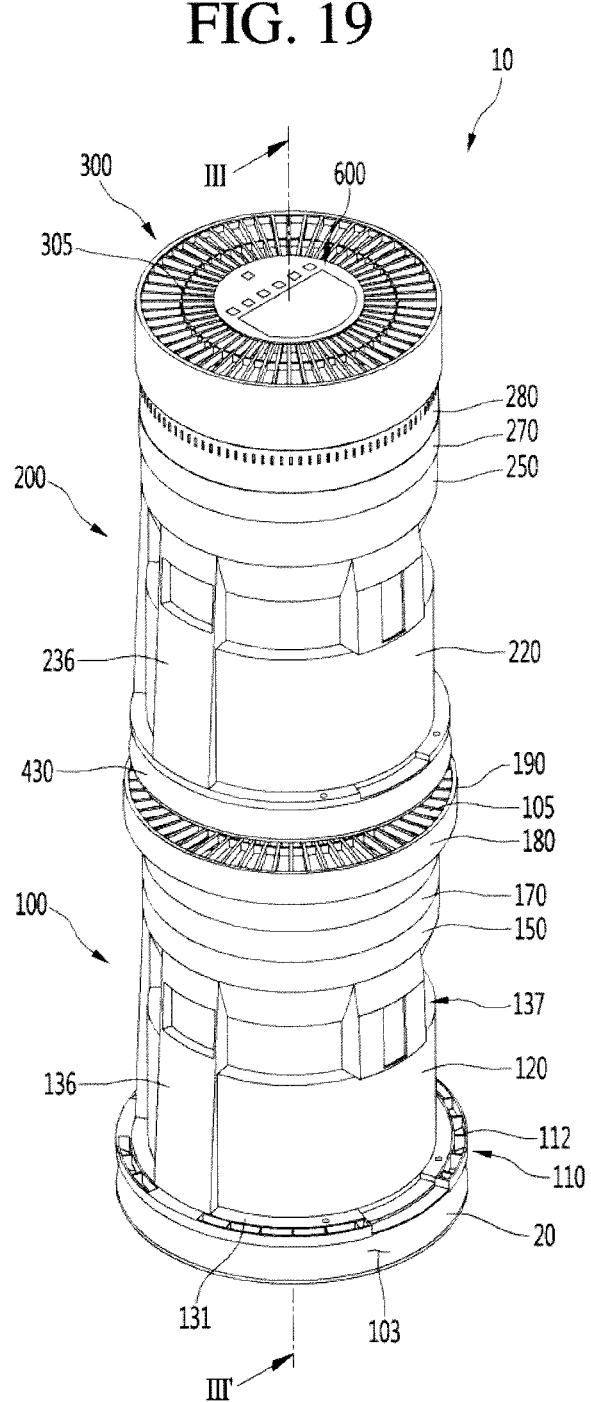
FIG. 19 is a perspective view illustrating an internal configuration of an air cleaner according to an embodiment of the present invention.
Figure 20:
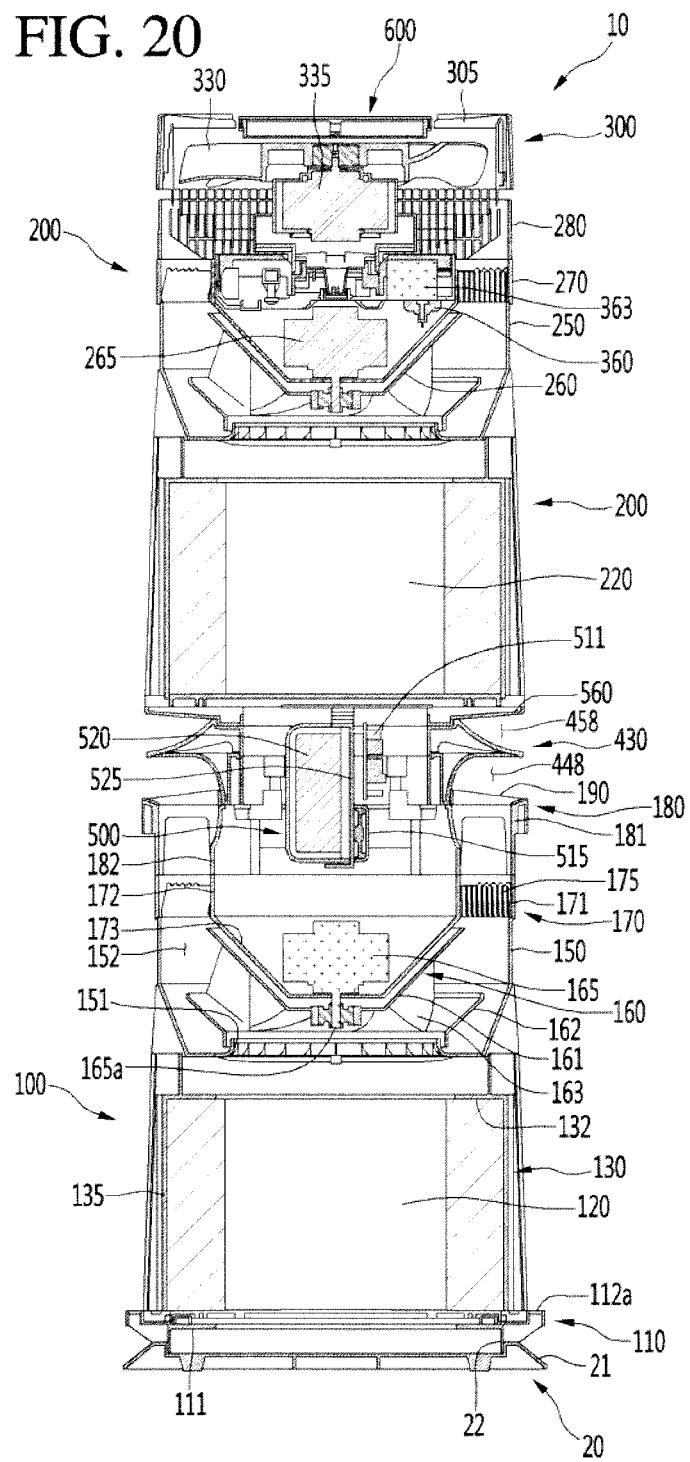
FIG. 20 is a cross-sectional view taken along line of FIG. 19.

FIG. 19 is a perspective view illustrating an internal configuration of the air cleaner according to the embodiment. FIG. 20 is a sectional view taken along line of FIG. 19.

Referring to FIGS. 19 and 20, a base 20 and a suction grill 110 which is disposed on the upper side of the base 20 are included in the first blowing device 100 according to the embodiment.

The base 20 includes a base main body 21 which is placed on the ground and a base projecting portion 22 which projects from the base main body 21 in the upper direction and on which the suction grill 110 is placed. The base projecting portion 22 may be provided at both sides of the base 20.

The base main body 21 and the suction grill 110 are spaced apart from each other by the base projecting portion 22. A base suction portion 103 which forms a suction space of air is included between the base 20 and the suction grill 110.

The suction grill 110 includes a grill main body 111 having a substantially ring shape and a rim portion protruding from the outer circumferential surface of the grill main body 111 in the upper direction. By the configuration of the grill main body 111 and the rim portion, the suction grill 110 may have a stepped structure.

The suction grill 110 includes a suction portion 112 formed on the rim portion. The suction portion 112 is configured to protrude along the circumference of the rim portion in the upper direction and extend in the circumferential direction. In addition, a plurality of suction holes 112a are formed in the suction portion 112. The plurality of suction holes 112a may communicate with the base suction portion 103.

Air sucked through the plurality of suction holes 112a and the base suction portion 103 may pass through a first filter member 120. The first filter member is provided in a cylindrical shape, and has a filter surface which filters air. The air passing through the plurality of suction holes 112a may be introduced to the inside portion of the first filter member 120 by passing through the outer circumferential surface of the cylindrical first filter member 120.

The first blowing device 100 further includes a first filter frame 130 which forms a mounting space of the filter member 120. Specifically, the first filter frame 130 includes a first frame 131 which forms a lower portion of the first filter frame 130 and a second frame 132 which forms an upper portion of the first filter frame 130.

The first filter frame 130 further includes a first filter supporting portion 135 which extends from the first frame 131 to the second frame 132 in the upper direction. The first frame 131 and the second frame 132 are spaced apart from each other by the first filter supporting portion 135. A plurality of first filter supporting portions 135 are provided and the plurality of the first filter supporting portions 135 are arranged in the circumferential direction and thus may be connected to the rim portions of the first frame 131 and the second frame 132.

A mounting space of the first filter member 120 is defined by the plurality of first filter supporting portions 135 and the first frame 131 and the second frame 132. In addition, a first supporting portion cover 136 may be coupled to the outside of the first filter supporting portion 135.

A sensor device 137 may be installed in the first filter frame 130. The sensor device 137 may include a dust sensor which senses an amount of dust in the air and a gas sensor which senses an amount of gas in the air. The dust sensor and the gas sensor may be disposed to be supported by the second frame 132 of the first filter frame 130.

The first filter member 120 may be detachably mounted on the mounting space. The first filter member 120 has a cylindrical shape and air may be introduced through the outer circumferential surface of the first filter member 120. Impurities such as fine dust in air are filtered in a process of passing through the first filter member 120.

The air can be introduced from any direction relative to the first filter member 120, by the first filter member 120 having the cylindrical shape. Accordingly, filtering area of air can be increased.

The mounting space may have a cylindrical shape corresponding to the shape of the first filter member 120. The first filter member 120 may be slidably introduced toward the mounting space in the mounting process. Contrary, the first filter member 120 may be slidably withdrawn from the mounting space in the separating process.

The first blowing device 100 further includes a first fan housing 150 which is installed on the outlet side of the first filter member 120. A housing space portion 152 in which a first fan 160 is accommodated is formed in the first fan housing 150. In addition, the first fan housing 150 may be supported by the first filter frame 130.

A first fan introducing portion 151 which guides introduction of air to inside portion of the first fan housing 150 is included in the lower portion of the first fan housing 150. It is prevented a finger or the like of a user from being putted to the inside portion of the first fan housing 150 when the first filter member 150 is separated by the grill being provided in the first fan introducing portion 151.

The first blowing device 100 further includes an ionizer for removing or sterilizing smell particles in the air. The ionizer is coupled to the first fan housing 150 and is capable of acting the air which flows in the inside portion of the first fan housing 150.

The sensor device 137 and the ionizer 158 may also be installed in a second blowing device 200 to be described later. As another example, the sensor device 137 and the ionizer 158 may be installed in one of the first blowing device 100 and the second blowing device 200.

The first fan 160 is placed on the upper side of the first fan introducing portion 151. As an example, the first fan 160 includes a centrifugal fan which introduces air in the axial direction and then discharges air to the upper side in the radial direction.

In detail, the first fan 160 includes a hub 161 to which a rotating shaft 165a of the first fan motor 165 which is the centrifugal fan motor is coupled, a shroud 162 which is disposed in a state of being spaced apart from the hub 161, and a plurality of blades 163 which are disposed between the hub 161 and the shroud 162. The first fan motor 165 may be coupled to the upper side of the first fan 160.

The hub 161 may have a bowl shape of which diameter is gradually reduced in the lower direction. The hub 161 includes a shaft coupling portion to which the rotating shaft 165a is coupled and a first blade coupling portion which extends to be inclined from the shaft coupling portion in the upper direction.

The shroud 162 includes a lower end portion on which a shroud suction port into which air which is passed through the first fan introducing portion 151 is sucked is formed and a second blade coupling portion which extends from the lower end portion in the upper direction.

One surface of the blade 163 may be coupled to the first blade coupling portion of the hub 161 and the other surface thereof may be coupled to the second blade coupling portion of the shroud 162. The plurality of blades 163 may be disposed to be spaced apart in the circumferential direction of the hub 161.

The first blowing device 100 further includes a first air guide device 170 which guides a flow of air which is passed through the first fan 160 by being coupled to the upper side of the first fan 160.

The air guide device 170 includes an outside wall 171 having a cylindrical shape and an inside wall 172 which is positioned on the inside of the outside wall 171 and has a cylindrical shape. The outside wall 171 is disposed to surround the inside wall 172. A first air flow path through which air flows is formed between an inner circumferential surface of the outside wall 171 and the outer circumferential surface of the inside wall 172.

The first air guide device 170 includes a guide rib 175 which is disposed on the first air flow path 172a. The guide rib 175 extends from the outer circumferential surface of the inside wall 172 to the inner circumferential surface of the outside wall 171. A plurality of guide ribs 175 may be disposed to be spaced apart from each other. The plurality of guide ribs 175 perform a function which guides the air introduced to the first air flow path of the first air guide device 170 via the first fan 160 in the upper direction.

The guide rib 175 may extend to be inclined from the lower portion of the outside wall 171 and the inside wall 172 in the upper direction. As an example, the guide rib 175 is formed to be rounded and thus guides so that air may flow to be inclined in the upper direction.

The first air guide device 170 further includes a motor accommodating portion 173 which extends from the inside wall 172 to the lower side and thus accommodates the first fan motor 165. The motor accommodating portion 173 may have a bowl shape of which diameter is gradually reduced in the lower direction. The shape of the motor accommodating portion 173 may correspond to the shape of the hub 161. In addition, the motor accommodating portion 173 may be inserted into the inside portion of the hub 161.

The first fan motor 165 may be supported to the upper side of the motor accommodating portion 173. The rotating shaft 165a of the first fan motor 165 may extend from the first fan motor 165 in the lower direction and be coupled to the shaft coupling portion of the hub 161 through the lower surface portion of the motor accommodating portion 173.

The first blowing device 100 according to the embodiment further includes a second air guide device 180 which is coupled to the upper side of the air guide device 170 and guides air which is passed through the first air guide 170 to the discharging guide device 190.

The air guide device 180 includes a first guide wall 181 which has a substantially cylindrical shape and a second guide wall 182 which is positioned to the inside of the first guide wall 181 and has a substantially cylindrical shape. The first guide wall 181 may be disposed to surround the second guide wall 182.

A second air flow path through which air flow is formed between an inner circumferential surface of the first guide wall 181 and the outer circumferential surface of the second guide wall 182. Air which flows the first air flow path 172a of the first air guide device 170 flows in the upper direction through the second air flow path. The second air flow path may be referred to as a "discharge flow path." In addition, the first discharging portion 105 is disposed on the upper side of the second air flow.

A first space portion in which at least a portion of a PCB device 500 is accommodated is formed in the inside of the second guide wall 182 having a cylindrical shape. The PCB device 500 includes a power supply portion 520 and a main PCB 511.

The power supply portion 520 is understood as a device which receives commercial power supplied from a power line connected to the air cleaner 10 to supply power to the main PCB 511 and a plurality of parts in the air cleaner 10. The power supply portion 520 may include a PCB (power PCB) for AC power.

The main PCB 511 may include a PCB for DC power, which is driven by a DC voltage converted in the PCB for AC power.

The PCB device 500 further includes a PCB supporting plate 525 for supporting the power supply portion 520 and the main PCB 511. The main PCB 511 may be supported on one surface of the PCB supporting plate 525, and the power supply portion 520 may be supported on the other surface of the PCB supporting plate 525.

The PCB device 500 includes a communication module 515 through which the air cleaner 10 is capable of communicating with an external device. As an example, the communication module 515 may include a Wi-Fi module. The communication module 515 is supported on the PCB supporting plate 525, and may be disposed at the lower side of the main PCB 511.

The first blowing device 100 further include a first discharging guide device 190 which is disposed on the upper side of the second air guide device 180, that is, the outlet side of air flow passing through the second air guide device 180 relative to the air flow and guides the air discharge to the outside portion of the air cleaner 10. A first discharging portion 105 through which air is discharged is formed in the first discharging guide device 190.

Figure 21:
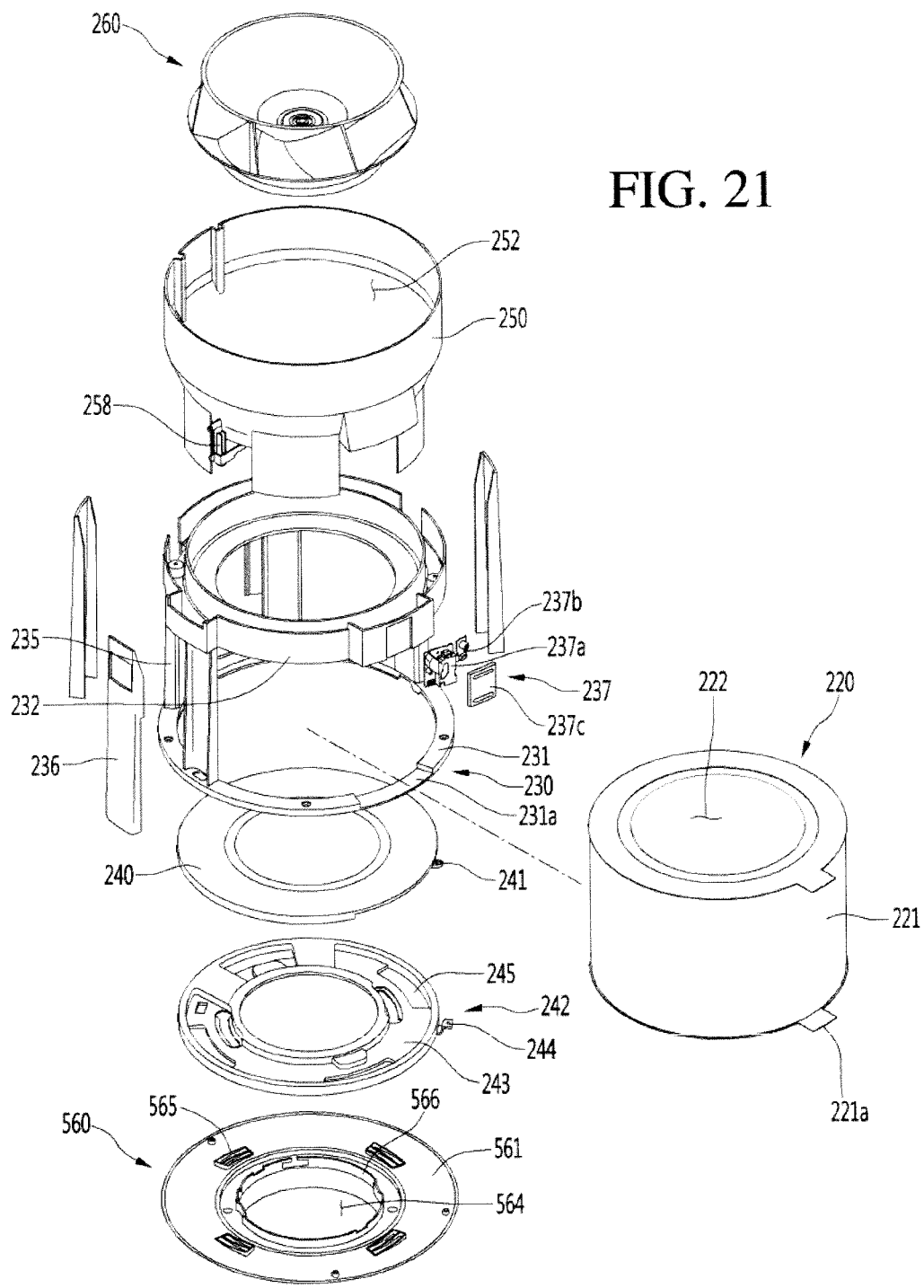
FIG. 21 is an exploded perspective view illustrating a configuration of a second blowing device according to an embodiment of the present invention.

The second blowing device 200 includes a second filter member 220, a supporting device 240 which supports the lower portion of the second filter member 220, and a lever device 242 which is provided on the lower side of the supporting device 240 to support the second filter member 220 and the supporting device 240 (see FIG. 21).

The second blowing device further includes a lever supporting device 560 which supports the second filter member 220 or the lever device of the second blowing device 200. The lever supporting device 560 has a substantially annular shape. The lever supporting device 560 includes a third space portion which defines an installation space in which the PCB device 500 is located. The third space portion is formed at a substantially center portion of the lever supporting device 560 by passing through the lever supporting device 560 in the vertical direction.

A dividing device 400 is provided between the first blowing device 100 and the second blowing device 200. The dividing device 400 includes a dividing plate 430 for separating or blocking air flow generated in the first blowing device 100 and air flow generated in the second blowing device 200. By the dividing plate 430, the first and second blowing devices 100 and 200 are capable of being disposed to be spaced apart from each other in the vertical direction.

In other words, a separation space in which the dividing plate 430 is located is formed between the first and second blowing devices 100 and 200. The first discharging guide device 190 of the first blowing device 100 may be located at a lower end portion of the separation space, and the lever supporting device 560 of the second blowing device 200 may be located at an upper end portion of the separation space.

The separation space may be divided into an upper space and a lower space by the dividing plate 430. The lower space is understood as a first space portion 448 through which air discharged from the first discharging portion 105 of the first discharging guide device 190 passes in a process in which the air flows to the outside of the air cleaner 10. In addition, the upper space constitutes a second space 458 as a grasping space in which the user is capable of putting a hand when moving the air cleaner 10.

The air discharged from the first discharging part 105 is guided by the dividing plate 430 to flow to the outside of the air cleaner 10. Accordingly, it is possible to prevent the air from being introduced to the second blowing device 200.

FIG. 21 is an exploded perspective view illustrating a configuration of the second blowing device according to the embodiment.

Referring to FIG. 21, the second blowing device 200 according to the embodiment includes a lever supporting device 560, a lever device 242, a supporting device 240, a second filter member 220, a second filter frame 230, a second fan housing 250, and a second fan 260.

The second filter member 220 may have a cylindrical shape having an opened upper portion. The second filter member 220 includes a filter main body 221 which has a cylindrical filter portion of which inside is empty and a filter hole 222 which is formed to be opened at the upper end portion of the filter main body 221. A filter grasping portion 221a is provided at an upper or lower portion of the filter main body 221. Air may be introduced to the inside of the filter main body 221 through the outer circumferential surface of the filter main body 221, and may be discharged from the second filter member 220 through the filter hole 222. The configuration of the second filter member 220 may be applied to the first filter member 120.

The lever supporting device 560 includes a lever supporting main body 561 having an annular shape. The lever supporting main body 561 extends to be slightly inclined in the upper direction with respect to the axial direction toward the outer circumferential surface of the inner circumferential surface thereof. That is, a surface which constitutes the lever supporting main body 561 constitutes an inclined surface. A space between the inclined surface and the upper surface of the dividing plate 430 provides the second space portion 458 in which a user's hand is capable of being located. The lever supporting main body 561 may be referred to as a "blocking portion" in that air which is discharged through the first discharging portion 105 of the first blowing device 100 is blocked from being introduced to the second blowing device 200.

The lever supporting device 560 further includes a movement guide portion 565 which protrudes from the lever supporting main body 561 in the upper direction. A plurality of movement guide portions 565 may be arranged to be spaced apart from one another in the circumferential direction of the lever supporting main body 561. In addition, the lever supporting device 560 further includes a supporting projection 566 which protrudes in the upper direction from the inner circumferential surface of the lever supporting main body 561. The supporting projection 566 supports the lever device of the second blowing device 200.

The lever device 242 may be provided to be operable by a user. As an example, the lever device 242 may be provided to be rotatable in the circumferential direction. In detail, the lever device 242 includes a lever main body 243 which has a substantially ring shape and is provided to be rotatable. In addition, a plurality of cut-out portions 245 which are disposed at positions corresponding to the plurality of movement guide portions 565 are formed in the lever main body 243.

The plurality of cut-out portions 245 are spaced apart from one another, and are arranged in the circumferential direction of the lever main body 243. In addition, each of the plurality of cut-out portions 245 may be formed to be rounded with a predetermined curvature in the circumferential direction, corresponding to the curvature of the outer circumferential surface of the lever main body 243.

The lever device 142 is supported on the upper surface of the lever supporting main body 561. If the lever device 242 is supported by the lever supporting main body 561, the plurality of movement guide portions 565 may be arranged to be inserted into the plurality of cut-out portions 245. In detail, the plurality of movement guide portions 565 may protrude to the upper side of the plurality of cut-out portions 245 by passing through the plurality of cut-out portions 245.

The length of each of the plurality of cut-out portions 245 may be formed longer than the length of the movement guide portion 565. Thus, the lever device 242 can rotate in the state in which the movement guide portion 565 is inserted into the cut-out portion 245. In addition, one end portion of the movement guide portion 565 may be interfered with one end portion of the cut-out portion 245 in a process in which the lever device 242 rotates in one direction, and the other end portion of the movement guide portion 565 may be interfered with the other end portion of the cut-out portion 245. A second handle 244 is provided on the outer circumferential surface of the lever main body 243.

A supporting device 240 which supports the second filter member 220 is provided on the upper side of the lever device 242. The supporting device 240 includes a first handle 241 which is coupled to the second handle 244. The user may rotate the lever main body 143 and the supporting device 140 in the clockwise direction or in the counterclockwise direction by grasping the first and second handles 241 and 244. The lever device 242 supports the lower surface of the supporting device 240. The supporting device 240 may include a support projecting portion (not shown) which is in contact with the movement guide portion 565. The support projecting portion protrudes in the lower direction from the lower surface of the supporting device 240, and may be provided at a position corresponding to the movement guide portion 565. In addition, the shape of the support projecting portion corresponds to the shape of the movement guide portion 565, and includes an inclined surface which is formed to gradually protrude in the circumferential direction. In addition, the direction in which the movement guide portion 565 gradually protrudes and the direction in which the support projecting portion gradually protrudes may be opposite to each other.

As an example, if the direction in which the movement guide portion 565 further protrudes is the counterclockwise direction, the direction in which the support projecting portion further protrudes may be the clockwise direction. The support projecting direction may be disposed at a position corresponding to the cut-out portion 245. In other words, the movement guide portion 565 and the support projecting portion may be disposed at a position at which they are inserted into the cut-out portion 245.

The lever device 242 and the supporting device 240 may rotate together. In the rotation process, the movement guide portion 565 and the support projecting portion may be interfered with each other. In detail, if the lower portion of the support projecting portion and the upper portion of the movement guide portion 565 are in contact with each other, the lever device 242 and the supporting device 240 are lifted in the upper direction. In addition, the second filter member 220 supported by the supporting device 240 is in a state in which the second filter member 220 is coupled to the second blowing device 200 while moving in the upper direction.

On the other hand, if the lower portion of the support projecting portion and the upper portion of the movement guide portion 565 are in contact with each other or if the inference between the support projecting portion and the movement guide portion 565 is released, the lever device 242 and the supporting device 240 move downward. In addition, the second filter member 220 supported by the supporting device 240 is in a state (released state) in which the second filter member 220 is separable from the second blowing device 200.

The second blowing device 200 further includes a second filter frame 230 which forms a mounting space of the second member 220. In detail, the second filter frame 230 includes a first frame 231 which forms a lower portion of the second filter frame 230 and a second frame 232 which forms an upper portion of the second filter frame 230.

The first frame 231 includes a frame depression portion 231a having a shape depressed downward. The frame depression portion 231a may be configured such that at least a portion of the first frame 231 is depressed. The frame depression portion 231a provides a space portion in which the first and second handles 241 and 244 are movable. The first and second handles 241 and 244 are located in the space portion, to rotate in the clockwise direction or in the counterclockwise direction.

The second frame 232 is located to be spaced apart from the first frame 231 in the upper direction. The second frame 232 has a substantially ring shape. The ring-shaped inside portion space of the second frame 232 forms at least a portion of an air flow path passing through the second filter frame 230. In addition, the upper portion of the second frame 232 supports the second fan housing 250.

The second filter frame 230 further includes a second filter supporting portion 235 which extends from the first frame 231 to the second frame 232 in the upper direction. The first frame 231 and the second frame 232 are spaced apart from each other by the second filter supporting portion 235. A plurality of second filter supporting portions 235 are provided and the plurality of the first second supporting portions 235 are arranged in the circumferential direction and thus may be connected to the rim portions of the first frame 231 and the second frame 232.

A mounting space of the second filter member 220 is defined by the first and second frames 231 and 232 and the plurality of second filter supporting portions 235. In addition, a first supporting portion cover 236 may be coupled to the outside of the second filter supporting portion 235.

A sensor device 237 may be installed in the second filter frame 230. The sensor device 237 may include a dust sensor 237a which senses an amount of dust in the air and a gas sensor 237b which senses an amount of gas in the air. The dust sensor 237a and the gas sensor 237b may be disposed to be supported by the second frame 232 of the second filter frame 230. The sensor device 237 further includes a sensor cover 237c which covers the dust sensor 237a and the gas sensor 237b.

The second filter member 220 may be detachably mounted on the mounting space. The second filter member 220 has a cylindrical shape and air may be introduced through the outer circumferential surface of the second filter member 220. Impurities such as fine dust in air are filtered in a process of passing through the second filter member 220.

The air can be introduced from any direction relative to the first filter member 120, by the second filter member 220 having the cylindrical shape. Accordingly, filtering area of air can be increased. The mounting space may have a cylindrical shape corresponding to the shape of the second filter member 220. The second filter member 220 may be slidably introduced toward the mounting space in the mounting process. Contrary, the second filter member 220 may be slidably withdrawn from the mounting space in the separating process.

On the other hand, the second filter member 220 is slid toward the mounting space to the inside in the radial direction in a state being separated from the mounting space, is supported on the upper surface of the supporting device 240 and thus is in close contact upwardly by an operation of the first and second handles 241 and 244. At this time, the second filter member 220 is in a coupling position.

The second blowing device 200 further includes a second fan housing 250 which is installed on the outlet side of the second filter member 220. A housing space portion 252 in which the second fan 260 is accommodated is formed in the second fan housing 250. The configuration of the second fan housing 250 and the second fan 260 is identical to the configuration of the first fan housing 150 and the first fan 160, and therefore, a detailed description regarding to the second fan housing 250 and the second fan 260 refers to the description regarding to the first fan housing 150 and the first fan 160.

The second blowing device 200 further includes an ionizer 258 for removing or sterilizing smell particles in the air. The ionizer 258 is coupled to the second fan housing 250 and is capable of acting the air which flows in the inside portion of the second fan housing 250. The ionizer 258 may have the same configuration as the ionizer of the first blowing device 100.

Figure 22:
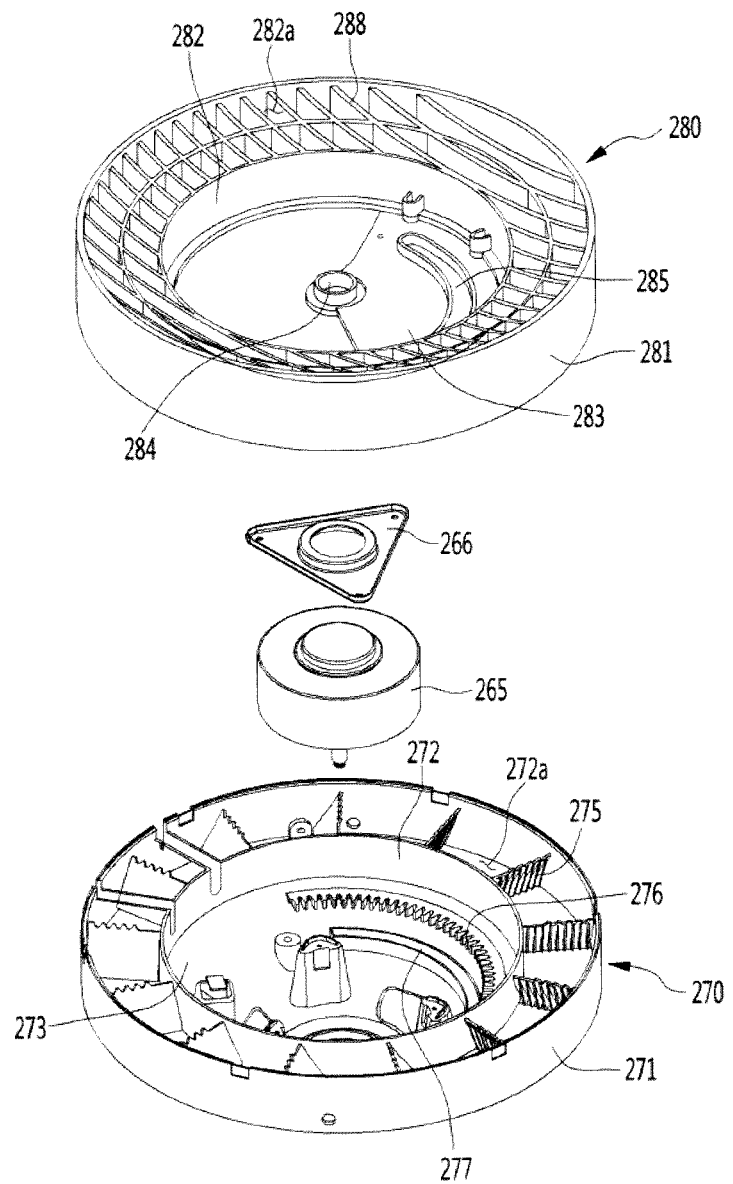
FIG. 22 is an exploded perspective view illustrating a configuration of each of a third air guide device and a second discharging guide device according to an embodiment of the present invention.
Figure 23:
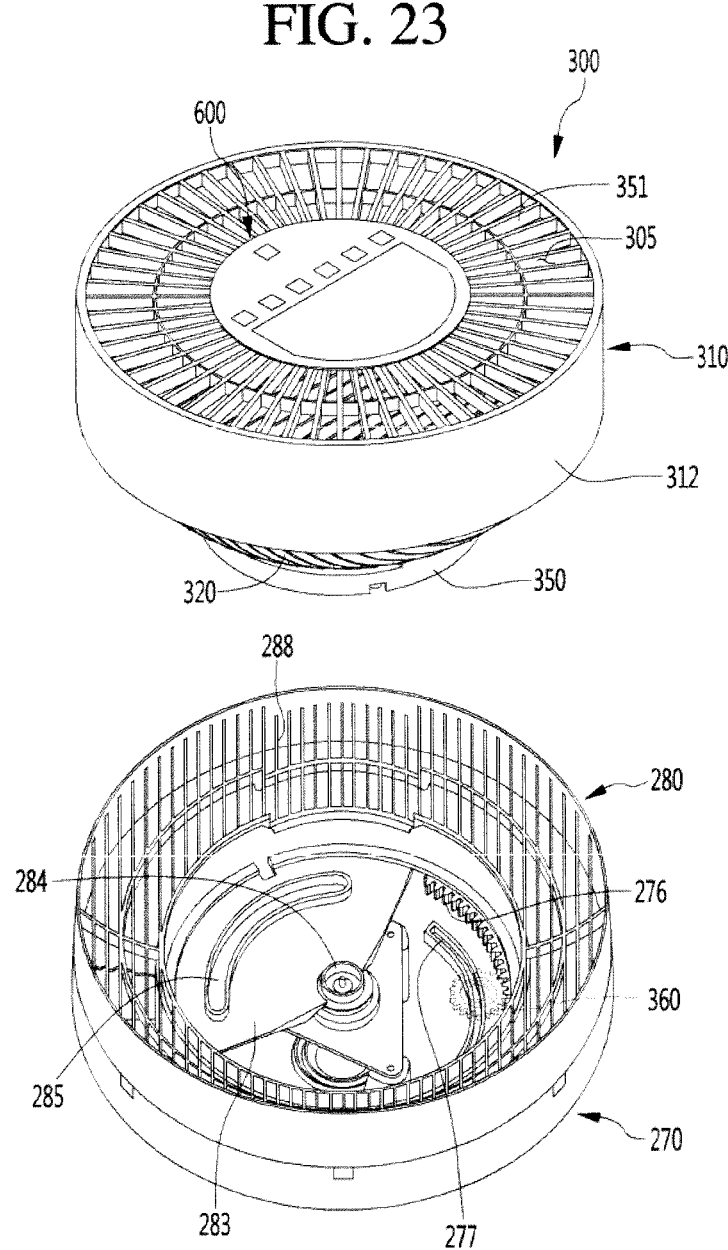
FIG. 23 is an exploded perspective view illustrating a configuration of each of a flow conversion device and a part coupled to the flow conversion device according to an embodiment of the present invention.
Figure 24:
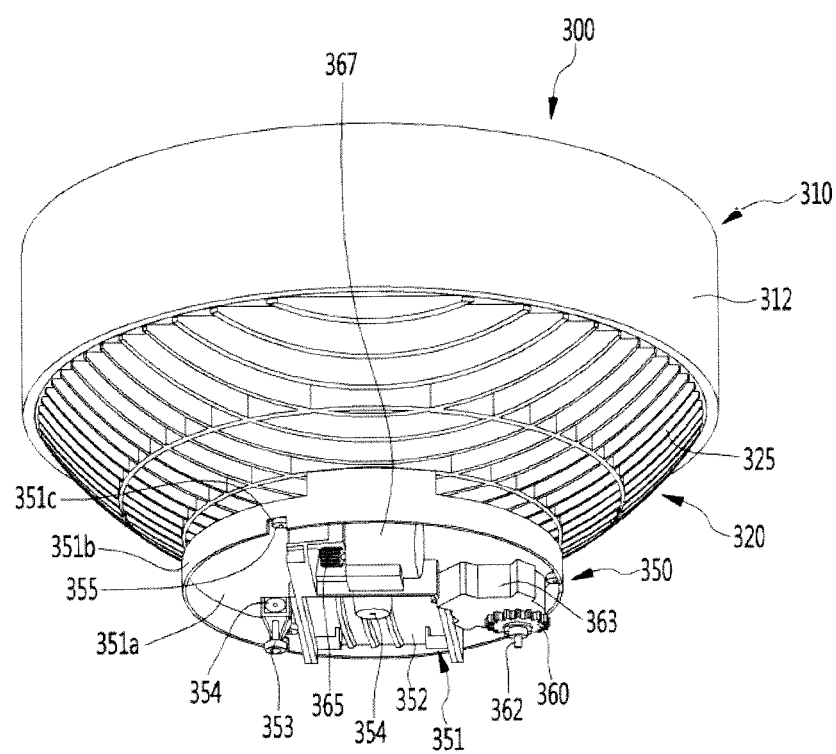
FIG. 24 is a perspective view illustrating a configuration of a flow conversion device according to an embodiment of the present invention.
Figure 25:
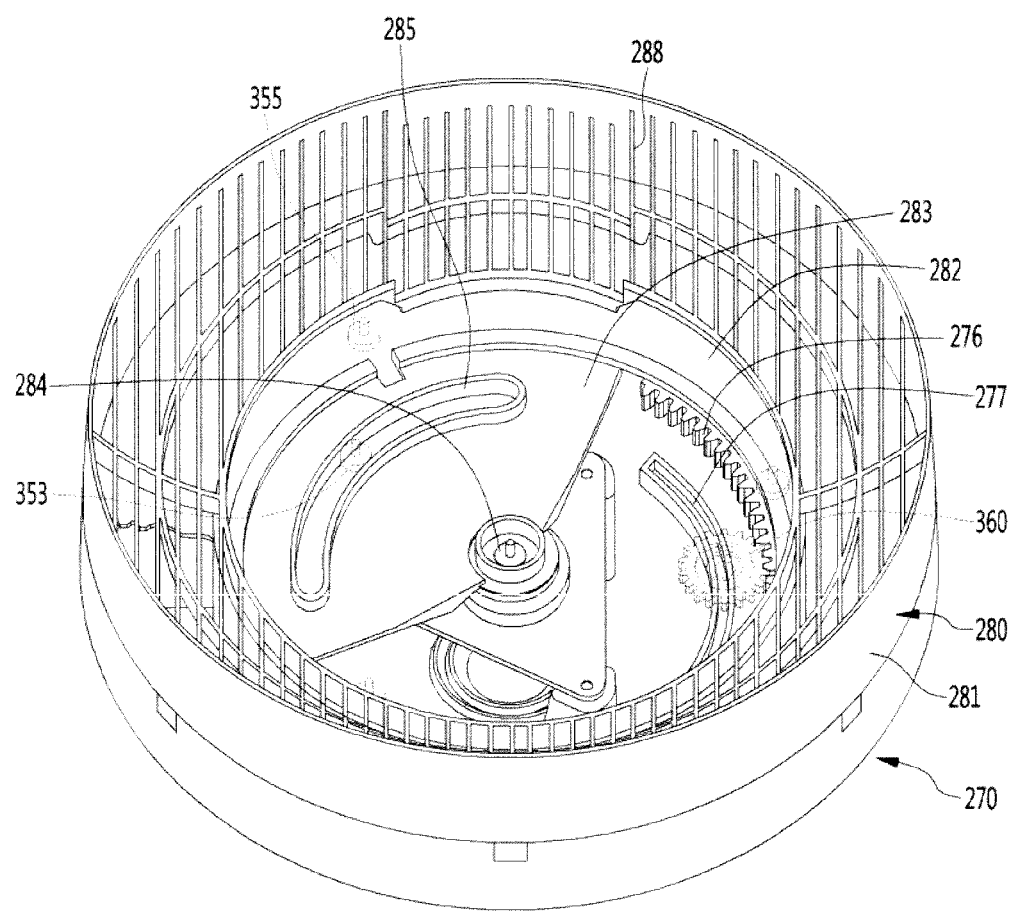
FIG. 25 is a diagram illustrating an example where a third air guide device and a second discharging guide device according to an embodiment of the present invention are coupled to each other.
Figure 26:
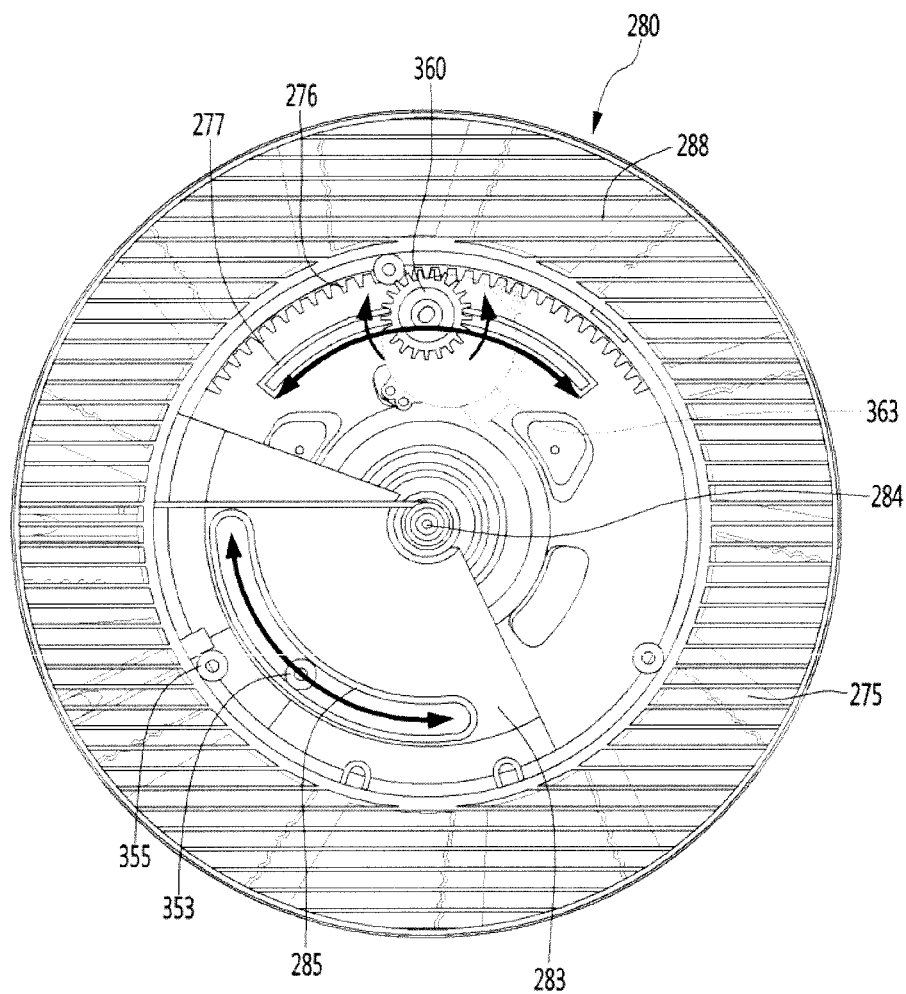
FIG. 26 is a diagram illustrating an example where a first guide mechanism operates for a lateral-direction rotation of a flow conversion device according to an embodiment of the present invention.
Figure 27:
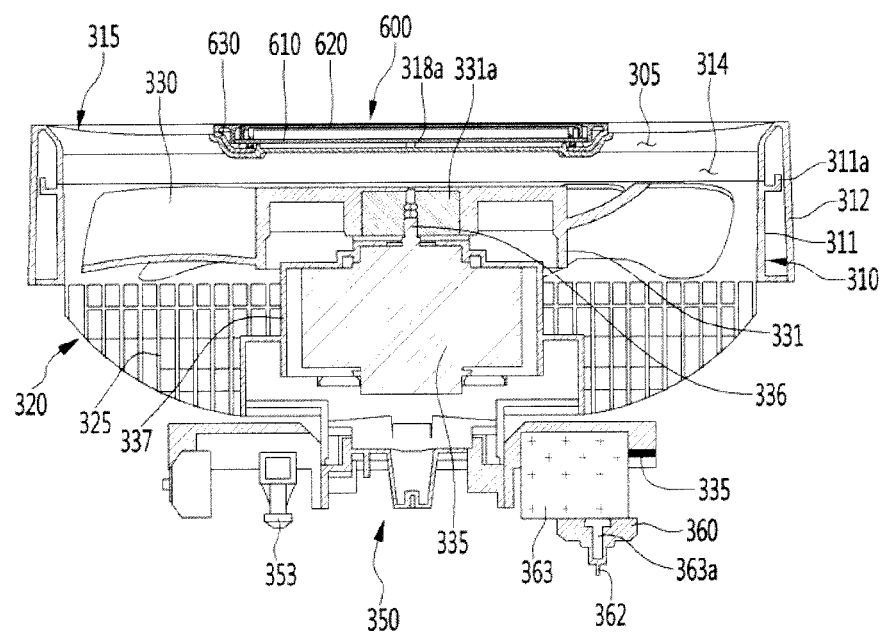
FIG. 27 is a cross-sectional view illustrating a configuration of a flow conversion device according to an embodiment of the present invention.

FIG. 22 is an exploded perspective view illustrating a third air guide device and a second discharging guide device according to the embodiment. FIG. 23 is an exploded perspective view illustrating a configuration of an air flow control device and a component to which the air flow control device is coupled according to the embodiment. FIG. 24 is a perspective view illustrating a configuration of the air flow control device according to the embodiment. FIG. 25 is a view illustrating a state in which the third air guide device and the second discharging guide device are coupled to each other according to the embodiment. FIG. 26 is a view illustrating a state in which a first guide mechanism acts to perform rotation in the lateral direction of the air flow control device according to the embodiment. FIG. 27 is a sectional view illustrating the configuration of the air flow control device according to the embodiment.

Referring to FIGS. 22 to 27, the second blowing device 200 includes a third air guide device 270 which guides a flow of air which passed through the second fan 260 by being coupled to the upper side of the second fan 260.

The third air guide device 270 includes an outside wall 271 which forms the outer circumferential surface of the third air guide device 270 and an inside wall 272 which is positioned on the inside of the outside wall 271 and has a cylindrical shape. A first air flow path 272a through which air flows is formed between an inner circumferential surface of the outside wall 271 and the outer circumferential surface of the inside wall 272.

The third air guide device 270 includes a guide rib 275 which is disposed on the first air flow path 272a. The guide rib 275 extends from the outer circumferential surface of the inside wall 272 to the inner circumferential surface of the outside wall 271.

The third air guide device 270 further includes a motor accommodating portion 273 which extends from the inside wall 272 in the lower direction and thus accommodates the second fan motor 265. The motor accommodating portion 273 has a bowl shape of which diameter is gradually reduced toward the lower side.

The second fan motor 265 is coupled to the upper side of the second fan 260 and thus provides a driving force to the second fan 260. A motor coupling portion 266 is provided on one side of the second fan motor 265 and the motor coupling portion 266 guides to be fixed the second fan motor 265 to the third air guide device 270.

The third air guide device 270 includes guide devices 276 and 277 for guiding a movement of the air flow control device 300.

The guide devices 276 and 277 includes a first rack 276 and a shaft guide groove 277 which are included in the motor accommodating portion 273.

The first rack 276 is understood as configuration which is linked to the first gear 360 of the air flow control device 300. The first rack 276 may be provided on the inner circumferential surface of the motor accommodating portion 273 and may be provided along the set curvature in the circumferential direction. The length of the first rack 276 may be formed as the length which is set based on the distance linked to the first gear 360.

The flow converting device 300 may be rotated in the lateral direction, that is, in the clockwise direction or in the counterclockwise direction. In this process, the first gear 360 may be rotated along the predetermined rotating radius about the rotating shaft 354 of the flow converting device 300.

The shaft guide groove 277 is a groove which guides rotation of the first gear 260 and is understood as configuration which extends to be rounded with a predetermined curvature. As an example, the shaft guide groove 277 may be formed to be rounded in the circumferential direction. In other words, the shaft guide groove 277 may have an arc shape.

The first gear shaft 362 of the first gear 360 may be inserted into the shaft guide groove 277. In a process of rotation of the first gear 360, the first gear shaft 360 may be moved along the shaft guide groove 277.

The second blowing device 200 includes a second discharging guide device 280 which is installed on the upper side of the third air guide device 270 and guides a flow of air which passed through the third air guide device 270.

The second discharging guide device 280 may have a substantially annular shape of which the inside portion is empty. Specifically, the second discharging guide device 280 includes a discharging outside wall 281 which forms the outside circumferential surface of the second discharging guide device 280 and has a cylindrical shape and a discharging inside wall 282 which forms an inner circumferential surface of the second discharging guide device 280 and has a cylindrical shape.

The discharging outside wall 281 is disposed to surround the discharging inside wall 282. A second air flow path 282a, i.e., a discharging flow path in which flow of air passing through the third air guide device 270 in which air flows is performed is formed between the inner circumferential surface of the discharging outside wall 281 and the outer circumferential surface of the discharging inside wall 282. The discharging flow path may be positioned on the upper side of the first air flow path 272a in which the guide rib 275 is provided.

The second discharging guide device 280 further includes a second discharging grill 288 which is disposed on the discharging flow path 282a. The second discharging grill 288 extends from the outer circumferential surface of the discharging inside wall 282 to the inner circumferential surface of the discharging outside wall 281.

The second discharging guide device 280 further includes a rotation guide plate 283 which is coupled to the discharging inside wall 282. The rotation guide plate 283 may extend from the inner circumferential surface of the discharging inside wall 282 toward an inside center of the second discharging guide device 280.

The rotation guide plate 283 includes a shaft inserting portion 284 which provides a rotation center in the lateral direction of the air flow control device 300. The rotating shaft 354 may be inserted into the shaft inserting portion 284. The shaft inserting portion 284 may be positioned in the inside central portion of the second discharging guide 280. The rotation guide plate 283 may be understood as a supporting plate for supporting the shaft inserting portion 284.

A bearing groove 285 further include in the rotation guide plate 283. A first bearing 353 which is provided on the air flow control device 300 may be inserted into the bearing groove 285. The bearing groove 285 is a groove which guides movement of the first bearing 353 and is understood as configuration which extends to be rounded with a predetermined curvature. As an example, the bearing groove 285 may be formed to be rounded in the circumferential direction. In other words, the bearing groove 285 may has an arc shape.

In a process of rotation of the air flow control device 300 in the lateral direction, the first bearing 353 may be capable of moving by inserted into the bearing groove 285 and thus allows a friction force which is generated in the process of rotation of the air flow control device 300 to be reduced.

The air flow control device 300 includes a third fan housing 310 in which a third fan 330 is accommodated. The third fan housing 310 has a substantially annular shape. For convenience of description, the first fan 160 and the second fan 260 may be referred to as a "blowing fan," and the third fan 330 may be referred to as a "circulation fan." In other words, the first fan 160 and the second fan 260 may be referred to as a "main fan," and the third fan 330 may be referred to as a "sub-fan."

In detail, the third fan housing 310 includes a housing cover 312 which forms an outer appearance. A housing main body 311 which has an annular shape is provided in the inside of the housing cover 312. In other words, the housing cover 312 is coupled to the outer circumferential surface of the housing main body 311, and may be supported by the housing main body 311.

The housing main body 311 includes a cover supporting portion 311a which protrudes from the outer circumferential surface of the housing main body 311 to support the inside of the housing cover 312. The cover supporting portion 311a has a bent shape, and the outer surface of the cover supporting portion 311a may be coupled to the inner surface of the housing cover 312.

The housing cover 312 is disposed to surround the housing main body 311, and the housing main body 311 and the housing cover 312 may be rotated or moved together. The third fan 330 is accommodated in the inside portion of the housing main body 311. In addition, a housing flow path 314 through which air flows as the third fan 330 is driven is formed in an inside portion space of the housing main body 311. A blade 333 of the third fan 330 may be located in the housing flow path 314. By rotation of the blade 333, air is capable of flowing in the upper direction via the housing flow path 314. The housing flow path 314 may extend from a space in which the blade 333 is located to an upper space of the blade 333.

A discharging grill 315 which forms the second discharging portion 305 through which air passing through the third fan 330 is discharged is provided on the upper side of the third fan housing 310. In detail, referring to FIG. 21, the discharging grill 315 includes a grill outer wall 316, a grill inner wall 317 provided at the inside of the grill outer wall 316, and a plurality of grill portions 315a which extend from the grill outer wall 316 to the grill inner wall 317. Spaces between the plurality of grill portions 315a form the second discharging portion 305.

Since the second discharging portion 305 along with the first discharging portion 105 of the first blowing device 100 is provided in the air cleaner 10, the discharging amount of air is improved, and air is discharged in various directions.

Each of the grill outer wall 316 and the grill inner wall 317 has a cylindrical shape, and the grill outer wall 316 may be disposed to surround the grill inner wall 317. In addition, the second discharging portion 305 may be formed on the upper side of the housing flow path 314. Thus, air which passes through the housing flow path 314 is capable of being discharged to the outside of the air cleaner 10 via the second discharging portion 305 of the discharging grill 315.

The discharging grill 315 further includes a depression portion 318 which has a shape depressed at a substantially center portion of the discharging grill 315 and supports the display device 600. The depression portion 318 may be provided in the lower end portion of the grill inner wall 317.

A supporting rib 318a which supports a display PCB 610 of the display device 600 is provided in the depression portion 318. The supporting rib 318a may protrude in the upper direction from the upper surface of the depression portion 318. In addition, the grill inner wall 317 may support the lower side of the display PCB 610.

The display device 600 includes a PCB assembly 601. The PCB assembly 601 includes the display PCB 610 on which an illumination source is provided, a reflector 620 which is coupled to the upper side of the display PCB 610 and concentrates light irradiated from the illumination source in the upper direction such that displayed information is capable of being displayed as various characters, numbers, or symbols, and a diffusing plate 630 which is supported on the discharging grill 315 and guides light irradiated from the illumination source to be refracted and then face the upper surface of the display device, i.e., a rim portion 650 of a display screen 602.

An axial flow fan may be included in the third fan 330. Specifically, the third fan 330 may be operated in order to axially discharge air which is axially introduced. In other words, the air which flows toward the third fan 330 in the upper direction via the second fan 260, the first air flow path 272a of the third air guide device 270 and the discharging flow path 282a of the second discharging guide device 280 is discharged from the third fan 330 and thus may be discharged to the outside through the second discharging portion 305 which is positioned on the upper side of the third fan 330.

The third fan 330 includes a hub 331 having a shaft coupling portion to which a rotating shaft 336 of the third fan motor 335 which is the axial flow motor is coupled and a plurality of blades 333 which are coupled to the hub 331 in the circumferential direction. The third fan motor 335 is coupled to the lower side of the third fan 330 and may be disposed in the inside of the third motor housing 337.

The first fan motor 165 and the second fan motor 265 may be disposed in series relative to the longitudinal direction of the air cleaner 10. The second fan motor 265 and the third fan motor 335 may be disposed in series relative to the longitudinal direction of the air cleaner 10. In summary, the rotating shafts of the first fan motor 165, the second fan motor 265 and the third fan motor 335 or the first fan 160, the second fan 260 and the third fan 330 are may be positioned on the same axis in the longitudinal direction.

The air flow control device 300 further includes a flow guide portion 320 which is coupled to the lower side of the third fan housing 310 and thus guides the air passing by the second discharging guide device 280 to the third fan housing 310.

The flow guide portion 320 includes an introduction grill 325 which guides the air introduction to the third fan housing 310. The introduction grill 325 may have a concave shape in the lower direction.

A shape of the second discharging grill 288 of the second discharging guide device 280 is formed in a concave shape in the lower direction corresponding to the shape of the introduction grill 325. The introduction grill 325 may be seated on the upper side of the second discharging grill 288. By this configuration, the introduction grill 325 may be stably supported to the second discharging grill 288.

The air flow control device 300 further includes a rotation guide device 350 which is installed on the lower side of the flow guide portion 320 and thus guides rotation in the lateral direction and rotation in the vertical direction of the air flow control device 300. The rotation in the lateral direction is referred to as "first direction rotation" and the rotation in the vertical direction is referred to as "second direction rotation."

The rotation guide device 350 includes a guide main body 351 which is coupled to the movement guide portion 320. The guide main body 351 includes a lower surface portion 351*a* at which the first and second guide mechanisms are installed and a rim portion 351*b* which is provided on the rim of the lower surface portion 351*a* and protrudes in the lower direction.

The rotation guide device 350 includes a first guide mechanism which guides the first direction rotation of the air flow control device 300 and a second guide mechanism which guides the second direction rotation of the air flow control device 300.

The first guide mechanism includes a first gear motor 363 which generates a driving force and a first gear 360 which is coupled to the first gar motor 363 to be rotatable. As an example, the first gear motor 363 may include a step motor of which the rotation angle is easily controlled.

The first gear 360 is coupled to a motor shaft 363*a* of the first gear motor 363. The first guide mechanism further includes a first gear shaft 362 which extends in the lower direction, i.e., toward the third air guide device 270 or the second discharging guide device 280 from the first gear 360.

The first gear 360 is geared to the first rack 276 of the third air guide device 270. A plurality of gear teeth are formed in the first gear 360 and the first rack 276. When the first gear motor 363 is driven, the first gear 360 rotates and thus links to the first rack 276. At this time, the third air guide device 270 is fixed configuration and thus the first gear 360 is movable.

The shaft guide groove 277 of the third air guide device 270 is capable of guiding movement of the first gear 360. Specifically, the first gear shaft 362 may be inserted into the shaft guide groove 277. The first gear shaft 362 may be moved in the circumferential direction along the shaft guide groove 277 in a rotation process of the first gear 360.

The first guide mechanism further includes a rotating shaft 354 which constitutes rotation center of the air flow control device 300. The first gear 360 and the first gear shaft 362 may be rotated along a rotating radius which is set about the rotating shaft 354. At this time, the set rotating radius is referred to as "first rotating radius."

The first rack 276 and the shaft guide groove 277 may be formed to have a length corresponding to the rotation amount or rotation angle of the air flow control device 300. In detail, the length in the circumferential direction of the first rack 276 and the shaft guide groove 277 may be formed slightly greater than the distance in the circumferential direction in which the air flow control device 300 rotates. Accordingly, in a process of movement of the first gear 360, the first gear 360 can be prevented from being separated from the first rack 276. In addition, in a process of movement of the first gear shaft 362, the first gear shaft 362 can be prevented from interfering with the end portion of the shaft guide groove 277.

The rotating shaft 354 may be provided on a lower surface portion 351*a* of the guide main body 351. In detail, the rotating shaft 354 may protrude in the lower direction from the lower surface portion 351*a*. The rotating shaft 354 is inserted in a shaft insertion portion 284 of the second discharging guide device 280, and may be rotated in the shaft insertion portion 284. In other words, when the first gear 360 rotates, the first gear shaft 362 and the first gear 360 rotate about the rotating shaft 354 in the circumferential direction. The rotating shaft 354 rotates in the shaft inserting portion 284. Accordingly, the air flow control device 300 may be rotated in a first direction, that is, in the clockwise direction or in the counterclockwise direction about the longitudinal direction as the axial direction.

The first guide mechanism further includes bearings 353, and 355 for easily rotating the air flow control device 300 in the first direction. The bearings 353, 355 can reduce a friction force which is generated in the rotation process of the air flow control device 300.

The bearings 353 and 355 include a first bearing 353 which is provided on the lower surface of the rotation guide device 350. As an example, the first bearing 353 may be included a ball bearing.

In addition, the first guide mechanism further includes a bearing supporting portion 354 which protrudes in the lower direction from the lower surface portion 351*a* to support the first bearing 353. The bearing supporting portion 354 is formed in a set length, to guide the first bearing 353 to be disposed at a position at which the first bearing 353 is capable of being in contact with the rotation guide plate 283.

The rotation guide plate 283 includes a bearing groove 285 into which the first bearing 353 is inserted. In a process of rotation of the air flow control device 300 in the first direction, the first bearing 353 may be movable with the first bearing being inserted into the bearing groove 285.

At this time, the first bearing 353 may be rotated along a rotating radius which is set about the rotating shaft 354. At this time, the set rotating radius is referred to as "second rotating radius". The second rotating radius may be formed to be less than the first rotating radius. In other words, a distance from the rotating shaft 354 to the first bearing 353 may be formed shorter than a distance from the rotating shaft 354 to the first gear shaft 352. According to this configuration, the lower surface portion 351*a* is capable of being rotated by being stably supported by the third air guide device 270 and the second discharging guide device 280.

When the first gear shaft 362 is moved along the shaft guide groove 277, the first bearing 353 may be moved along the bearing groove 285. In order to allow the first gear shaft 362 and the first bearing 353 to be smoothly moved, a set curvature of the shaft guide groove 277 and a set curvature of the bearing groove 285 may be equal to each other.

The bearings 353 and 355 further include a second bearing 355. The second bearing 355 may be rotatably installed at the rim portion 351*b*. A bearing insertion portion 351*c* to which the second bearing 355 is coupled may be formed at the rim portion 351*b*. The bearing insertion portion 351*c* may be configured to be depressed in the upper direction from the lower surface of the rim portion 351*b*. In addition, a plurality of second bearing 355 may be provided. The second bearing 355 may be provided to be capable of being in contact with the discharging inside wall 282 of the second discharging guide device 280, that is, the inner circumferential surface of the discharging inside wall 282 may form the contacting surface of the second bearing 355. The air flow control device 300 is easily rotated in the first direction by the second bearing 355 rotating about the rotating shaft 354 along the inner circumferential surface of the discharging inside wall 282.

The first direction rotation of the air flow control device 300 will be briefly described with reference to FIG. 26. If the first gear motor 363 is operated, the first gear 360 may be rotated. When viewed from the top, the first gear motor 363 is rotated in the clockwise direction or the counterclockwise direction. Accordingly, the first gear 360 is capable of being rotated in the clockwise direction or the counterclockwise direction.

As an example, if the first gear motor 363 is rotated in the clockwise direction, the first gear 360 and the first gear shaft 362 may be moved in the counterclockwise direction along the shaft guide groove 277. On the other hand, if the first gear motor 363 is rotated in the counterclockwise direction, the first gear 360 and the first gear shaft 362 may be moved in the clockwise direction along the shaft guide groove 277.

As the first gear 360 is moved in the clockwise direction or in the counterclockwise direction, the air flow control device 300 is capable of being rotated in the same direction as the movement direction of the first gear 360. In this process, the first bearing 353 is moved along the bearing groove 285, and the second bearing 355 is moved along the inner circumferential surface of the discharging inside wall 282. Accordingly, the air flow control device 300 can be stably rotated along a set flow path in the lateral direction.

Figure 29:
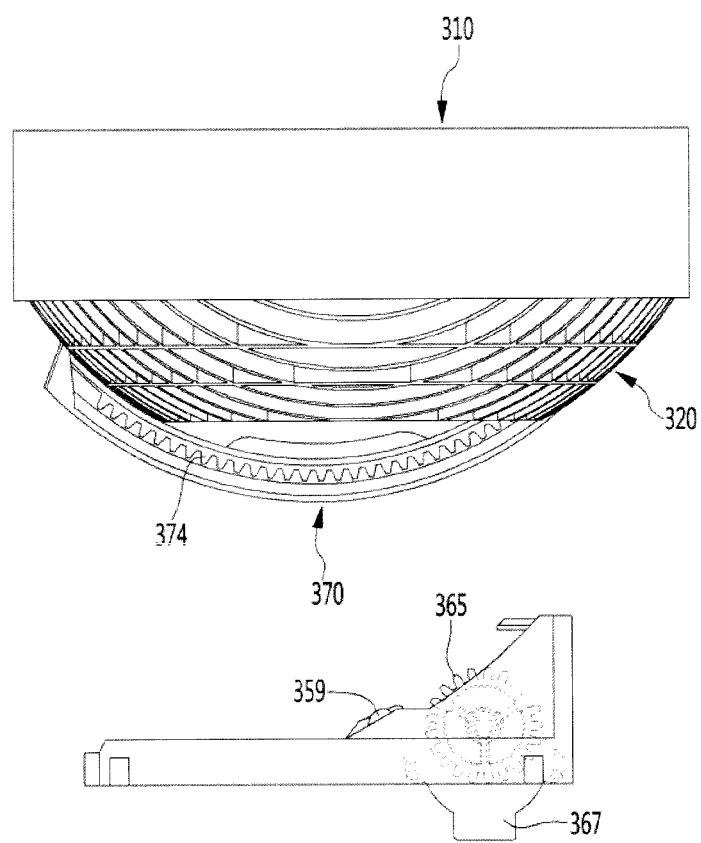
FIG. 29 is an exploded perspective view illustrating a configuration of each of a driver and a fixing part of a flow conversion device according to an embodiment of the present invention.
Figure 30:
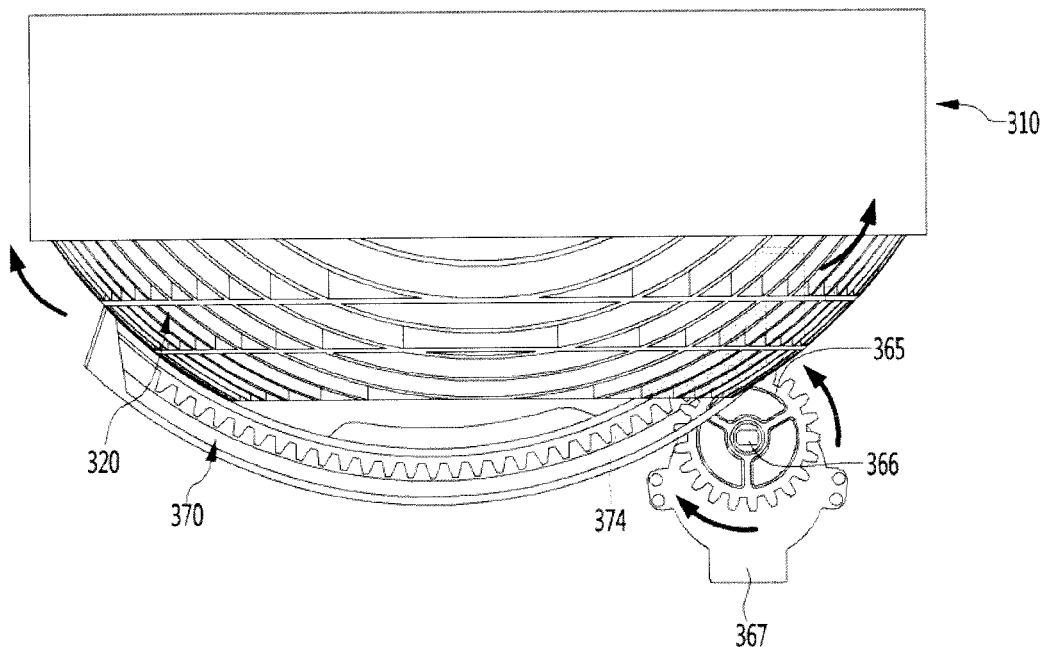
FIG. 30 is a diagram illustrating an example where a second rack and a second gear included in a flow conversion device according to an embodiment of the present invention cooperate.

FIG. 28 is an exploded perspective view illustrating the configuration of the air flow control device according to the embodiment. FIG. 29 is an exploded perspective view illustrating a configuration of a driving portion and a fixing portion of the air flow control device according to the embodiment. FIG. 30 is a view illustrating a state in which a second rack and a second gear, which are provided in the air flow control device, are interlocked with each other according to the embodiment.

Referring to FIGS. 24, 28, and 29, the air flow control device 300 according to the embodiment includes a second guide mechanism which guides rotation in the vertical direction of the air flow control device 300. The second guide mechanism includes a fixing guide member 352 which is fixed to the guide main body 351. The center shaft 354 is provided in the lower surface of the fixing guide member 352.

The fixing guide member 352 supports the lower side of the rotation guide member 370, and includes a first guide surface 352*a* which guides second direction rotation of the rotation guide member 370. The first guide surface 352*a* forms at least a portion of the upper surface of the fixing guide member 352, and may extend to be rounded in the upper direction, corresponding to a rotation path of the rotation guide member 370.

The fixing guide member 352 further includes a first guide bearing 359 which is capable of reducing the friction force which is generated at the time of rotating movement of the rotation guide member 370 by being provided to be capable of being in contact with the rotation guide member 370. The first guide bearing 359 may be positioned to the side of the first guide surface 352*a*.

The fixed guide member 352 further includes a second gear inserting portion 352*b* into which the second gear 365 is capable of being inserted for rotation of the rotation guide member 370. The second gear inserting portion 352*b* is formed on one side of the first guide surface 352*a*. As an example, the second gear inserting portion 352*b* may have a shape of at least a portion of the first guide surface 352*a* being cut.

The second gear 365 is positioned to the lower side of the first guide surface 352*a* and at least a portion of the second gear 365 may be configured to project to the upper side of the second gear inserting portion 352*b* through the second gear inserting portion 352*b*.

The second guide mechanism further includes a second gear motor 367 which couples to the second gear 365 and provides a driving force. As an example, the second gear motor 367 may include a step motor. The second guide mechanism further includes a second gear shaft 366 which extends from the second gear motor 367 to the second gear 365. When the second gear motor 367 is driven, the second gear shaft 366 and the second gear 365 may be rotated together.

The second guide mechanism further includes a rotation guide member 370 which is provided on the upper side of the fixing guide member 352. The rotation guide member 370 is coupled to the lower side of flow guide portion 320.

Specifically, the rotation guide member 370 includes a main body portion 371 which is supported by the fixing guide member 352. The main body portion 371 includes a second guide surface 372 which moves along the first guide surface. The first guide surface 372 may be formed to be rounded corresponding to a curvature of the first guide surface 352*a*.

The rotation guide member 370 further includes a second guide bearing 375 which is capable of reducing the friction force which is generated at the time of rotating movement of the rotation guide member 370 by being provided to be capable of being in contact with the fixing guide member 352. The second guide bearing 375 may be positioned on the side of the second guide surface 372.

The rotation guiding member 370 further includes a second rack 374 which is linked to the second gear 365. A plurality of gear teeth are formed in the second gear 365 and the second rack 374 and the second gear 365 and the second rack 374 may be geared to each other through the plurality of gear teeth.

If the second gear motor 367 is driven, the rotation guide member 370 has a movement which rotates in the vertical direction by linkage of the second gear 365 and the second rack 374. Accordingly, the air flow control device 300 performs second direction rotation according to the movement of the rotation guide member 370.

The second direction rotation of the air flow control device 300 will be briefly described with reference to FIG. 30.

If the second gear motor 367 is operated, the second gear 365 may be rotated. The second gear motor 367 is rotated in the clockwise direction or in the counterclockwise direction relative to the radial direction. Accordingly, the second gear 365 is capable of being rotated in the clockwise direction or in the counterclockwise direction.

As an example, if the second gear motor 367 is rotated in the clockwise direction, the second gear 365 is rotated in the clockwise direction, and the second rack 374 is rotated in the counterclockwise direction by linkage with the second gear 365. As the second rack 374 is rotated, the rotation guide member 370 and the flow guide portion 320 are capable of being rotated together. Finally, the fan housing 310 can be rotated in the counterclockwise direction.

On the other hand, if the second gear motor 367 is rotated in the counterclockwise direction, the second gear 365 is rotated in the counterclockwise direction, and the second rack 374 is rotated in the clockwise direction by linkage with the second gear 365. As the second rack 374 is rotated, the rotation guide member 370 and the flow guide portion 320 are capable of being rotated together. Finally, the fan housing 310 can be rotated in the clockwise direction. Accordingly, the air flow control device 300 can be stably rotated along a set path in the vertical direction.

Figure 31:
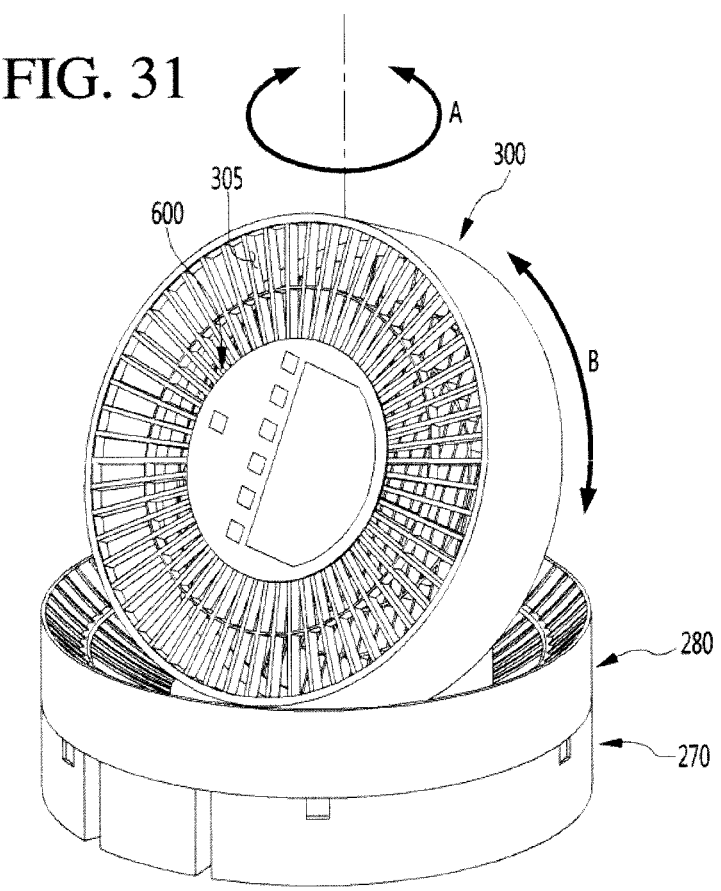
FIGS. 31 and 32 are diagrams illustrating an example where a flow conversion device according to an embodiment of the present invention is located at a second position.
Figure 32:
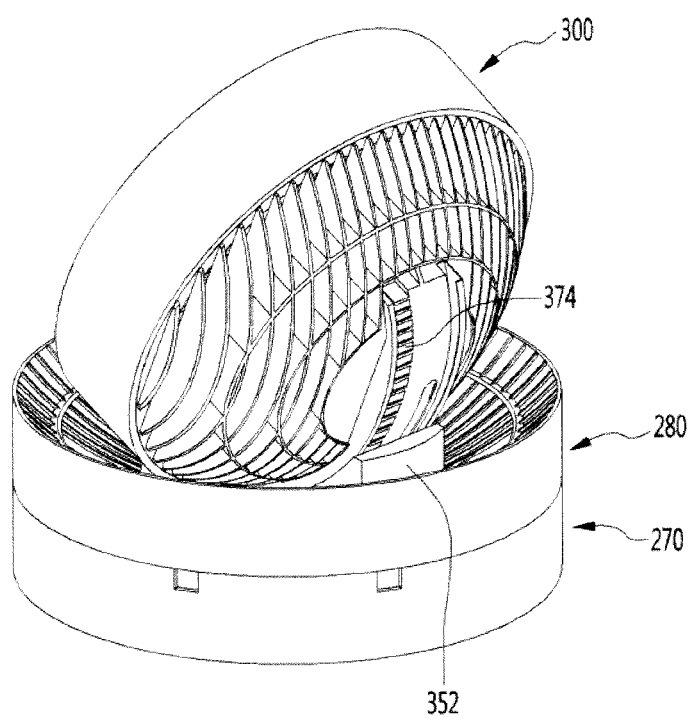
Figure 33:
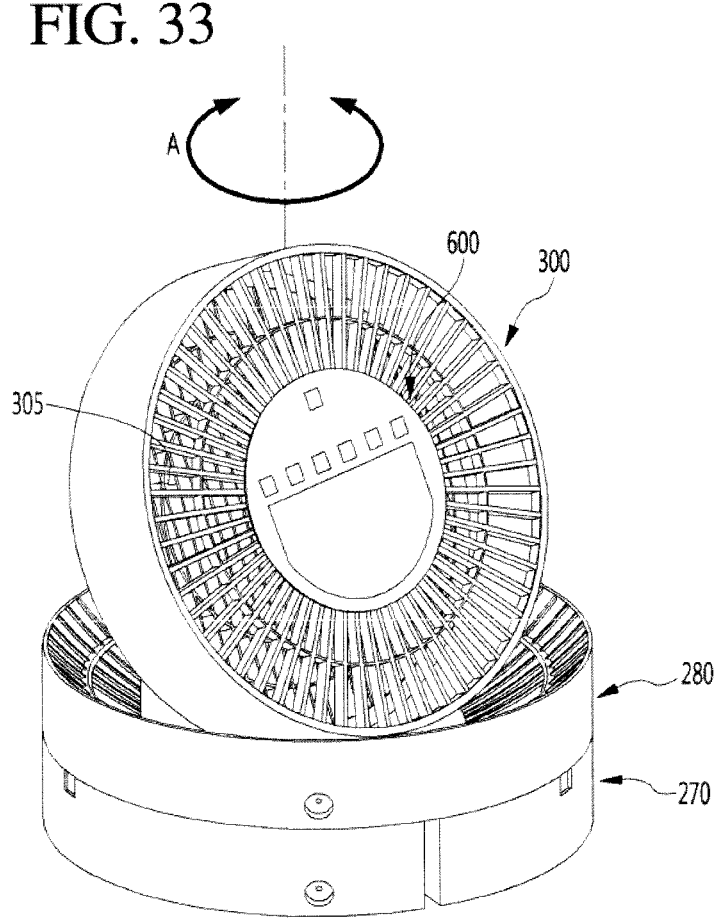
FIG. 33 is a diagram illustrating an example where the flow conversion device of FIG. 31 rotates in an A direction.

FIGS. 31 and 32 are views illustrating a state in which the air flow control device is located at a second position according to the embodiment. FIG. 33 is a view illustrating a state in which the air flow control device of FIG. 31 is rotated in direction A.

FIGS. 31 and 32 illustrate a state in which the air flow control device 300 protrudes to the upper side of the second discharging guide device 280, i.e., a state (second position) in which the fan housing 310 is erected in the upper direction as the rotation guide member 370 is rotated in the upper direction.

As the air flow control device 300 is operated to be vertically rotatable in a direction of "B" shown in FIG. 31, the air flow control device 300 may be located at the first direction (see FIG. 1) or the second position. When the air flow control device 300 is located at the first position, the introducing grill 325 is mounted on the upper surface of the second discharging grill 288. On the other hand, when the air flow control device 300 is located at the second position, the introducing grill 325 is spaced apart from the upper surface of the second discharging grill 288 in the upper direction.

The third fan 330 may be selectively operated based on whether the air flow control device 300 is located at the first position or the second position.

In detail, referring to FIG. 27, the first and second fans 160 and 260 may be rotated to generate air flow in the state in which the air flow control device 300 is located at the first position. Air suction and discharging (first flow) at a lower portion of the air cleaner 10 may be generated by the operation of the first fan 160. In addition, air suction and discharging (second flow) at an upper portion of the air cleaner 10 may be generated by the operation of the second fan 260. The first flow and the second flow may be separated from each other by the dividing device 400.

In addition, the third fan 330 may be selectively operated. If the third fan 330 is operated, the second flow may be more strongly generated. In other words, strong discharging air current at the upper portion of the air cleaner 10 is generated by the second fan 260 and the 330, and may be discharged through the second discharging portion 305. It will be apparent that the third fan 330 may not be operated.

Meanwhile, in the state in which the air flow control device 300 is located at the second position, the first and second fans 160 and 260 may be rotated to generate the first flow and the second flow. In addition, the third fan 330 may be operated. The second position is understood as a position which is inclined by a set angle in the upper direction, relative to the first position of the air flow control device 300. As an example, the set angle may be about 60 degrees.

Figure 41:
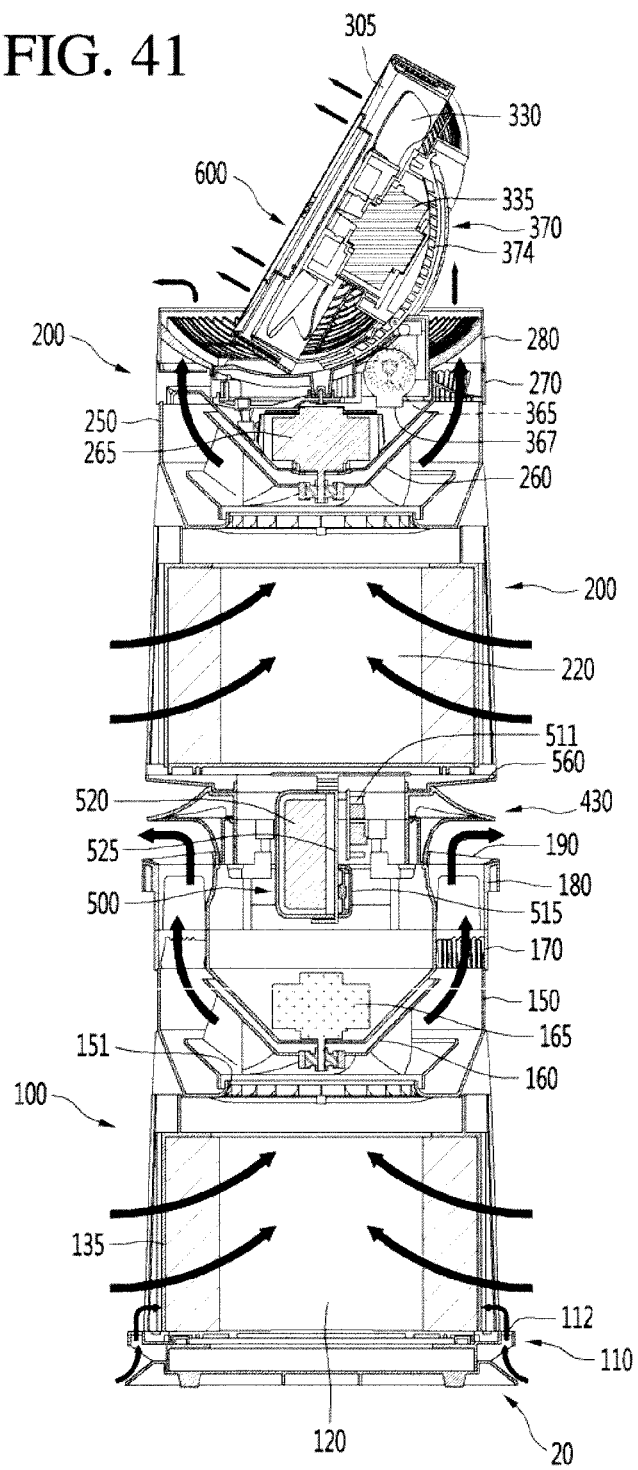

In detail, referring to FIG. 41, by the operation of the third fan 330, at least a portion of air which is discharged through the second discharging guide device 280 may be introduced to the inside portion of the third fan housing 310, and may be discharged from the second discharging portion 305 via the third fan 330. Accordingly, purified air can reach a position distant from the air cleaner 10.

In the state in which the air flow control device 300 is located at the second position, the air flow control device 300 may be rotated in the lateral direction, relative to the side direction. FIG. 31 illustrates a state in which the air flow control device 300 is located to face in one direction (left direction relative to FIG. 31) in the state in which the air flow control device 300 is located at the second position.

Here, the one direction may be a direction which faces at 45 degrees to the left side, relative to the front of the air cleaner 10.

The air flow control device 300 may be located to face in another direction in the state in which the air flow control device 300 is located at the second position. Here, the other direction may be a face which faces at 45 degrees at the left side, relative to the front of the air cleaner 10. In other words, the rotation angle of the air flow control device 300 may be about 90 degrees.

As described above, the air flow control device 300 is capable of being rotated in the lateral direction relative to the axial direction, and thus discharging air current can be blown to a long distance in various directions, relative to the air cleaner 10.

Figure 34:
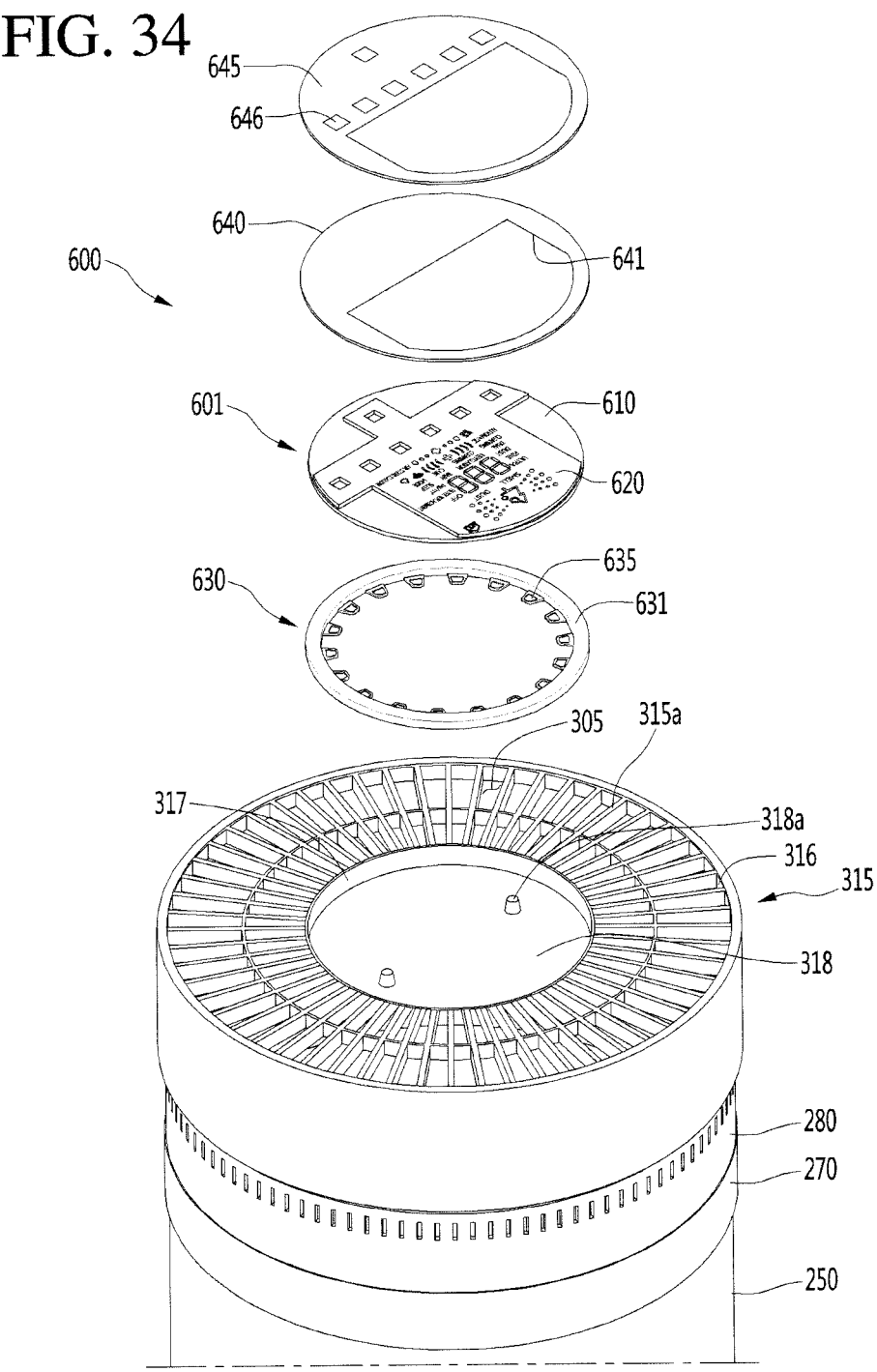
FIG. 34 is an exploded perspective view illustrating a configuration of a display device coupled to a discharge grill according to an embodiment of the present invention.
Figure 35:
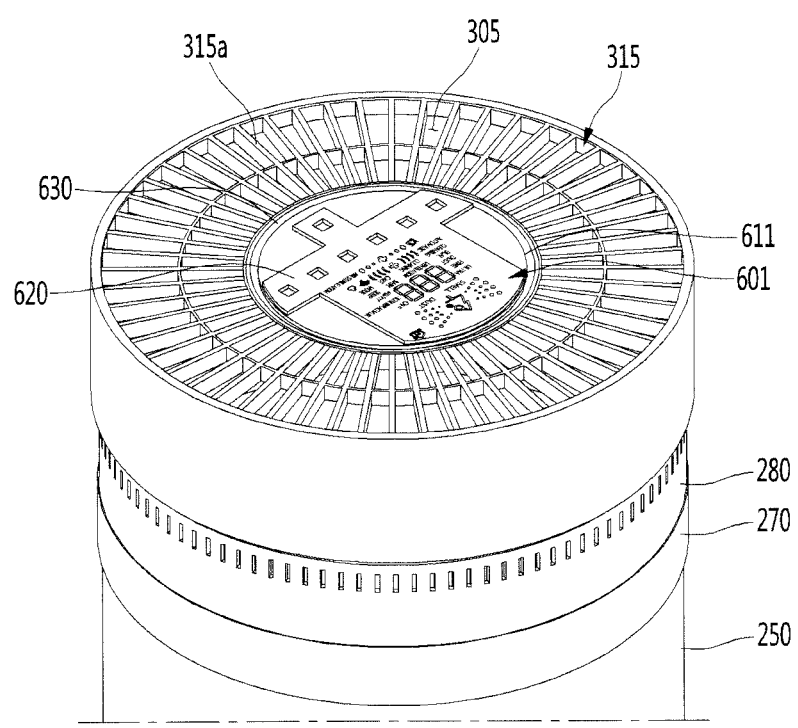
FIG. 35 is a diagram illustrating an example where a PCB assembly is coupled to a discharge grill according to an embodiment of the present invention.
Figure 36:
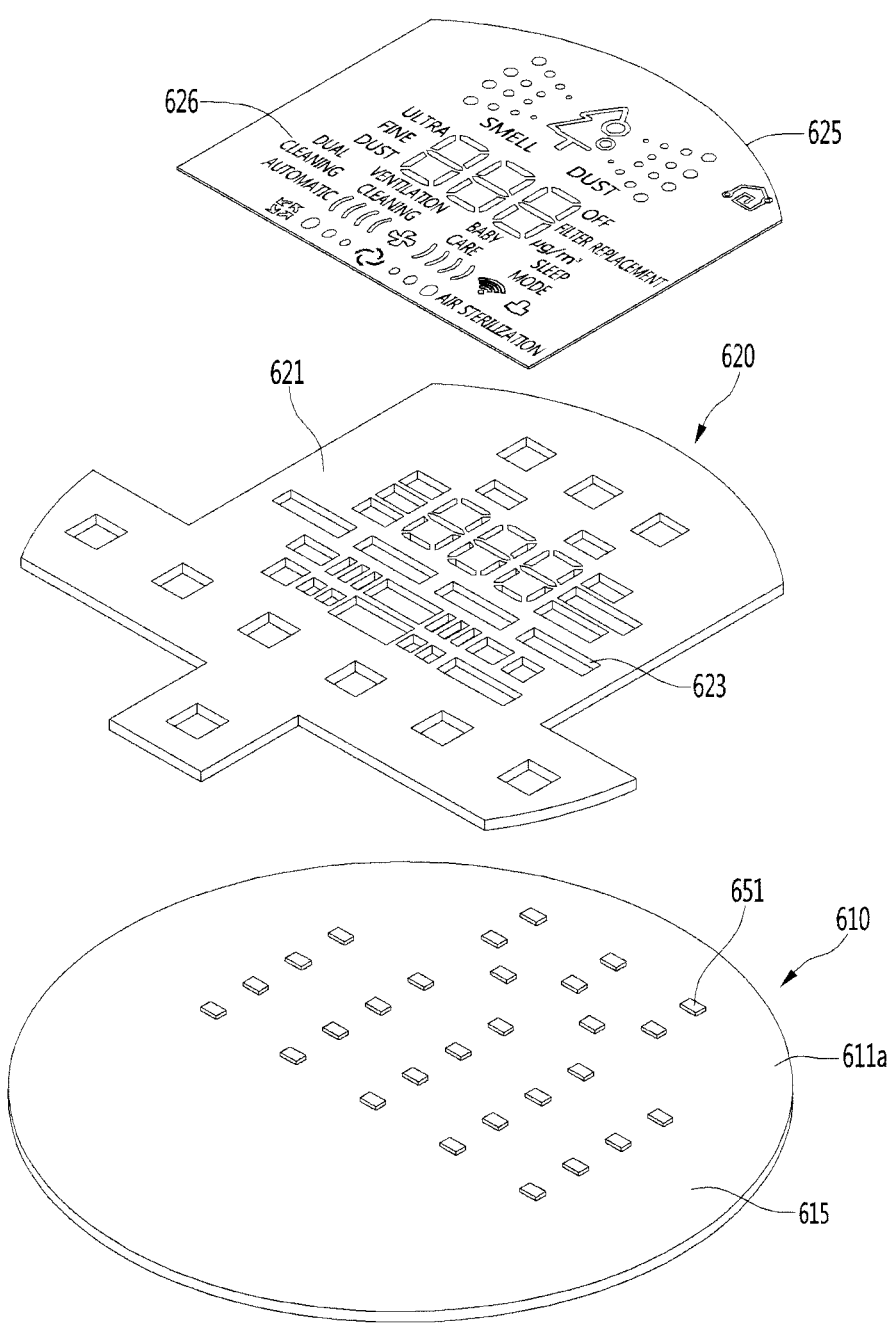
FIG. 36 is an exploded perspective view illustrating a configuration of a PCB assembly according to an embodiment of the present invention.
Figure 37:
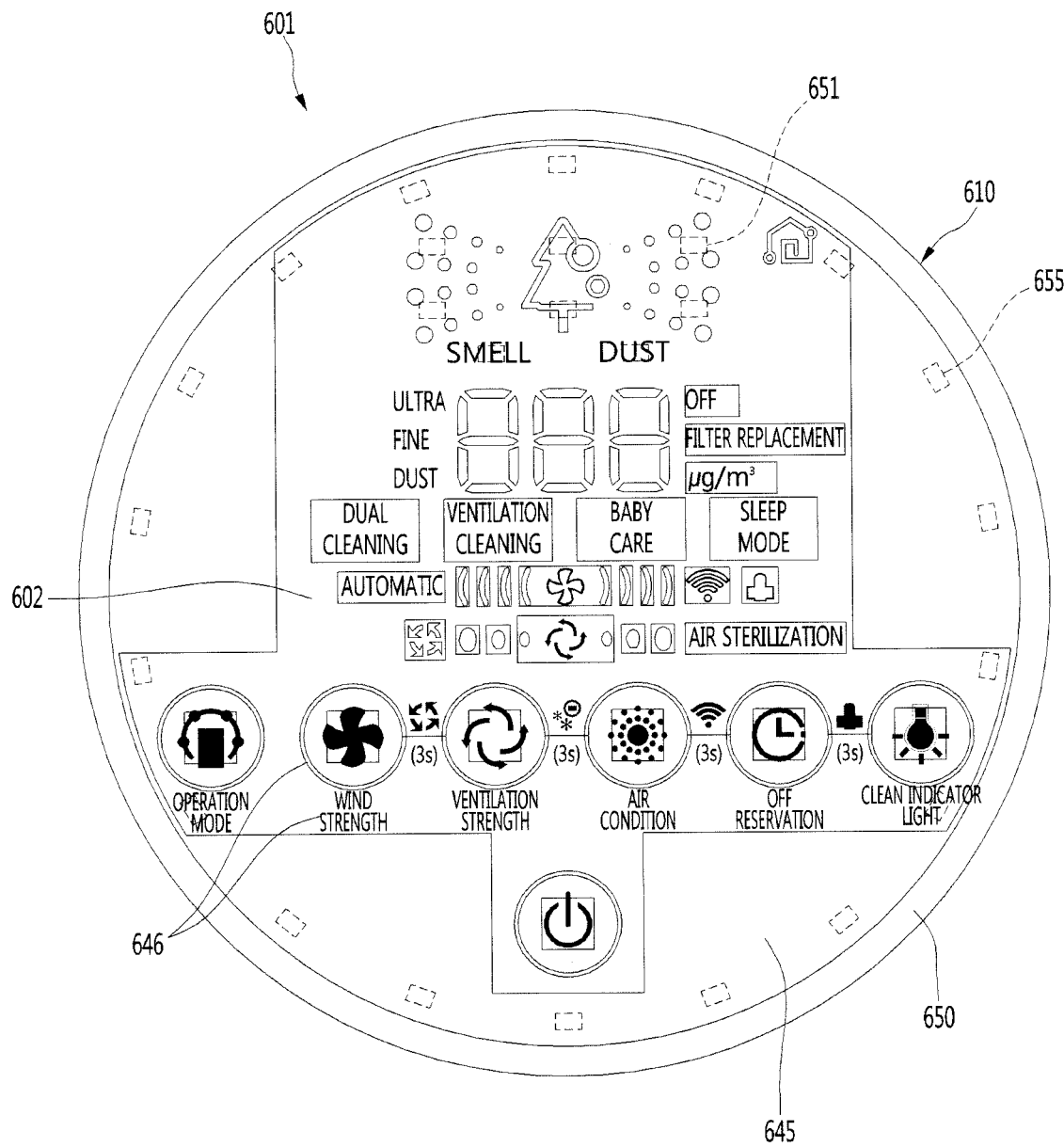
FIG. 37 is a diagram illustrating an upper configuration of a display device according to an embodiment of the present invention.
Figure 38:
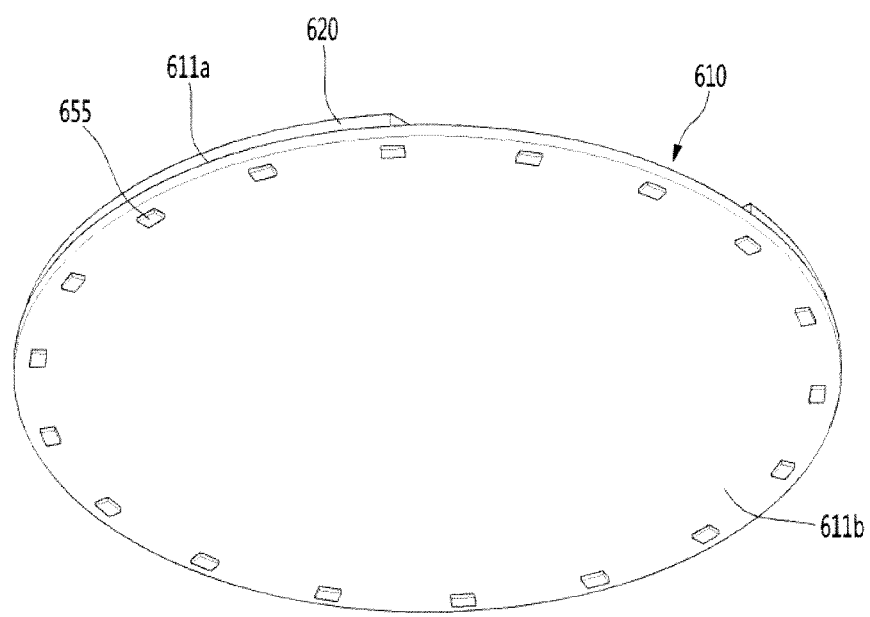
FIG. 38 is a diagram illustrating a lower configuration of a PCB assembly according to an embodiment of the present invention.

FIG. 34 is an exploded perspective view illustrating a configuration of the display device which is coupled to the discharging grill according to the embodiment. FIG. 35 is a view illustrating a state in which a PCB assembly is coupled to the discharging grill according to the embodiment. FIG. 36 is an exploded perspective view illustrating a configuration of the PCB assembly according to the embodiment. FIG. 37 is a view illustrating a configuration of the upper surface of a display device according to the embodiment. FIG. 38 is a view illustrating a configuration of the lower surface of the PCB assembly according to the embodiment.

Referring to FIGS. 34 to 38, the display device 600 according to the embodiment may be installed at an upper portion of the air cleaner 10. The display screen 602 of the display device 600 may constitute at least a portion of the upper surface of the air cleaner 10.

The display device 600 may be installed in the discharging grill 315. A depression portion 318 which has a shape depressed in the lower direction is provided at a substantially center portion of the discharging grill 315, and a plurality of grill portions 315a may extend toward the outside in the radial direction from the depression portion 318. In addition, the display device 600 may be disposed on the upper side of the depression portion 318.

The display device 600 includes a PCB assembly 601. The PCB assembly 601 includes a display PCB 610 on which a plurality of illumination sources 651 and 655 are provided, and a reflector 620 which is coupled to the upper side of the display PCB 610 to allow light irradiated from the plurality of illumination sources 651 to be concentrated toward the display screen 602.

The plurality of illumination sources 651 and 655 include a first illumination source 651 for displaying operation information of the air cleaner 10 and a second illumination source 655 for displaying the rim of the display screen 602 of the display device 600. The display screen 602 is a set area (hereinafter, referred to as a display area) in which the information is capable of being displayed, and is formed on the upper surface of the display device 600. In addition, the rim of the display screen 602 may form a boundary of the display area.

The display PCB 610 includes a board main body 611 which has a substantially circular shape. The board main body 611 includes a main body front surface portion 611a on which the first illumination source 651 is installed and a main body rear surface portion 611b on which the second illumination source 655 is installed.

A plurality of first illumination sources 651 may be provided on the main body front surface portion 611a, corresponding to the shape of a displayed content. In addition, a plurality of second illumination sources 655 may be provided. The plurality of second illumination sources 655 may be arranged along the rim of the main body rear surface portion 611*b*. As an example, the plurality of second illumination sources 655 may be arranged in a circular shape.

The reflector 620 includes a reflector main body 621 and a through hole 623 which is formed in the reflector main body 621 and allows light irradiated from the first illumination source 651 to be concentrated in the upper direction. The reflector main body 621 may be made of an opaque material by which the transmission of light is limited, or the opaque material may be coated on the reflector main body 621.

A reflector film 625 is provided on the upper side of the reflector 620. The reflector film 625 includes a pattern display portion 626 at which a content of displayed information, i.e., a predetermined character, number, or symbol is displayed. The light concentrated through the reflector 620 acts on the pattern display portion 626, thereby implementing predetermined information. The pattern display portion 625 may be made of a transparent material.

As an example, as shown in FIG. 36, the pattern display portion 626 may include characters such as "smell," "dust," "fine dust," and "filter replacement," an 888 pattern which is capable of displaying numbers, a symbol which represents a strength of a blowing amount, and the like.

The first illumination source 651 may be disposed at a position corresponding to the pattern display portion 626. As an example, the first illumination source 651 may be disposed on the lower side of the pattern display portion 626. Since a plurality of pattern display portions 626 are provided to implement various patterns, a plurality of first illumination sources 651 may be provided corresponding to the plurality of pattern display portions 626. Light irradiated from the first illumination source 651 may be exposed to the outside by passing through the pattern display portion 626. In addition, various information may be displayed by on/off control of the plurality of first illumination sources 651.

The display device 600 includes a diffusing plate 630 which surrounds the outside of the PCB assembly 601. The diffusing plate 630 may be understood as a component which forms a rim portion 650 of the display screen 602 by diffusing light irradiated from the second illumination source 655.

The diffusing plate 630 may be disposed along the rim of the depression portion 318. In detail, the diffusing plate 630 includes a plate main body 631 which is disposed to surround the display PCB 610 and an illumination accommodating portion 635 which protrudes from the inner circumferential surface of the plate main body 631 to allow the second illumination source 655 to be accommodated therein. The plate main body 631 may have a ring shape, and may be supported by the discharging grill 315. In addition, the plate main body 631 and the illumination accommodating portion 635 may be integrally formed.

The plate main body 631 and the illumination accommodating portion 635 may be made of a translucent material which is capable of refracting or diffusing light. As an example, the plate main body 631 and the illumination accommodating portion 635 may be made of an acrylic material.

The plate main body 631 may constitute the rim portion 650 of the display screen 602. In detail, the upper portion of the plate main body 631 may be exposed to the upper surface of the air cleaner 10, and light irradiated from the second illumination source 655 is diffused through the illumination accommodating portion 635 and the plate main body 631. In addition, the diffused light moves to the upper portion of the air cleaner 10, thereby constituting the rim portion 650.

Since the plate main body 631 and the illumination accommodating portion 635 are made of a translucent material, the rim portion 650 may be implemented using soft light. Thus, a display screen having a comfortable feeling can be implemented.

The display device 600 further includes a display cover 640 which is provided on the upper side of the PCB assembly 601. The display cover 640 may be understood as a component for supporting the outside of the display PCB 610 and maintaining a cover film 645 to be flat. The display cover 640 may be made of an opaque material for preventing transmission of light.

A cover hole 641 which has a shape corresponding to the reflector film 625 is formed in the display cover 640. According to the configuration of the cover hole 641, although the display cover 640 is coupled to the reflector 620, the reflector film 625 is capable of being exposed in the upper direction.

The cover film 645 is provided on the upper side of the display cover 640. As an example, the cover film 645 may be attached to the upper surface of the display cover 640. The cover film 645 may be made of a translucent material to allow a portion of light transferred from the PCB assembly 601 to be transmitted therethrough. As an example, the translucent material may include an acrylic or polymethyl methacrylate (PMMA) resin. The cover film 645 is provided, so that information displayed through the display device 600 can be prevented from being implemented to be extremely dazzling.

The cover film 645 includes a film display portion 646 which allows a user to input a predetermined command or displays a portion of a plurality of operation information of the air cleaner 10.

Figure 39:
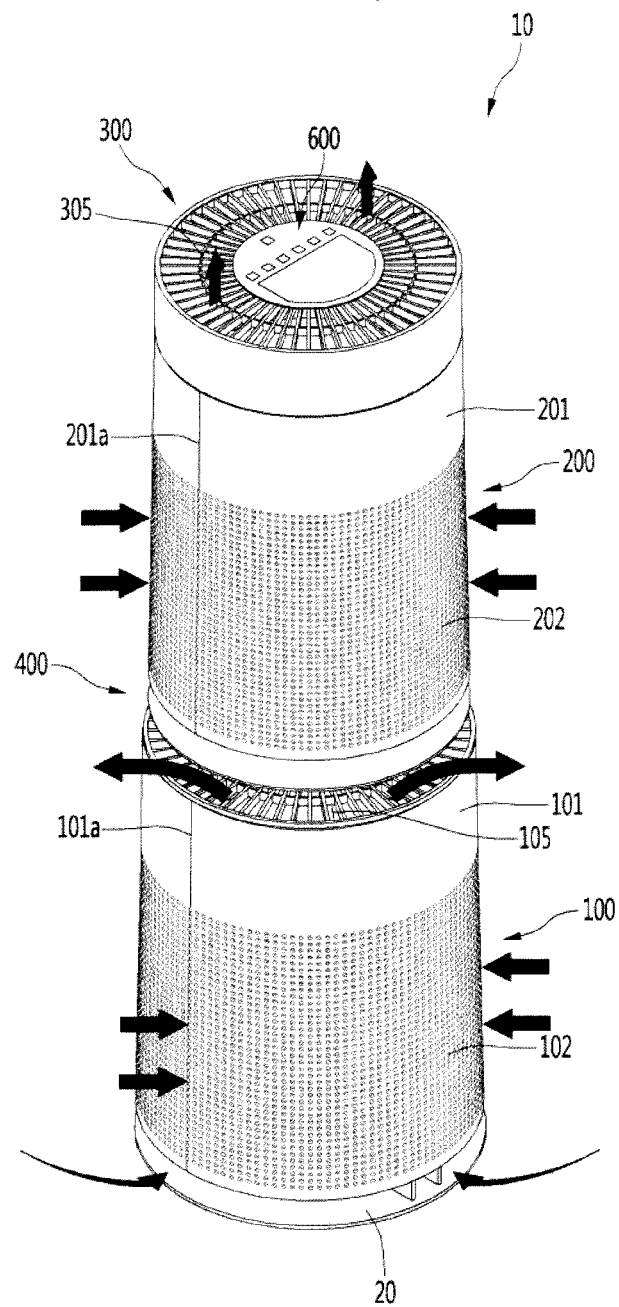
FIGS. 39 to 41 are diagrams illustrating an example where air flows in an air cleaner according to an embodiment of the present invention.
Figure 40:
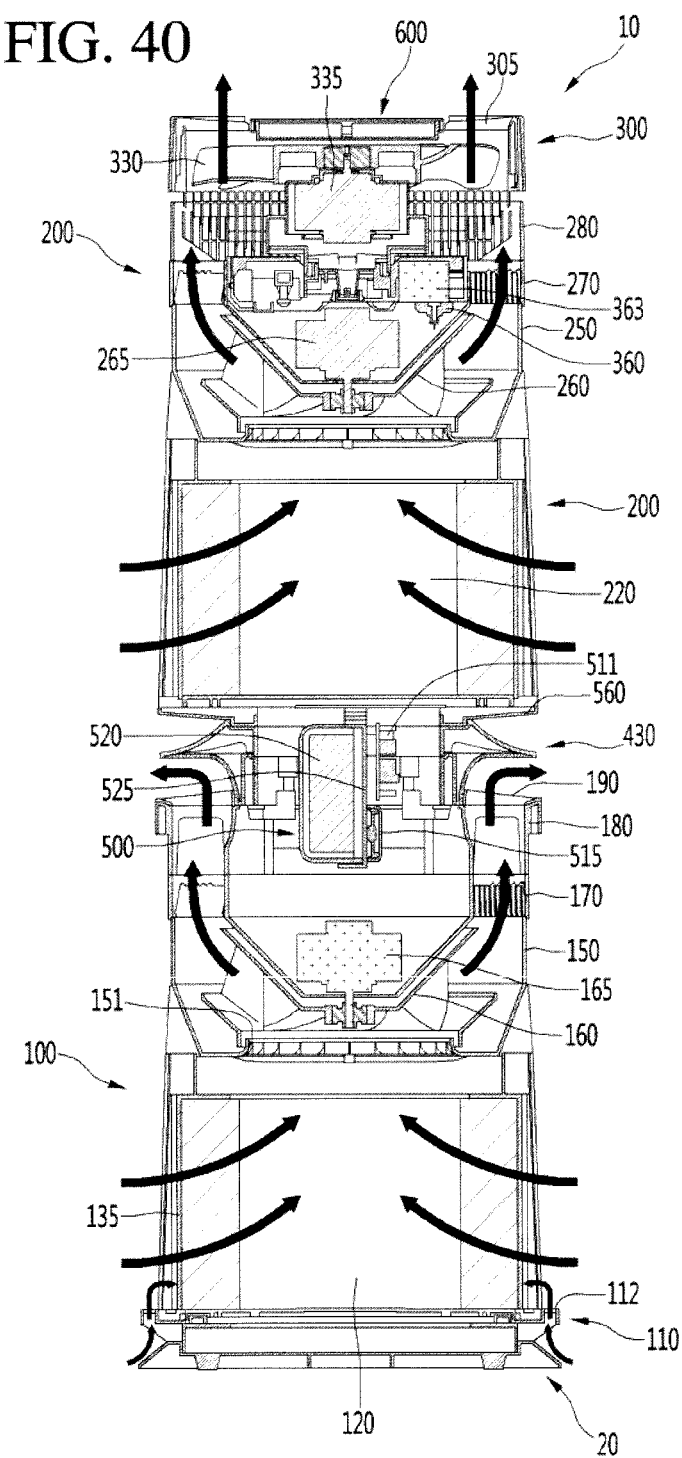

FIGS. 39 to 41 are views illustrating a state in which air flows in the air cleaner according to the embodiment.

First, the flow of air according to driving of the first blowing device 100 will be described. If the first fan 160 is driven, indoor air is sucked to the inside portion of the first case 101 through the first suction portion 102 and the base suction portion 103. The sucked air passes through the first filter member 120, and foreign materials in air may be filtered in this process. In a process in which air passes through the first filter member 120, the air is sucked in the radius direction of the first filter member 120, is filtered, and then flows in the upper direction.

The air which is passed through the first filter member 120 flows to the upper side in the radial direction while passing through the first fan 160 and stable flow in the upper direction is performed while passing through the first air guide device 170 and the second air guide device 180. Air passing through the first air guide device 170 and the second air guide device 180 passes by the first discharging guide device 190 and flows in the upper direction through the first discharging portion 105. Air which is discharged through the first discharging portion 105 is guided by the dividing plate 430 which positions to the upper side of the first discharging guide device 190 and thus is discharged to the outside of the air cleaner 10.

Meanwhile, if the second fan 260 is driven, indoor air is sucked to the inside portion of the second case 201 through the second suction portion 202 and the base suction portion 103. The sucked air passes through the second filter member 220, and foreign materials in air may be filtered in this process. In a process in which air passes through the second filter member 220, the air is sucked in the radius direction of the second filter member 220, is filtered, and then flows in the upper direction.

Air which passes through the second filter member 220 flows to the upper side in the radial direction while passing through the second fan 160, and stable flow in the upper direction is performed while passing through the third air guide device 270 and the second discharging guide device 280. Air which passes through the third air guide device 270 and the second discharging guide device 280 may be discharged through the second discharging portion 305 via the air flow control device 300.

The air flow control device 300 may be rotatably provided in the vertical direction by the second guide mechanism. As an example, as shown in FIGS. 26 to 28, if the air flow control device 300 is located at the first position, air which is discharged from the air flow control device 300 flows in the upper direction.

On the other hand, if the air flow control device 300 is placed at the second position, air which is discharged from the air flow control device 300 may flow toward the front upper side. By the air flow control device 300, the air volume of air which is discharged from the air cleaner 10 can be increased, and purified air can be supplied to a position distant from the air cleaner 10.

In detail, if the third fan 330 of the air flow control device 300 is driven, at least a portion of air which is discharged from the second discharging guide device 280 may be introduced to the inside portion of the third fan housing 310. Then, the introduced air passes through the third fan 330, and may be discharged to the outside through the second discharging portion 305.

Meanwhile, the air flow control device 300 may be rotated in the lateral direction by the first guide mechanism in the state in which the air flow control device 300 is located at the second position. As an example, as shown in FIGS. 18 and 19, when the air flow control device 300 faces the front upper side, air which is discharged through the second discharging portion 305 may flow toward the front upper side. On the other hand, as shown in FIG. 20, when the air flow control device 300 faces the rear upper side, air which is discharged through the second discharging portion 305 may flow toward the rear upper side.

According to this action, air which is discharged from the air cleaner 10 does not simply face in the upper direction but may face in the front direction, and thus an air current toward a space relatively distant from the air cleaner 10 is capable of being generated. Since the separate third fan 330 is provided in the air flow control device 300, the blowing force of the discharged air can be increased.

In addition, the air flow control device 300 is capable of performing the first direction rotation, and thus air can be discharged to both sides of the front of the air cleaner 10. Accordingly, an air current can be provided toward a relatively wide room space.

The air flow control device 300 may be selectively operated based on an operation mode of the air cleaner 10. When the air cleaner 10 is operated in a general operation mode (first operation mode), the air flow control device 300 is located at the first position at which the air flow control device 300 is laid as shown in FIGS. 26 and 27. Then, the first and second blowing devices 100 and 200 are driven, thereby forming a plurality of independent air currents.

In other words, if the first blowing device 100 is driven, air may be sucked through the first suction portion 102 and the base suction portion 103 and then discharged through the first discharging portion 105 by passing through the first filter member 120 and the first fan 160. In addition, if the second blowing device 200 is driven, air may be sucked through the second suction portion 202 and pass through the third fan 330 via the second filter member 220 and the second fan 260. The third fan 330 is driven to have a rotation number corresponding to the rotation number of the second fan 260, thereby guiding air flow.

Meanwhile, the air current may be changed toward both sides of the front of the air cleaner while the air flow control device 300 is performing the first direction rotation in the state in which the air flow control device 300 is located at the first position.

On the other hand, when the air cleaner 10 is operated in a flow conversion mode (second operation mode), the air flow control device 300 may protrude from the upper end portion of the air cleaner 10 by being rotated in the upper direction as shown in FIG. 28. Meanwhile, in the flow conversion mode, driving of the first and second blowing devices 100 and 200 may be identical to driving of the first and second blowing devices 100 and 200 in the general operation mode.

Then, the third fan 330 is driven, and accordingly, at least a portion of air which passes through the second fan 260 and the discharging flow path 282a of the second discharging guide device 280 is introduced to the third fan housing 310. In addition, at least a portion of the introduced air is discharged toward the front upper side or the rear upper side of the air cleaner 10 while passing through the third fan 330.

According to the present disclosure, a suction capacity can be improved since the suction portion is formed along an outer circumferential surface of a cylindrical case and a structural resistance of the case is not generated in an air suction process.

In addition, discharge of air in the upper direction can be guided through the second blowing device and a discharge of air in the front direction can be guided by the air flow control device which is provided on the upper side of the second blowing device. Discharge of air in the lateral direction can be guided, in a process of rotating of the air flow control device. Finally, an air cleaning function of the indoor space can be improved since discharge of air in various directions is guided relative to the air cleaner and a discharging air flow can be formed to a long distance from the air cleaner. A discharging air flow can be easily generated toward the circumferential space of the person in the room whether the person in the room sits down or stands up.

In addition, since the air flow control device includes a first guide mechanism which guides rotation in the lateral direction and a second guide mechanism which guides rotation in the vertical direction, the air flow control device can control a discharging air current while being rotated in the lateral direction by the operation of the first guide mechanism in a state in which the air flow control device is located at a first position at which the air flow control device is laid by the operation of the second guide mechanism or a second position at which the air flow control device is erected by the operation of the second guide mechanism.

In addition, since a third fan is provided in the air flow control device, air is capable of being discharged by adding a flow force generated by the third fan to air which flows through the second blowing device. Thus, a strong discharging air current is capable of being generated, so that an air current can reach to a position distant from the air cleaner.

In addition, since each of the first guide mechanism and the second guide mechanism includes a gear motor and a gear, rotation in the vertical direction or the lateral direction of the air flow control device can be easily performed.

In addition, a display device is provided at an upper portion of the air flow control device, so that operation information of the air cleaner can be easily recognized to the outside. In particular, the display device is well exposed to the outside not only when the air flow control device is in an inclinedly erected state (second position) relative to the axial direction but also when the air flow control device is in a laid state (first position) relative to the axial direction, so that operation information of the air cleaner can be easily identified.

In addition, the air flow control device includes a discharging grill, and a depression portion is provided at a center portion of the discharging grill. Thus, the display device can be installed, and a discharging portion through which air is discharged can be formed along the circumference of the depression portion. Accordingly, it is possible to improve the spatial utilization of the air cleaner. Furthermore, it is possible to prevent flow of air discharged through the discharging portion from being interfered by the display device.

In addition, the display device includes a PCB assembly, i.e., a display PCB having a first illumination source and a reflector which is coupled to the display PCB, so that it is possible to easily implement various characters, numbers, or symbols relative to the operation of the air cleaner.

In addition, a second illumination source is provided on the lower surface of the display PCB, and a diffusing plate having an illumination accommodating portion which accommodates the illumination source therein is provided on the lower side of the display PCB, so that light irradiated from the illumination source can be refracted through the diffusing plate to be easily moved to the rim portion of the front surface of the display device. Finally, it is possible to obtain an effect that information displayed through the display device is visually emphasized. Accordingly, the user can easily identify the information even in a slightly distant distance.

In addition, the blowing capacity of the air cleaner can be improved since the plurality of blowing devices are provided.

In addition, the air which flows in the radial direction through the centrifugal fan can be easily guided toward the discharging portion in the upper direction, since the centrifugal fan for increasing the blowing capacity of the air cleaner and the air guide device which is disposed on an outlet side of the centrifugal fan are provided.

In addition, phenomena that interfere with each other between the air flows can be prevented since the air flows which are independent from each other are generated through the first blowing device and the second blowing device. Accordingly, the air flowing capacity can be improved.

The above-described present invention may be implemented as a computer-readable code in a medium where a program is recorded. The computer-readable medium includes all kinds of recording devices storing data readable by a computer system. Examples of the computer-readable medium may include hard disk driver (HDD), solid state disk (SSD), silicon disk driver (SDD), read-only memory (ROM), random access memory (RAM), CD-ROM, a magnetic tape, a floppy disk, and an optical data storage device. Also, the computer may include a processor 180 of a server. Therefore, the detailed description should not be construed restrictively in all terms and should be considered as an example. The scope of the present invention should be determined by the rational analysis of claims, and all modifications are included in the scope of the present invention in an equivalent range of the present invention.

The invention claimed is:

1. An air cleaner disposed in an indoor space, the air cleaner comprising:
    a blower including a suction port and a discharging port;
    a fan motor configured to cause air flow;
    a purifier installed in the blower to clean air;
    a flow converter configured to change a flow direction of air discharged from the discharging port;
    a communicator configured to communicate with a moving agent moving in the indoor space;
    a memory configured to store types of a plurality of indoor spaces including a plurality of zones and a plurality of cleaning information respectively corresponding to the plurality of zones, wherein each type among the types of the plurality of indoor spaces is divided into the plurality of zones and the cleaning information of each zone is a setting value of the air cleaner which enables optimal air cleaning to be performed in a corresponding zone; and
    a processor configured to receive feature information collected by the moving agent and associated with a structure of the indoor space, obtain the type of the indoor space by using the feature information, and control an operation of at least one of the fan motor and the flow converter by using the type of the indoor space to adjust at least one of an operation mode, a wind direction, and a wind volume,
    wherein the feature information collected by the moving agent includes a structure of a map of the indoor space and a position and a direction of the air cleaner,
    wherein the types of the plurality of indoor spaces stored in the memory have different structures and different positions and directions of virtual air cleaners, and
    wherein the processor is further configured to:
        receive an input which sets a specific zone of the indoor space among the plurality of zones through an input unit;
        obtain the type of the indoor space including the plurality of zones from the memory;
        compare positions of the plurality of zones corresponding to the obtained type of indoor space with a position of the specific zone corresponding to the received input;
        select the zone closest to the specific zone among the plurality of zones corresponding to the obtained type of indoor space;
        obtain the cleaning information corresponding to the selected zone from the memory; and
        perform intensive cleaning on the selected zone based on the cleaning information including the setting value of the air cleaner.

2. The air cleaner of claim 1, wherein the processor adjusts at least one of the operation mode, the wind direction, and the wind volume by using the cleaning information corresponding to the type of the indoor space.

3. The air cleaner of claim 1, wherein the processor receives situation information including at least one of zone-based air quality information and dust occurrence information collected by the moving agent and controls an operation of at least one of the fan motor and the flow converter by using the type of the indoor space and the situation information to adjust at least one of the operation mode, the wind direction, and the wind volume.

4. The air cleaner of claim 3, wherein the processor determines the specific zone on which intensive cleaning is to be performed, based on the situation information.

5. The air cleaner of claim 4, wherein the specific zone is a zone where air quality is worst in the indoor space.

6. The air cleaner of claim 4, wherein the specific zone is a zone which does not reach target air quality in the indoor space.

7. The air cleaner of claim 4, wherein the specific zone is a zone where the dust occurrence information appears.

8. The air cleaner of claim 3, wherein
the processor obtains uniformity of air quality of the indoor space on the basis of the situation information,
when the uniformity is lower than a predetermined value, the processor adjusts at least one of the operation mode, the wind volume, and the wind direction by using the cleaning information corresponding to the type of the indoor space, and
the cleaning information corresponding to the type of the indoor space is the setting value of the air cleaner for enabling air quality of the indoor space to be uniform, based on the structure of the indoor space.

9. The air cleaner of claim 4, wherein, when an operation of the air cleaner starts, the processor transmits a situation information collection command to the moving agent.

10. The air cleaner of claim 1, wherein the moving agent is a robot vacuum cleaner.

11. The air cleaner of claim 2, wherein the processor obtains at least one of the position and the direction of the air cleaner in the indoor space on the basis of the feature information and corrects the cleaning information corresponding to the type of the indoor space on the basis of at least one of the position and the direction of the air cleaner.

* * * * *